United States Patent
Sreenivasulu et al.

(10) Patent No.: US 12,433,215 B2
(45) Date of Patent: Oct. 7, 2025

(54) METHODS OF ENHANCING GRAIN YIELD, PLANTS AND PRODUCTS GENERATED THEREBY

(71) Applicant: International Rice Research Institute, Laguna (PH)

(72) Inventors: Nese Sreenivasulu, Laguna (PH); Erstelle A. Pasion, Laguna (PH); Ajay Kohli, Laguna (PH)

(73) Assignee: International Rice Research Institute, Los Baños (PH)

( * ) Notice: Subject to any disclaimer, the term of this patent is extended or adjusted under 35 U.S.C. 154(b) by 0 days.

(21) Appl. No.: 17/557,130

(22) Filed: Dec. 21, 2021

(65) Prior Publication Data

US 2022/0167576 A1    Jun. 2, 2022

Related U.S. Application Data

(63) Continuation of application No. PCT/IB2020/055840, filed on Jun. 21, 2020.

(60) Provisional application No. 62/926,585, filed on Oct. 28, 2019, provisional application No. 62/864,548, filed on Jun. 21, 2019.

(51) Int. Cl.
*A01H 1/00*     (2006.01)
*A01H 1/04*     (2006.01)
*A01H 6/46*     (2018.01)

(52) U.S. Cl.
CPC .............. *A01H 1/12* (2021.01); *A01H 1/045* (2021.01); *A01H 1/102* (2021.01); *A01H 6/4636* (2018.05)

(58) Field of Classification Search
None
See application file for complete search history.

(56) References Cited

U.S. PATENT DOCUMENTS

| | | | |
|---|---|---|---|
| 2014/0033366 A1 | 1/2014 | Frankard et al. | |
| 2014/0130203 A1 | 5/2014 | La Rosa et al. | |
| 2016/0251675 A1 | 9/2016 | Henry et al. | |
| 2018/0245095 A1 | 8/2018 | Abad et al. | |

FOREIGN PATENT DOCUMENTS

WO    WO 2020/255099    12/2020

OTHER PUBLICATIONS

Rekha et al (Apr. 20, 2018, J. Plant Biochem. Biotechnol. 27:463-472).*
Rekha et al (Apr. 20, 2018, J. Plant Biochem. Biotechnol. 27:463-472), inlcuding supplementary Table 1.*
International Preliminary Report on Patentability Dated Dec. 30, 2021 From the International Bureau of WIPO Re. Application No. PCT/IB2020/055840. (8 Pages).
International Search Report and the Written Opinion Dated Sep. 9, 2020 From the International Searching Authority Re. Application No. PCT/IB2020/055840. (11 Pages).
Adriani et al. "Rice Panicle Plasticity in Near Isogenic Lines Carrying A QTL for Larger Panicle Is Genotype and Environment Dependent", Rice, 9(28): 1-15, Published Online Jun. 2, 2016.
Das et al. "Grain Density and Its Impact on Grain Filling Characteristic of Rice: Mechanistic Testing of the Concept in Genetically Related Cultivars", Scientific Reports, 8(4149): 1-11, Published Online Mar. 7, 2018.
Madhubabu et al. "Evaluation of Grain Yield, Quality and Nutrients Content in Four Rice (*Oryza sativa* L.) Genotypes", Current Journal of Applied Science and Technology, 22(1/Art 34673): 1-12, Published Online Jun. 28, 2017.
Matsue et al. "Differences in Amylose Content, Amylographic Characteristics and Storage Proteins of Grains on Primary and Secondary Rachis Branches in Rice", Japanese Journal of Crop Science, 64(3): 601-606, Sep. 5, 1995.
Matsue et al. "Differences in Protein Content, Amylose Content and Palability in Relation to Location of Grains Within Rice Panicle", Japanese Journal of Crop Science, 63(2): 271-277, Jun. 5, 1994.
Wang et al. "Impact of Cultivar Variation in Grain Density of Rice Panicle on Grain Weight and Quality", Journal of the Science of Food and Agriculture, 88(5): 897-903, Published Online Jan. 16, 2008.
Wu et al. "Three Novel Alleles of Floury ENDOSPERM2 (FLO2) Confer Dull Grains With Low Amylose Content in Rice", Plant Science, 233: 44-52, Available Online Dec. 31, 2014.
Yano et al. "GWAS With Principal Component Analysis Identifies A Gene Comprehensively Controlling Rice Architecture", Proc. Natl. Acad. Sci. USA, PNAS, 116(42): 21262-21267, Oct. 15, 2019.
Zhou et al. "GNS4, A Novel Allele of DWARF11, Regulates Grain Number and Grain Sixe in A High-Yield Rice Variety", Rice, 10(34): 1-11, Published Online Jul. 20, 2017.
Supplementary European Search Report and the European Search Opinion Dated Jun. 26, 2023 From the European Patent Office Re. Application No. 20826989.4. (8 Pages).
Terao et al. "A Gene Controlling the Number of Primary Rachis Branches Also Controls the Vascular Bundle Formation and Hence is Responsible to Increase the Harvest Index and Grain Yield in Rice", Theoretical and Applied Genctics, 120:875-893, Nov. 22, 2009.
Communication Pursuant to Article 94(3) EPC Dated Jan. 23, 2025 From the European Patent Office Re. Application No. 20826989.4 (4 Pages).
Examination Report Dated May 8, 2025 From the Intellectual Property Officof the Philippines Bureau of Patents, Re. Application No. 1/2022/500001. (5 Pages).

* cited by examiner

*Primary Examiner* — Anne Kubelik

(57) ABSTRACT

A method of enhancing grain yield of a Gramineae plant is provided. The method comprises:
(a) crossing a recipient plant with a donor plant comprising a sequence variation in a TPR allele, said sequence variation imparting enhanced grain yield; and
(b) selecting a progeny plant of said crossing comprising said sequence variation by identifying said variation, said progeny plant being characterized by an improved grain yield relative to said recipient plant. Also provided are plants and processed products resultant of the method.

7 Claims, 40 Drawing Sheets
(36 of 40 Drawing Sheet(s) Filed in Color)

Specification includes a Sequence Listing.

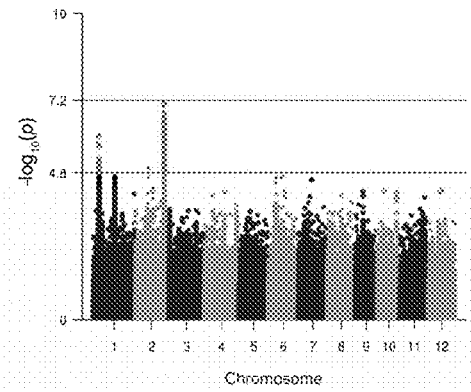
FIG. 2A
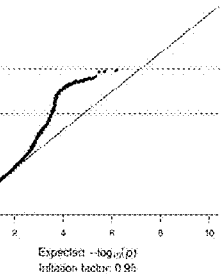
FIG. 2B
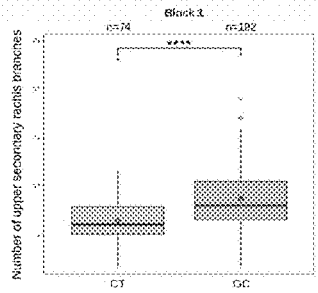
FIG. 2D
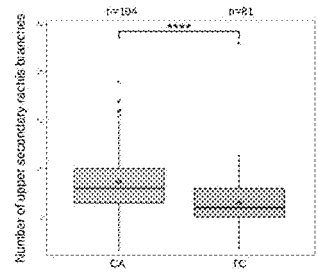
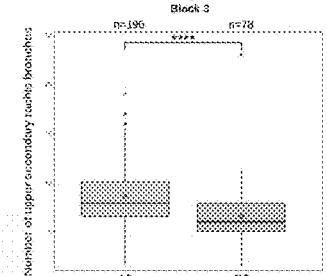
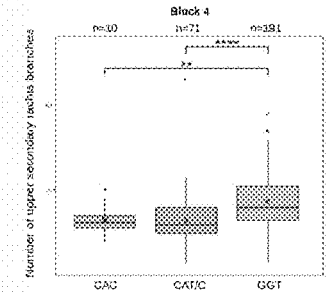
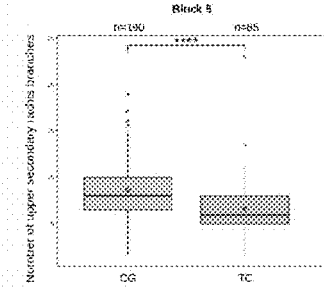
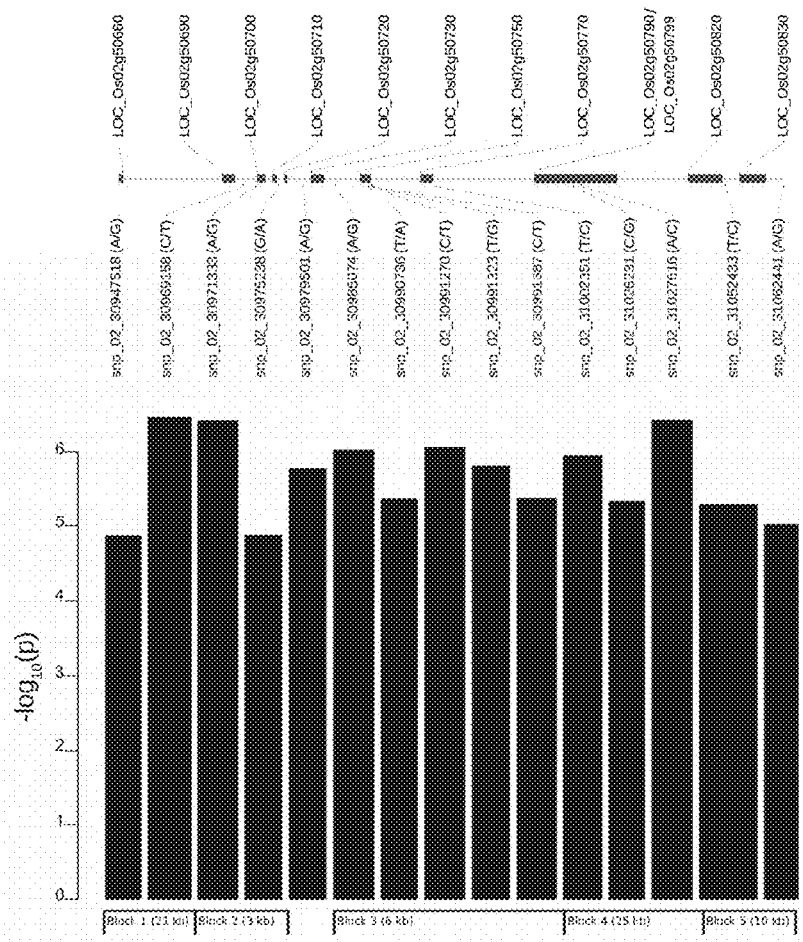
FIG. 2C

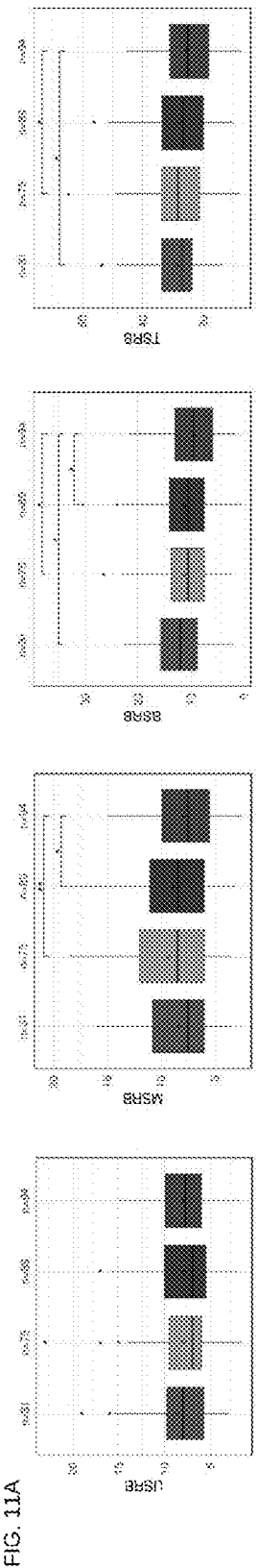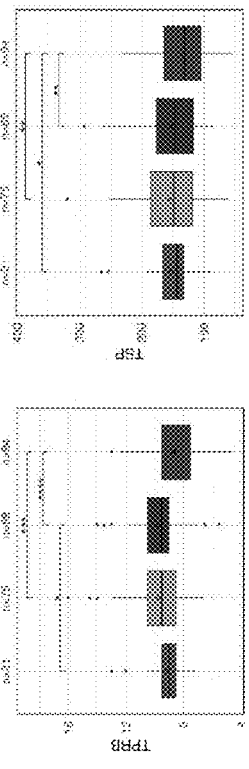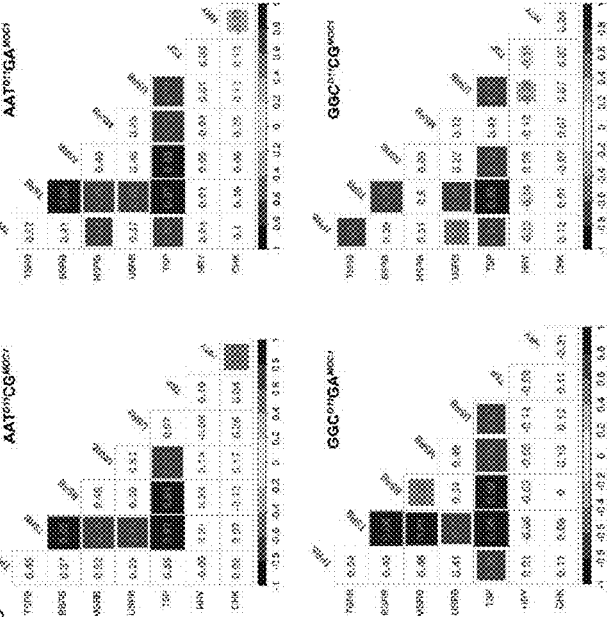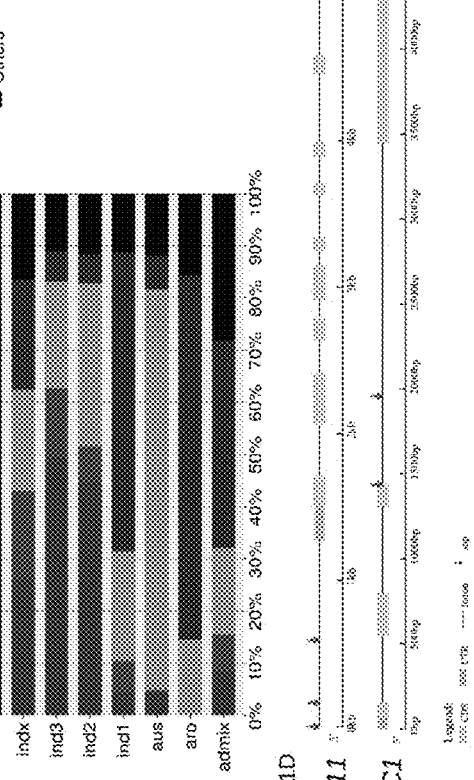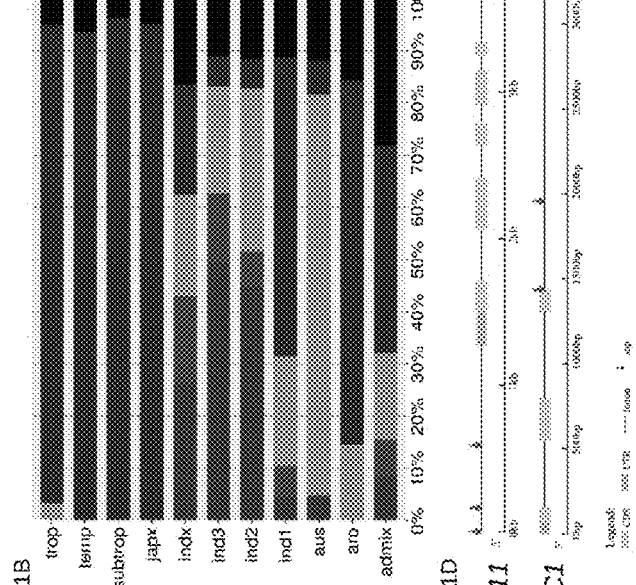
FIG. 11A
FIG. 11B
FIG. 11C
FIG. 11D

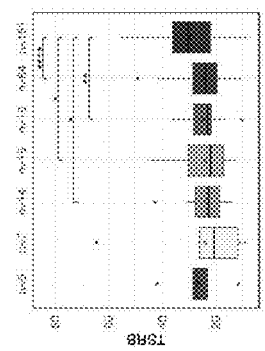
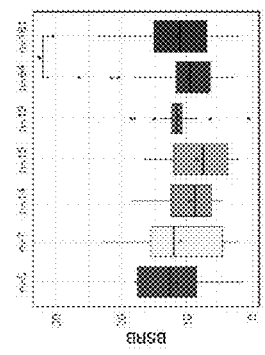
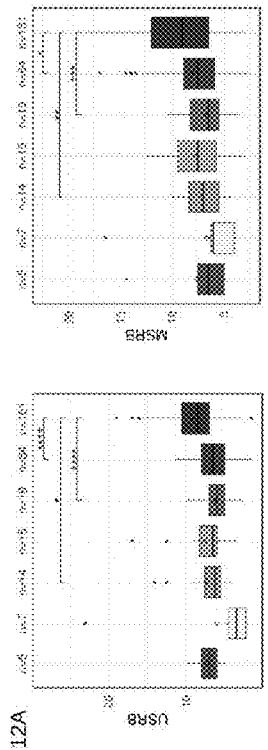
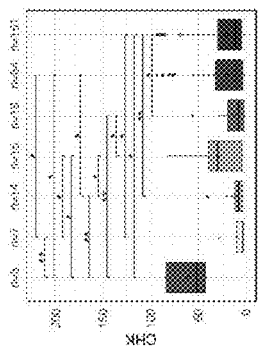
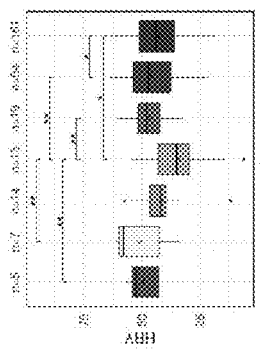
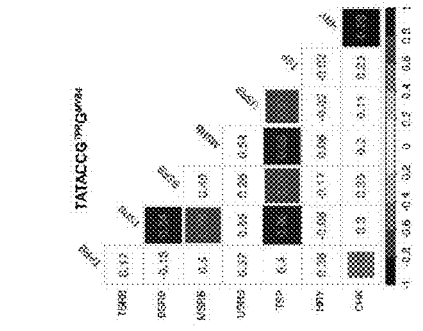
FIG. 12A
FIG. 12B
FIG. 12C
FIG. 12D Legend: TPR/MLP1/MLP2

```
AT1G79280   MPLFMPDEELARLSSDAASVVAERADEYIRKIYAELDSVRAKADAASITAEQTCSLLEQK  60
OsTPR       MPLFMSEEELRLLGGDVA-AVAERADAAIRELRQQVDTVRAEADAAAIAAEQTCALLEQR  59
            *****,:***  *,,*,* ,******  **;:  ;;*:***:****;*;****;****;

AT1G79280   YLSLSQDFSSLESQNAKLQSDFDDRLAELAQSQAQKHQLHLQSIEKDGEVERMSTEMSEL  120
OsTPR       YDTLSAEADRFRAELAELAAASERRAADLASSQSEIHQLRIQAIAKDGEIERLKVEISEV  119
            * ;**  ;  , ,,;;  *;*  ;  * *;**,**;;, ****;;*;;*  ****;:**;

AT1G79280   HKSKRQLMELLEQKDAEISEKNSTIKSYLDKIVKLTDTSSEKEARLAEATAELARSQAMC  180
OsTPR       HKSKQSLELIEQRDAEIREKDGIIQNYLDKIVNLADSSASKGARIQEVEAKFTHLQATC  179
            ****  * ;*;,**;**** **;, *; ******;*;*;*;, * **;  *; *;;:;; ** *

AT1G79280   SRLSQEKELTERHAKWLDEELTAKVDSYAELRRRHSDLESEMSAKLVDVEKNYIECSSSL  240
OsTPR       NRITQEKDLLEKHNLWLDEELKEKVKNLAELRKSNMDEEARMSAKVAELERETSESSSSL  239
            .*;;***;* *;;*  ******, **,, ****;  ; * *;,,**** ;;;;*;;  *,****

AT1G79280   NWHKERLRELETKIGSLQEDLSSCKDAATTTEEQYTAELFTANKLVDLYKESSEEWSRKA  300
OsTPR       RRSKERVSELEQRVSYMEKELCSTKDAAAANEQRLAAELSTVMKLAELHKESSEEWSKKA  299
            . ***; ***  ;;, ;;;;;*,* ****;;,*;; ;*** *, ** ;*;*********;**

AT1G79280   GELEGVIKALEARLSQVESSYKERLDKEVSTKQLLEKENGDLKQKLEKCEAEIEKTRKTD  360
OsTPR       GELEGVIKALETHLTQVEDEYKEKLEKETSAKRDLEMEATYLKQKLEKCESDLENTRKSS  359
            ***********;;*,****,,***;** *,*;;* **  *   ***********;;;*;***;;

AT1G79280   ELNLIPFSNFT--------RRVDNSGTSNMIEESQAVISKVPAGVSGTALAASLLRDGWSL  413
OsTPR       ELSFTPLVAADPCDLAGSPMKEMAFSDPANQNDLMIVPKVPTGVSGTALAASLLRDGWSL  419
            **,; *;         : ;   ;;,    ;;,,***;******************

AT1G79280   AKIYEKYQEAVDAMRHEQLGRKEAEMILQRVLSELEEKAGFIQEERGEYERVVEAYCLVN  473
OsTPR       AKIYEKYQEATDALRHERFGRRHAEAVLERVLHEIEEKAELILDERAEHRRMVEAYALMD  479
            **********;**;;***;;**;;**; *;****  *; ****; ;****;*, ;; ;**,*;;

AT1G79280   QKLQDSVSEQSNMEKFIMELKADLRRRERENTLLQKDISDLQKQVT---------------  519
OsTPR       QKLQQALLEHDNFENTIRNLKSELKRRERDHSIAQKEIDDLQKQIKLSIYLTFAPTQACI  539
            ****;;; *; *;*; * ;**;;;*;*** **;*;*****;;

AT1G79280   ----------------------------ILLKECRDVQLRCGAARDDDEDDYPLLSDVEMEMES  555
OsTPR       LGVCTSKNYYDINGNHCGAVLKIAVLLKECQDIQLRCGSSLPNVGDGALSTSTSTGVPEV  599
                                         ;*****;*;*****;;    ;  *,   *    *

AT1G79280   EADKIISEHLLKFKDINGLVEQNVKLRNLVRSLSEQIESRETELKETFEVDLKNKTDEAS  615
OsTPR       ENN---IHEHMTFNDINGLVQQNVQLRNQVHLLSADLDKRDMELRESFQIELKKITDDAA  656
            *  :      ,. ;;.;******;****;*; ** *;  ** ;;;,*; **;*;**;  **;*;

AT1G79280   AKVATVLKRAEEQGQMIESLHTSVAMYKRLYEEEQKLHSSDSRSSDLSPAVVPGRKNFLH  675
OsTPR       SRVEKVMKKSEEQAIMIESLHRSVAMYRKLCEEQQKSRSNVEHIPKN--LEDDGRKDLMV  714
            ;;*  ,*;*;;***, ****** *****;;** **;**  ;*,  ;,  ,,      ***;;;

AT1G79280   LLEDSEEATKRAQEKAFERIRILEEDFAKARSEVIAIRSERDKLAMEANFAREKLEGIMK  735
OsTPR       LFEGSQEVSRKAYEQVSERAKSLDEELTKLRTELLSLRSERDKAVLEAEFARERLNGFTA  774
            *;*.*;*.;;;;* *; ** ; *;*;;;* *;*;;;;******  ;**;*****;* ;*;

AT1G79280   ESERKREEMNSVLARNIEFSQLIIDHQRKLRESSESLHAAEEISRKLSMEVSVLKQEKEL  795
OsTPR       ELEHQRKEANSISLRNAELMHLVVDYEKRLRENSESMKAVEENSRKLLMEMSILKNEKEI  834
            *  *;;;;* **;  **;   **  *; ;****.***,***  .** **;**,;;;;**;*;
```

FIG. 15

```
AT1G79280    LSNAEKRASDEVSALSQRVYRLQATLDTVQSTEEVREETRAAERRKQEEHIKQLQREWAE  855
OsTPR        LAKSEKKALEEVHDLTTRVHRLQATIDTIHATEEVQENARSIERRNQEEYIKRLERDWAE  894
             *:;:**;*  :**    *;: **;*****;**;;;****;*;:*: ***;***;**;*;***

AT1G79280    AKKELQEERSNARDFTSDRNQTLNNAVMQVEEMGKELANALKAVSVAESRASVAEARLSD  915
OsTPR        VKKELQEQRDHVRVLTLDKKNAFDGCLKQVEDMRKELQNSWKAATDAESRAAVAEAKCSD  954
             ,******:*.::* ;*  *;::::;,; ***;* *** *; **,:: *****;****; **

AT1G79280    LEKKIRSSDPKTLDMDSGGIVSLSDKEAALVIILDVVHKIQAGFRIGSAMSIELRTAKEE  975
OsTPR        LETKLKSRKE---------------------------------------NDELFQLKEE  974
             **.*;;*  .                                        . **  ***

AT1G79280    IEKLRGEVESSKSHMLQYKSIAQVNETALKQMESAHENFRLEAEKRQRSLEAELVSLRER  1035
OsTPR        LEKYKEEAQANKSYMLQYKEIANSNESALKQMESALQDFKTESETIKKSLEDEITKLRTK  1034
             :**  :  *,;:.**;***** **; **;********   ;;*;  *;*.  ::;*** *:,,**  :

AT1G79280    VSELENDCIQKSEQLATAAAGKEDALLSASAEIASLREENLVKKSQIEAMNIQMSTLKND  1095
OsTPR        ISELEKCYIMKCEEAASAIEAKEKDTTSLMKEISVLRNEVSEKVIQIEKLETELASSKRA  1094
             ;****;  * *,*; *;*  .**,   *   **; **;*    *  *** ::  :::: *.,

AT1G79280    LETEHEKWRVAQRNYERQVILLSETIQELTKTSQALAALQEEASELRKLADARGIENSEL  1155
OsTPR        LDEQYKRWRSAQDNYERQVILQSETIQELTSASKELSSLQQEIIVLRQTVETQKAENDGL  1154
             *;: :;:;;:** ** ********* ******.;*;  *;;**;* **;  .::;   **. *

AT1G79280    NAKWSEEKLMLEQQKNLAEKKYHELNEQNKLLHSRLEAKHLNSAEKNSRSGTISSGSTDS  1215
OsTPR        RTLGEQEKIELVKGKDEALQKYNELNDQNKILHNQLEALHIRLAEKERNIAGLSSQRIDS  1214
             ,:   ,:**:  *  : *; :   *;**;***;**  ,;**** *;; , ;  ;** **

AT1G79280    DHLEDSGLQRVVHYLRRRTKEIAETEISLMRQEKLRLQSQLESALKMAESARGSLTAERAS  1275
OsTPR        HGEDD--LHSVIGYLRRSKEILESALKSTKEAQDLLRSQTDSAR------TSMLKDEEFK  1266
             . ;*   *;  *;  ;***;:****.*   *;  ;: ::  *;** :**            , *., *,.

AT1G79280    TRASLLTDDGIKSLQLQVSEMNLLRESNMQLREENKHNFEKCQEMREVAQKARMESENFE  1335
OsTPR        SLQFQLVFFCIKNALPQVRELNLLRESNIQLREENKHNFEECQKFHDEAQKAKMEAERLH  1326
             ;   *    **,  ** *;;******** ;**********;**:;;;  ****;**:*.,,

AT1G79280    NLLKTKQTELDLCMKEMEKLRMETDLHKKRVDELRETYRNIDIADYNRLKDEVRQLEEKL  1395
OsTPR        NLLLEKQVDAEICKKEIEMQKTEIANLNQKISELVENSRGVDLSTYETMKDELQNIKATL  1386
             ***    **; ;;;* **;*  ;  *   ::::;** *; *;:*; *;   ;****;;;;   .*

AT1G79280    KAKDAHAEDCKKVLLEKQNKISLLEKELTNCKKDLSEREKRLDDAQQAQATMQSEFNKQK  1455
OsTPR        RENSAELERTKKLLSEKDSVIRNLEEKLAGCQSELDAREKKLNDVEAS----------LK  1436
             ; ;.* . *  **;* **;. *  **;;*;;.*;;;* ***:*;*;,;   :             *

AT1G79280    QELEKNKKIHYTLNMTKRKYEKEKDELSKQNQSLAKQLEEAKEEAGKRTTTDAVVEQSVK  1515
OsTPR        SEIDRHRKININIKRKLDASAKEKEELTKEKQSLSKQLEDLKSS--KTTTENSNEQAIK  1494
             .*::::;;**; ,;::    *** ;**;**;*;;***;****** *;..  ;***;  **;;;*

AT1G79280    EREEKEKRIQILDKYVHQLKDEVRKKTEDLKKKDEELTKERSERKSVEKEVGDSLTKIKK  1575
OsTPR        E---KDFRIQTLEKVLEKERDDNKKEKAFRRRNEKVFTTAIQNMNQERKQVEESIEKHRQ  1551
             *   *; *** *;*  ;;: ;*;  :*;,    ;;;;;  ;*. .; ;. ;,  .*;; *;;  * :;

AT1G79280    EKTKVDEELAKLERYQTALTHLSEELEKLKHADGNLPEGTSAVQVLSGSILNDQAAAYVS  1635
OsTPR        AVKEVIEHYTGISSQIPSGSSAIDEQLRSYFLAIKAVEE--------SPSPFQDGAASQTP  1603
             .:* *;.: :,.   :: : ;.*:*.. * : *       * *  ::* **: ..

AT1G79280    AVEYFERVARSIASNSQVSTKP---TDMVTEPSSGIPAAEPSTMTRVPSSTPLIKSPVAT  1692
OsTPR        SVESADVDASAATAGRQVATPPRPAQVKVVEERAVSTLPKPSTEVRRPGGRRPLVRPSLE  1663
             ;** ;  * :;;. **;* *      *,*  ;     .  :.;***  .* *..  :   *
```

FIG. 15 Continued I

```
AT1G79280   TQQLPKVASDNKEKRLISQKPSTEFRRPSGRRIVRPQLVKPEESPKVDVDMPEAEGTGDE 1752
OsTPR       RVEEPQADIDTTVVEGSTEKGGLLMERETPGGVSALQPS----SRKRLIPSPQTRDDASQ 1719
             :*:. *..  . ::* .:.*  :   *    * *  : *::.. .:

AT1G79280   GKQPAAHEPESQVTTSVRPVQTLVRKRQADSLVSEPQQDSLTQGETSSEIAPPASKKAKG 1812
OsTPR       GETTDANPP-------------LKKPKEGSSQCTSELKTEQSPHEDVMAPVPVLPSTELD 1766
            *:  .*: *             * : ::..*  :.   : .: *    .*  .,  ..

AT1G79280   SESHPDTSEGENLAKEPAIDELMDATTTTDGDNEETEAENAEEKTEEYVEAQQDNEADEP 1872
OsTPR       EQQPGEEMDTDQSSLPVEEVEETREDDLGDKDDMETHIDASMDIQGQDAETGIDNDATT- 1825
            .:.   :   : ::: :     *        * *:.**.  : :    : .*: **:*

AT1G79280   VEESPTETETIPTEEESRDQTEEENQEPLTDMESDKEEGELDLDTLEDLEEGTDVASMMR 1932
OsTPR       VEDVPVKSEAVMESLEEDLKTEDGKEEGQFTATTDVED-EREEGELPDEPEQPDSTPPVL 1884
            **: *.::*:*:  . *.  :**: ::*     :* *: * . * *   *.* :. :

AT1G79280   SPEKEEVQPETLATPTQSPSRMETAMEEAETTIETPVEDDKTDEGGDAAEEAADIPNNAN 1992
OsTPR       DVGEQAGDSFRAASPAGPTEKSDVDMPEETGEGDGTMESDQSPVPQSGGADAS--PSQMA 1942
            .   ::  .:   *:*: ,,,:  .  * *         :  ,:*.*::    ,,, :*:  *.:

AT1G79280   DQQEAPETDIKPETSAATTSPVSTAPTTSSTLASAITSSGAPETEDPKRAPSPGGGSSTI 2052
OsTPR       DASPSPAREPSPNPVQAGAPPEQQNPTPPNPVQAGASSE---QQNPATAAEGVETRSTRT 1999
            *  .  :*   : *:.  *  :*.  **,....: :.  :*.       : :..  *.   *:

AT1G79280   VTLADRAQMKRRERIANIVVSRAPNPATRGARGRTVNLRGGGRLLPRGGRAPRGGRGQSP 2112
OsTPR       INLTERARQNRQARILRSATQQN----ARGRGNQSLTYRKDGGRGTRG----RGGRGQS- 2050
            :.*::**:. :*: **  . ,.::   :** ,:::, *,*  .** *******

AT1G79280   SPP 2115
OsTPR       --- 
```

FIG. 15 Continued

| | | |
|---|---|---|
| 10274 | MPLFMSEEELRLLGGDVAAVAERADAAIRELRQQVDTVRAEADAAAIAAEQTCALLEQRY | 60 |
| 10385 | MPLFMSEEELRLLGGDVAAVAERADAAIRELRQQVDTVRAEADAAAIAAEQTCALLEQRY | 60 |
| 9184 | MPLFMSEEELRLLGGDVAAVAERADAAIRELRQQVDTVRAEADAAAIAAEQTCALLEQRY | 60 |
| 8405 | MPLFMSEEELRLLGGDVAAVAERADAAIRELRQQVDTVRAEADAAAIAAEQTCALLEQRY | 60 |
| 8536 | MPLFMSEEELRLLGGDVAAVAERADAAIRELRQQVDTVRAEADAAAIAAEQTCALLEQRY | 60 |
| 8733 | MPLFMSEEELRLLGGDVAAVAERADAAIRELRQQVDTVRAEADAAAIAAEQTCALLEQRY | 60 |
| 9605 | MPLFMSEEELRLLGGDVAAVAERADAAIRELRQQVDTVRAEADAAAIAAEQTCALLEQRY | 60 |
| 9832 | MPLFMSEEELRLLGGDVAAVAERADAAIRELRQQVDTVRAEADAAAIAAEQTCALLEQRY | 60 |
| | ************************************************************ | |
| 10274 | DTLSAEADRFRAELAELAAASERRAADLASSQSEIHQLRIQAIAKDGEIERLKVEISEVH | 120 |
| 10385 | DTLSAEADRFRAELAELAAASERRAADLASSQSEIHQLRIQAIAKDGEIERLKVEISEVH | 120 |
| 9184 | DTLSAEADRFRAELAELAAASERRAADLASSQSEIHQLRIQAIAKDGEIERLKVEISEVH | 120 |
| 8405 | DTLSAEADRFRAELAELAAASERRAADLASSQSEIHQLRIQAIAKDGEIERLKVEISEVH | 120 |
| 8536 | DTLSAEADRFRAELAELAAASERRAADLASSQSEIHQLRIQAIAKDGEIERLKVEISEVH | 120 |
| 8733 | DTLSAEADRFRAELAELAAASERRAADLASSQSEIHQLRIQAIAKDGEIERLKVEISEVH | 120 |
| 9605 | DTLSAEADRFRAELAELAAASERRAADLASSQSEIHQLRIQAIAKDGEIERLKVEISEVH | 120 |
| 9832 | DTLSAEADRFRAELAELAAASERRAADLASSQSEIHQLRIQAIAKDGEIERLKVEISEVH | 120 |
| | ************************************************************ | |
| 10274 | KSKSQSLELIEQRDAEIREKDGIIQNYHDKIVNLADSSASKGARIQEVEAKFTHLQATCN | 180 |
| 10385 | KSKSQSLELIEQRDAEIREKDGIIQNYHDKIVNLADSSASKGARIQEVEAKFTHLQATCN | 180 |
| 9184 | KSKSQSLELIEQRDAEIREKDGIIQNYHDKIVNLADSSASKGARIQEVEAKFTHLQATCN | 180 |
| 8405 | KSKSQSLELIEQRDAEIREKDGIIQNYHDKIVNLADSSASKGARIQEVEAKFTHLQATCN | 180 |
| 8536 | KSKSQSLELIEQRDAEIREKDGIIQNYHDKIVNLADSSASKGARIQEVEAKFTHLQATCN | 180 |
| 8733 | KSKSQSLELIEQRDAEIREKDGIIQNYHDKIVNLADSSASKGARIQEVEAKFTHLQATCN | 180 |
| 9605 | KSKSQSLELIEQRDAEIREKDGIIQNYHDKIVNLADSSASKGARIQEVEAKFTHLQATCN | 180 |
| 9832 | KSKSQSLELIEQRDAEIREKDGIIQNYHDKIVNLADSSASKGARIQEVEAKFTHLQATCN | 180 |
| | ************************************************************ | |
| 10274 | RITQEKDLLEKHNLWLDEELKEKVKNLAELRKSNMDEEARMSAKVAELERETSESSSSLR | 240 |
| 10385 | RITQEKDLLEKHNLWLDEELKEKVKNLAELRKSNMDEEARMSAKVAELERETSESSSSLR | 240 |
| 9184 | RITQEKDLLEKHNLWLDEELKEKVKNLAELRKSNMDEEARMSAKVAELERETSESSSSLR | 240 |
| 8405 | RITQEKDLLEKHNLWLDEELKEKVKNLAELRKSNMDEEARMSAKVAELERETSESSSSLR | 240 |
| 8536 | RITQEKDLLEKHNLWLDEELKEKVKNLAELRKSNMDEEARMSAKVAELERETSESSSSLR | 240 |
| 8733 | RITQEKDLLEKHNLWLDEELKEKVKNLAELRKSNMDEEARMSAKVAELERETSESSSSLR | 240 |
| 9605 | RITQEKDLLEKHNLWLDEELKEKVKNLAELRKSNMDEEARMSAKVAELERETSESSSSLR | 240 |
| 9832 | RITQEKDLLEKHNLWLDEELKEKVKNLAELRKSNMDEEARMSAKVAELERETSESSSSLR | 240 |
| | ************************************************************ | |
| 10274 | RSKERVSELEQRVSYMEKELCSTKDAAAANEQRLAAELSTVMKLAELHKESSEEWSKKAG | 300 |
| 10385 | RSKERVSELEQRVSYMEKELCSTKDAAAANEQRLAAELSTVMKLAELHKESSEEWSKKAG | 300 |
| 9184 | RSKERVSELEQRVSYMEKELCSTKDAAAANEQRLAAELSTVMKLAELHKESSEEWSKKAG | 300 |
| 8405 | RSKERVSELEQRVSYMEKELCSTKDAAAANEQRLAAELSTVMKLAELHKESSEEWSKKAG | 300 |
| 8536 | RSKERVSELEQRVSYMEKELCSTKDAAAANEQRLAAELSTVMKLAELHKESSEEWSKKAG | 300 |
| 8733 | RSKERVSELEQRVSYMEKELCSTKDAAAANEQRLAAELSTVMKLAELHKESSEEWSKKAG | 300 |
| 9605 | RSKERVSELEQRVSYMEKELCSTKDAAAANEQRLAAELSTVMKLAELHKESSEEWSKKAG | 300 |
| 9832 | RSKKRVSELEQRVSYMEKELCSTKDAAAANEQRLAAELSTVMKLAELHKESSEEWSKKAG | 300 |
| | *.****************************************************** | |
| 10274 | ELEGVIKALETHLTQVEDEYKEKLEKETSAKRDLEMEATYLKQKLEKCESDLENTRKSSE | 360 |
| 10385 | ELEGVIKALETHLTQVEDEYKEKLEKETSAKRDLEMEATYLKQKLEKCESDLENTRKSSE | 360 |
| 9184 | ELEGVIKALETHLTQVEDEYKEKLEKETSAKRDLEMEATYLKQKLEKCESDLENTRKSSE | 360 |
| 8405 | ELEGVIKALETHLTQVEDEYKEKLEKETSAKRDLEMEATYLKQKLEKCESDLENTRKSSE | 360 |
| 8536 | ELEGVIKALETHLTQVEDEYKEKLEKETSAKRDLEMEATYLKQKLEKCESDLENTRKSSE | 360 |
| 8733 | ELEGVIKALETHLTQVEDEYKEKLEKETSAKRDLEMEATYLKQKLEKCESDLENTRKSSE | 360 |
| 9605 | ELEGVIKALETHLTQVEDEYKEKLEKETSAKRDLEMEATYLKQKLEKCESDLENTRKSSE | 360 |
| 9832 | ELEGVIKALETHLTQVEDEYKEKLEKETSAKRDLEMEATYLKQKLEKCESDLENTRKSSE | 360 |
| | ************************************************************ | |

FIG. 16

```
10274    LSFTPLVAADPCDLAGSPMKEMAFSDPANQNDLMIVPKVPTGVSGTALAASLLRDGWSLA    420
10385    LSFTPLVAADPCDLAGSPMKEMAFSDPANQNDLMIVPKVPTGVSGTALAASLLRDGWSLA    420
9184     LSFTPLVAADPCDLAGSPMKEMAFSDPANQNDLMIVPKVPTGVSGTALAASLLRDGWSLA    420
8405     LSFTPLVAADPCDLAGSPMKEMAFSDPANQNDLMIVPKVPTGVSGTALAASLLRDGWSLA    420
8536     LSFTPLVAADPCDLAGSPMKEMAFSDPANQNDLMIVPKVPTGVSGTALAASLLRDGWSLA    420
8733     LSFTPLVAADPCDLAGSPMKEMAFSDPANQNDLMIVPKVPTGVSGTALAASLLRDGWSLA    420
9605     LSFTPLVAADPCDLAGSPMKEMAFSDPANQNDLMIVPKVPTGVSGTALAASLLRDGWSLA    420
9832     LSFTPLVAADPCDLAGSPMKEMAFSDPANQNDLMIVPKVPTGVSGTALAASLLRDGWSLA    420
         ************************************************************

10274    KIYEKYQEATDALRHERFGRRHAEAVLERVLHEIEEKAELILDERAEHRRMVEAYALMDQ    480
10385    KIYEKYQEATDALRHERFGRRHAEAVLERVLHEIEEKAELILDERAEHRRMVEAYALMDQ    480
9184     KIYEKYQEATDALRHERFGRRHAEAVLERVLHEIEEKAELILDERAEHRRMVEAYALMDQ    480
8405     KIYEKYQEATDALRHERFGRRHAEAVLERVLHEIEEKAELILDERAEHRRMVEAYALMDQ    480
8536     KIYEKYQEATDALRHERFGRRHAEAVLERVLHEIEEKAELILDERAEHRRMVEAYALMDQ    480
8733     KIYEKYQEATDALRHERFGRRHAEAVLERVLHEIEEKAELILDERAEHRRMVEAYALMDQ    480
9605     KIYEKYQEATDALRHERFGRRHAEAVLERVLHEIEEKAELILDERAEHRRMVEAYALMDQ    480
9832     KIYEKYQEATDALRHERFGRRHAEAVLERVLHEIEEKAELILDERAEHRRMVEAYALMDQ    480
         ************************************************************

10274    KLQQALLEHDNFENTIRNLKSELKRRERDHSIAQKEIDDLQKQIKLSIYLTFAPTQACIL    540
10385    KLQQALLEHDNFENTIRNLKSELKRRERDHSIAQKEIDDLQKQIKLSIYLTFAPTQACIL    540
9184     KLQQALLEHDNFENTIRNLKSELKRRERDHSIAQKEIDDLQKQIKLSIYLTFAPTQACIL    540
8405     KLQQALLEHDNFENTIRNLKSELKRRERDHSIAQKEIDDLQKQIKLSIYLTFAPTQACIL    540
8536     KLQQALLEHDNFENTIRNLKSELKRRERDHSIAQKEIDDLQKQIKLSIYLTFAPTQACIL    540
8733     KLQQALLEHDNFENTIRNLKSELKRRERDHSIAQKEIDDLQKQIKLSIYLTFAPTQACIL    540
9605     KLQQALLEHDNFENTIRNLKSELKRRERDHSIAQKEIDDLQKQIKLSIYLTFAPTQACIL    540
9832     KLQQALLEHDNFENTIRNLKSELKRRERDHSIAQKEIDDLQKQIKLSIYLTFAPTQACIL    540
         ************************************************************

10274    GVCTSKNYYDINGNHCGAVLKIAVLLKECQDIQLRCGSSLPNVGDGALSTSTSTGVPEVE    600
10385    GVCTSKNYYDINGNHCGAVLKIAVLLKECQDIQLRCGSSLPNVGDGALSTSTSTGVPEVE    600
9184     GVCTSKNYYDINGNHCGAVLKIAVLLKECQDIQLRCGSSLPNVGDGALSTSTSTGVPEVE    600
8405     GVCTSKNYYDINGNHCGAVLKIAVLLKECQDIQLRCGSSLPNVGDGALSTSTSTGVPEVE    600
8536     GVCTSKNYYDINGNHCGAVLKIAVLLKECQDIQLRCGSILPNVGDGALSTSTSTGVPEVE    600
8733     GVCTSKNYYDINGNHCGAVLKIAVLLKECQDIQLRCGSILPNVGDGALSTSTSTGVPEVE    600
9605     GVCTSKNYYDINGNHCGAVLKIAVLLKECQDIQLRCGSILPNVGDGALSTSTSTGVPEVE    600
9832     GVCTSKNYYDINGNHCGAVLKIAVLLKECQDIQLRCGSILPNVGDGALSTSTSTGVPEVE    600
         ************************************** *********************

10274    NNIHEHMTFNDINGLVQQNVQLRNQVHLLSADLDKRDMELRESFQIELKKITDDAASRVE    660
10385    NNIHEHMTFNDINGLVQQNVQLRNQVHLLSADLDKRDMELRESFQIELKKITDDAASRVE    660
9184     NNIHEHMTFNDINGLVQQNVQLRNQVHLLSADLDKRDMELRESFQIELKKITDDAASRVE    660
8405     NNIHEHMTFNDINGLVQQNVQLRNQVHLLSADLDKRDMELRESFQIELKKITDDAASRVE    660
8536     NNIHEHMTFNDINGLVQQNVQLRNQVHLLSADLDKRDMELRESFQIELKKITDDAASRVE    660
8733     NNIHEHMTFNDINGLVQQNVQLRNQVHLLSADLDKRDMELRESFQIELKKITDDAASRVE    660
9605     NNIHEHMTFNDINGLVQQNVQLRNQVHLLSADLDKRDMELRESFQIELKKITDDAASRVE    660
9832     NNIHEHMTFNDINGLVQQNVQLRNQVHLLSADLDKRDMELRESFQIELKKITDDAASRVE    660
         ************************************************************ snp_02_31026954(G>C):Glu>Gln
10274    KVMKKSEEQAIMIESLHRSVAMYRKLCQEQQKSRSNVEHIPKNLEDDGRKDLMVLFEGSQ    720
10385    KVMKKSEEQAIMIESLHRSVAMYRKLCQEQQKSRSNVEHIPKNLEDDGRKDLMVLFEGSQ    720
9184     KVMKKSEEQAIMIESLHRSVAMYRKLCQEQQKSRSNVEHIPKNLEDDGRKDLMVLFEGSQ    720
8405     KVMKKSEEQAIMIESLHRSVAMYRKLCQEQQKSRSNVEHIPKNLEDDGRKDLMVLFEGSQ    720
8536     KVMKKSEEQAIMIESLHRSVAMYRKLCEEQQKSRSNVEHIPKNLEDDGRKDLMVLFEGSQ    720
8733     KVMKKSEEQAIMIESLHRSVAMYRKLCEEQQKSRSNVEHIPKNLEDDGRKDLMVLFEGSQ    720
9605     KVMKKSEEQAIMIESLHRSVAMYRKLCEEQQKSRSNVEHIPKNLEDDGRKDLMVLFEGSQ    720
9832     KVMKKSEEQAIMIESLHRSVAMYRKLCEEQQKSRSNVEHIPKNLEDDGRKDLMVLFEGSQ    720
         **************************:*********************************
```

FIG. 16 Continued 1

```
                                                                           snp_02_31024549(G>A):Glu>Lys
10274    EVSRKAYEQVSERAKSLDEELTKLRTELLSLRSERDKAVLEAEFARERLNGFTAELEHQR 780
10385    EVSRKAYEQVSERAKSLDEELTKLRTELLSLRSERDKAVLEAEFARERLNGFTAELEHQR 780
9184     EVSRKAYEQVSERAKSLDEELTKLRTELLSLRSERDKAVLEAEFARERLNGFTAELEHQR 780
8405     EVSRKAYEQVSERAKSLDEELTKLRTELLSLRSERDKAVLEAEFARERLNGFTAELEHQR 780
8536     EVSRKAYEQVSERAKSLDEELTKLRTELLSLRSERDKAVLEAEFARERLNGFTAELEHQR 780
8733     EVSRKAYEQVSERAKSLDEELTKLRTELLSLRSERDKAVLEAEFARERLNGFTAELEHQR 780
9605     EVSRKAYEQVSERAKSLDEELTKLRTELLSLRSERDKAVLEAEFARERLNGFTAELEHQR 780
9832     EVSRKAYEQVSERAKSLDEELTKLRTELLSLRSERDKAVLEAEFARERLNGFTAELEHQR 780
         ************************************************************

10274    KEANSISLRNAELMHLVVDYEKRLRENSESMKAVEENSRKLLMEMSILKNEKEILAKSEK 840
10385    KEANSISLRNAELMHLVVDYEKRLRENSESMKAVEENSRKLLMEMSILKNEKEILAKSEK 840
9184     KEANSISLRNAELMHLVVDYEKRLRENSESMKAVEENSRKLLMEMSILKNEKEILAKSEK 840
8405     KEANSISLRNAELMHLVVDYEKRLRENSESMKAVEENSRKLLMEMSILKNEKEILAKSEK 840
8536     KEANSISLRNAELMHLVVDYEKRLRENSESMKAVEENSRKLLMKMSILKNEKEILAKSEK 840
8733     KEANSISLRNAELMHLVVDYEKRLRENSESMKAVEENSRKLLMKMSILKNEKEILAKSEK 840
9605     KEANSISLRNAELMHLVVDYEKRLRENSESMKAVEENSRKLLMKMSILKNEKEILAKSEK 840
9832     KEANSISLRNAELMHLVVDYEKRLRENSESMKAVEENSRKLLMKMSILKNEKEILAKSEK 840
         *******************************************.****************

10274    KALEEVHDLTTRVHRLQATIDTIHATEEVQENARSIERRNQEEYIKRLERDWAEVKKELQ 900
10385    KALEEVHDLTTRVHRLQATIDTIHATEEVQENARSIERRNQEEYIKRLERDWAEVKKELQ 900
9184     KALEEVHDLTTRVHRLQATIDTIHATEEVQENARSIERRNQEEYIKRLERDWAEVKKELQ 900
8405     KALEEVHDLTTRVHRLQATIDTIHATEEVQENARSIERRNQEEYIKRLERDWAEVKKELQ 900
8536     KALEEVHDLTTRVHRLQATIDTIHATEEVQENARSIERRNQEEYIKRLERDWAEVKKELQ 900
8733     KALEEVHDLTTRVHRLQATIDTIHATEEVQENARSIERRNQEEYIKRLERDWAEVKKELQ 900
9605     KALEEVHDLTTRVHRLQATIDTIHATEEVQENARSIERRNQEEYIKRLERDWAEVKKELQ 900
9832     KALEEVHDLTTRVHRLQATIDTIHATEEVQENARSIERRNQEEYIKRLERDWAEVKKELQ 900
         ************************************************************ snp_02_31023080(T>A):Leu>Met
10274    EQRDHVRVLTLDKKNAFDGCLKQVEDMRKELQNSWKAATDAESRAAVAEAKCSDMETKLK 960
10385    EQRDHVRVLTLDKKNAFDGCLKQVEDMRKELQNSWKAATDAESRAAVAEAKCSDMETKLK 960
9184     EQRDHVRVLTLDKKNAFDGCLKQVEDMRKELQNSWKAATDAESRAAVAEAKCSDMETKLK 960
8405     EQRDHVRVLTLDKKNAFDGCLKQVEDMRKELQNSWKAATDAESRAAVAEAKCSDMETKLK 960
8536     EQRDHVRVLTLDKKNAFDGCLKQVEDMRKELQNSWKAATDAESRAAVAEAKCSDLETKLK 960
8733     EQRDHVRVLTLDKKNAFDGCLKQVEDMRKELQNSWKAATDAESRAAVAEAKCSDLETKLK 960
9605     EQRDHVRVLTLDKKNAFDGCLKQVEDMRKELQNSWKAATDAESRAAVAEAKCSDLETKLK 960
9832     EQRDHVRVLTLDKKNAFDGCLKQVEDMRKELQNSWKAATDAESRAAVAEAKCSDLETKLK 960
         *****************************************************.*****

10274    SRKENDELFQLKEELEKYKEEAQANKSYMLQYKEIANSNESALKQMESALQDFKTESETI 1020
10385    SRKENDELFQLKEELEKYKEEAQANKSYMLQYKEIANSNESALKQMESALQDFKTESETI 1020
9184     SRKENDELFQLKEELEKYKEEAQANKSYMLQYKEIANSNESALKQMESALQDFKTESETI 1020
8405     SRKENDELFQLKEELEKYKEEAQANKSYMLQYKEIANSNESALKQMESALQDFKTESETI 1020
8536     SRKENDELFQLKEELEKYKEEAQANKSYMLQYKEIANSNESALKQMESALQDFKTESETI 1020
8733     SRKENDELFQLKEELEKYKEEAQANKSYMLQYKEIANSNESALKQMESALQDFKTESETI 1020
9605     SRKENDELFQLKEELEKYKEEAQANKSYMLQYKEIANSNESALKQMESALQDFKTESETI 1020
9832     SRKENDELFQLKEELEKYKEEAQANKSYMLQYKEIANSNESALKQMESALQDFKTESETI 1020
         ************************************************************

10274    KKSLEDEITKLRTKISELEKCYIMKCEEAASAIEAKEKDTTSLMKEISVLRNEVSEKVIQ 1080
10385    KKSLEDEITKLRTKISELEKCYIMKCEEAASAIEAKEKDTTSLMKEISVLRNEVSEKVIQ 1080
9184     KKSLEDEITKLRTKISELEKCYIMKCEEAASAIEAKEKDTTSLMKEISVLRNEVSEKVIQ 1080
8405     KKSLEDEITKLRTKISELEKCYIMKCEEAASAIEAKEKDTTSLMKEISVLRNEVSEKVIQ 1080
8536     KKSLEDEITKLRTKISELEKCYIMKCEEAASAIEAKEKDTTSLMKEISVLRNEVSEKVIQ 1080
8733     KKSLEDEITKLRTKISELEKCYIMKCEEAASAIEAKEKDTTSLMKEISVLRNEVSEKVIQ 1080
9605     KKSLEDEITKLRTKISELEKCYIMKCEEAASAIEAKEKDTTSLMKEISVLRNEVSEKVIQ 1080
9832     KKSLEDEITKLRTKISELEKCYIMKCEEAASAIEAKEKDTTSLMKEISVLRNEVSEKVIQ 1080
         ************************************************************
```

FIG. 16 Continued 2

```
10274    IEKLETELASSKRALDEQYKRWRSAQDNYERQVILQSETIQELTSASKELSSLQQEIIVL 1140
10385    IEKLETELASSKRALDEQYKRWRSAQDNYERQVILQSETIQELTSASKELSSLQQEIIVL 1140
9184     IEKLETELASSKRALDEQYKRWRSAQDNYERQVILQSETIQELTSASKELSSLQQEIIVL 1140
8405     IEKLETELASSKRALDEQYKRWRSAQDNYERQVILQSETIQELTSASKELSSLQQEIIVL 1140
8536     IEKLETELASSKRALDEQYKRWRSAQDNYERQVILQSETIQELTSASKELSSLQQEIIVL 1140
8733     IEKLETELASSKRALDEQYKRWRSAQDNYERQVILQSETIQELTSASKELSSLQQEIIVL 1140
9605     IEKLETELASSKRALDEQYKRWRSAQDNYERQVILQSETIQELTSASKELSSLQQEIIVL 1140
9832     IEKLETELASSKRALDEQYKRWRSAQDNYERQVILQSETIQELTSASKELSSLQQEIIVL 1140
         ************************************************************ snp_02_31019010(A>C):Gln>His
10274    RQTVETQKAENDGLRTLGEQEKIELVKGKDEALQKYNELNDQNKILHNQLEALHIRLAEK 1200
10385    RQTVETQKAENDGLRTLGEQEKIELVKGKDEALQKYNELNDQNKILHNQLEALHIRLAEK 1200
9184     RQTVETQKAENDGLRTLGEQEKIELVKGKDEALQKYNELNDQNKILHNQLEALHIRLAEK 1200
8405     RQTVETQKAENDGLRTLGEQEKIELVKGKDEALQKYNELNDQNKILHNQLEALHIRLAEK 1200
8536     RQTVETQKAENDGLRTLGEHEKIELVKGKDEALQKYNELNDQNKILHNQLEALHIRLAEK 1200
8733     RQTVETQKAENDGLRTLGEHEKIELVKGKDEALQKYNELNDQNKILHNQLEALHIRLAEK 1200
9605     RQTVETQKAENDGLRTLGEHEKIELVKGKDEALQKYNELNDQNKILHNQLEALHIRLAEK 1200
9832     RQTVETQKAENDGLRTLGEHEKIELVKGKDEALQKYNELNDQNKILHNQLEALHIRLAEK 1200
         *******************:****************************************

10274    ERNIAGLSSQRIDSHGEDDLHSVIGYLRRSKEILESALKSTKEAQDLLRSQTDSARTSML 1260
10385    ERNIAGLSSQRIDSHGEDDLHSVIGYLRRSKEILESALKSTKEAQDLLRSQTDSARTSML 1260
9184     ERNIAGLSSQRIDSHGEDDLHSVIGYLRRSKEILESALKSTKEAQDLLRSQTDSARTSML 1260
8405     ERNIAGLSSQRIDSHGEDDLHSVIGYLRRSKEILESALKSTKEAQDLLRSQTDSARTSML 1260
8536     ERNIAGLSSQRIDSHGEDDLHSVIGYLRRSKEILESALKSTKEAQDLLRSQTDSARTSML 1260
8733     ERNIAGLSSQRIDSHGEDDLHSVIGYLRRSKEILESALKSTKEAQDLLRSQTDSARTSML 1260
9605     ERNIAGLSSQRIDSHGEDDLHSVIGYLRRSKEILESALKSTKEAQDLLRSQTDSARTSML 1260
9832     ERNIAGLSSQRIDSHGEDDLHSVIGYLRRSKEILESALKSTKEAQDLLRSQTDSARTSML 1260
         ************************************************************

10274    KDEEFKSLQFQVRELNLLRESNIQLREENKHNFEECQKFHDEAQKAKMEAERLHNLLLEK 1320
10385    KDEEFKSLQFQVRELNLLRESNIQLREENKHNFEECQKFHDEAQKAKMEAERLHNLLLEK 1320
9184     KDEEFKSLQFQVRELNLLRESNIQLREENKHNFEECQKFHDEAQKAKMEAERLHNLLLEK 1320
8405     KDEEFKSLQFQVRELNLLRESNIQLREENKHNFEECQKFHDEAQKAKMEAERLHNLLLEK 1320
8536     KDEEFKSLQFQVRELNLLRESNIQLREENKHNFEECQKFHDEAQKAKMEAERLHNLLLEK 1320
8733     KDEEFKSLQFQVRELNLLRESNIQLREENKHNFEECQKFHDEAQKAKMEAERLHNLLLEK 1320
9605     KDEEFKSLQFQVRELNLLRESNIQLREENKHNFEECQKFHDEAQKAKMEAERLHNLLLEK 1320
9832     KDEEFKSLQFQVRELNLLRESNIQLREENKHNFEECQKFHDEAQKAKMEAERLHNLLLEK 1320
         ************************************************************

10274    QVDAEICKKEIEMQKTEIANLNQKISELVENSRGVDLSTYETMKDELQNIKATLRENSAE 1380
10385    QVDAEICKKEIEMQKTEIANLNQKISELVENSRGVDLSTYETMKDELQNIKATLRENSAE 1380
9184     QVDAEICKKEIEMQKTEIANLNQKISELVENSRGVDLSTYETMKDELQNIKATLRENSAE 1380
8405     QVDAEICKKEIEMQKTEIANLNQKISELVENSRGVDLSTYETMKDELQNIKATLRENSAE 1380
8536     QVDAEICKKEIEMQKTEIANLNQKISELVENSRGVDLSTYETMKDELQNIKATLRENSAE 1380
8733     QVDAEICKKEIEMQKTEIANLNQKISELVENSRGVDLSTYETMKDELQNIKATLRENSAE 1380
9605     QVDAEICKKEIEMQKTEIANLNQKISELVENSRGVDLSTYETMKDELQNIKATLRENSAE 1380
9832     QVDAEICKKEIEMQKTEIANLNQKISELVENSRGVDLSTYETMKDELQNIKATLRENSAE 1380
         ************************************************************ snp_02_31013745(T>C):Val>Ala
10274    LERTKKLLSEKDSVIRNLEEKLAGCLSELDAREKKLNDVEASLKSEIDRHRKININIKRK 1440
10385    LERTKKLLSEKDSVIRNLEEKLAGCLSELDAREKKLNDVEASLKSEIDRHRKININIKRK 1440
9184     LERTKKLLSEKDSVIRNLEEKLAGCLSELDAREKKLNDVEASLKSEIDRHRKININIKRK 1440
8405     LERTKKLLSEKDSVIRNLEEKLAGCLSELDAREKKLNDVEASLKSEIDRHRKININIKRK 1440
8536     LERTKKLLSEKDSVIRNLEEKLAGCLSELDAREKKLNDAEASLKSEIDRHRKININIKRK 1440
8733     LERTKKLLSEKDSVIRNLEEKLAGCLSELDAREKKLNDAEASLKSEIDRHRKININIKRK 1440
9605     LERTKKLLSEKDSVIRNLEEKLAGCLSELDAREKKLNDAEASLKSEIDRHRKININIKRK 1440
9832     LERTKKLLSEKDSVIRNLEEKLAGCLSELDAREKKLNDAEASLKSEIDRHRKININIKRK 1440
         *************************************,**********************
```

FIG. 16 Continued 3

```
10274    LDASAKEKEELTKEKQSLSKQLEDLKSSQKTTTENSNEQAIKEKDFRIQTLEKVLEKERD 1500
10385    LDASAKEKEELTKEKQSLSKQLEDLKSSQKTTTENSNEQAIKEKDFRIQTLEKVLEKERD 1500
9184     LDASAKEKEELTKEKQSLSKQLEDLKSSQKTTTENSNEQAIKEKDFRIQTLEKVLEKERD 1500
8405     LDASAKEKEELTKEKQSLSKQLEDLKSSQKTTTENSNEQAIKEKDFRIQTLEKVLEKERD 1500
8536     LDASAKEKEELTKEKQSLSKQLEDLKSSQKTTTENSNEQAIKEKDFRIQTLEKVLEKERD 1500
8733     LDASAKEKEELTKEKQSLSKQLEDLKSSQKTTTENSNEQAIKEKDFRIQTLEKVLEKERD 1500
9605     LDASAKEKEELTKEKQSLSKQLEDLKSSQKTTTENSNEQAIKEKDFRIQTLEKVLEKERD 1500
9832     LDASAKEKEELTKEKQSLSKQLEDLKSSQKTTTENSNEQAIKEKDFRIQTLEKVLEKERD 1500
         ************************************************************

10274    DNKKEKAFRRRNEKVFTTAIQNMNQERKQVEESIEKHRQAVKEVIEHYTGISSQIPSGSA 1560
10385    DNKKEKAFRRRNEKVFTTAIQNMNQERKQVEESIEKHRQAVKEVIEHYTGISSQIPSGSA 1560
9184     DNKKEKAFRRRNEKVFTTAIQNMNQERKQVEESIEKHRQAVKEVIEHYTGISSQIPSGSA 1560
8405     DNKKEKAFRRRNEKVFTTAIQNMNQERKQVEESIEKHRQAVKEVIEHYTGISSQIPSGSA 1560
8536     DNKKEKAFRRRNEKVFTTAIQNMNQERKQVEESIEKHRQAVKEVIEHYTGISSQIPSGSA 1560
8733     DNKKEKAFRRRNEKVFTTAIQNMNQERKQVEESIEKHRQAVKEVIEHYTGISSQIPSGSA 1560
9605     DNKKEKAFRRRNEKVFTTAIQNMNQERKQVEESIEKHRQAVKEVIEHYTGISSQIPSGSA 1560
9832     DNKKEKAFRRRNEKVFTTAIQNMNQERKQVEESIEKHRQAVKEVIEHYTGISSQIPSGSA 1560
         ************************************************************

10274    IDEQLRSYFLAIKAVEESPSPFQDGAASQTPSVESADVDASAATAGRQVATPPRPAQVKV 1620
10385    IDEQLRSYFLAIKAVEESPSPFQDGAASQTPSVESADVDASAATAGRQVATPPRPAQVKV 1620
9184     IDEQLRSYFLAIKAVEESPSPFQDGAASQTPSVESADVDASAATAGRQVATPPRPAQVKV 1620
8405     IDEQLRSYFLAIKAVEESPSPFQDGAASQTPSVESADVDASAATAGRQVATPPRPAQVKV 1620
8536     IDEQLRSYFLAIKAVEESPSPFQDGAASQTPSVESADVDASAATAGRQVATPPRPAQVKV 1620
8733     IDEQLRSYFLAIKAVEESPSPFQDGAASQTPSVESADVDASAATAGRQVATPPRPAQVKV 1620
9605     IDEQLRSYFLAIKAVEESPSPFQDGAASQTPSVESADVDASAATAGRQVATPPRPAQVKV 1620
9832     IDEQLRSYFLAIKAVEESPSPFQDGAASQTPSVESADVDASAATAGRQVATPPRPAQVKV 1620
         ************************************************************

10274    VEERAVSTLPKPSTEVRRPGGRRPLVRPSLERVEEPQADIDTTVVEGSTEKGGLLMERET 1680
10385    VEERAVSTLPKPSTEVRRPGGRRPLVRPSLERVEEPQADIDTTVVEGSTEKGGLLMERET 1680
9184     VEERAVSTLPKPSTEVRRPGGRRPLVRPSLERVEEPQADIDTTVVEGSTEKGGLLMERET 1680
8405     VEERAVSTLPKPSTEVRRPGGRRPLVRPSLERVEEPQADIDTTVVEGSTEKGGLLMERET 1680
8536     VEERAVSTLPKPSTEVRRPGGRRPLVRPSLERVEEPQADIDTTVVEGSTEKGGLLMERET 1680
8733     VEERAVSTLPKPSTEVRRPGGRRPLVRPSLERVEEPQADIDTTVVEGSTEKGGLLMERET 1680
9605     VEERAVSTLPKPSTEVRRPGGRRPLVRPSLERVEEPQADIDTTVVEGSTEKGGLLMERET 1680
9832     VEERAVSTLPKPSTEVRRPGGRRPLVRPSLERVEEPQADIDTTVVEGSTEKGGLLMERET 1680
         ************************************************************

10274    PGGVSALQPSSRKRLIPSPQMRDDASQGETTDANPPLKKPKEGSSQGTSELKTEQSPHED 1740
10385    PGGVSALQPSSRKRLIPSPQMRDDASQGETTDANPPLKKPKEGSSQGTSELKTEQSPHED 1740
9184     PGGVSALQPSSRKRLIPSPQMRDDASQGETTDANPPLKKPKEGSSQGTSELKTEQSPHED 1740
8405     PGGVSALQPSSRKRLIPSPQMRDDASQGETTDANPPLKKPKEGSSQGTSELKTEQSPHED 1740
8536     PGGVSALQPSSRKRLIPSPQMRDDASQGETTDANPPLKKPKEGSSQGTSELKTEQSPHED 1740
8733     PGGVSALQPSSRKRLIPSPQMRDDASQGETTDANPPLKKPKEGSSQGTSELKTEQSPHED 1740
9605     PGGVSALQPSSRKRLIPSPQMRDDASQGETTDANPPLKKPKEGSSQGTSELKTEQSPHED 1740
9832     PGGVSALQPSSRKRLIPSPQMRDDASQGETTDANPPLKKPKEGSSQGTSELKTEQSPHED 1740
         ************************************************************ snp_02_31010249(A>T):Met>Leu
10274    VMAPVPVLPSTELDEQQPGEEMDTDQSSLPVEEVEETREDDLGDKDDMETHMDASMDIQG 1800
10385    VMAPVPVLPSTELDEQQPGEEMDTDQSSLPVEEVEETREDDLGDKDDMETHMDASMDIQG 1800
9184     VMAPVPVLPSTELDEQQPGEEMDTDQSSLPVEEVEETREDDLGDKDDMETHMDASMDIQG 1800
8405     VMAPVPVLPSTELDEQQPGEEMDTDQSSLPVEEVEETREDDLGDKDDMETHMDASMDIQG 1800
8536     VMAPVPVLPSTELDEQQPGEEMDTDQSSLPVEEVEETREDDLGDKDDMETHMDASLDIQG 1800
8733     VMAPVPVLPSTELDEQQPGEEMDTDQSSLPVEEVEETREDDLGDKDDMETHMDASLDIQG 1800
9605     VMAPVPVLPSTELDEQQPGEEMDTDQSSLPVEEVEETREDDLGDKDDMETHMDASLDIQG 1800
9832     VMAPVPVLPSTELDEQQPGEEMDTDQSSLPVEEVEETREDDLGDKDDMETHMDASLDIQG 1800
         *********************************************************:****
```

FIG. 16 Continued 4

```
10274       QDAETGIDNDATTVEDVPVKSEAVMESLEEDLKTEDGKEEGQFTATTDVEDEREEGELPD  1860
10385       QDAETGIDNDATTVEDVPVKSEAVMESLEEDLKTEDGKEEGQFTATTDVEDEREEGELPD  1860
9184        QDAETGIDNDATTVEDVPVKSEAVMESLEEDLKTEDGKEEGQFTATTDVEDEREEGELPD  1860
8405        QDAETGIDNDATTVEDVPVKSEAVMESLEEDLKTEDGKEEGQFTATTDVEDEREEGELPD  1860
8536        QDAETGIDNDATTVEDVPVKSEAVMESLEEDLKTEDGKEEGQFTATTDVEDEREEGELPD  1860
8733        QDAETGIDNDATTVEDVPVKSEAVMESLEEDLKTEDGKEEGQFTATTDVEDEREEGELPD  1860
9605        QDAETGIDNDATTVEDVPVKSEAVMESLEEDLKTEDGKEEGQFTATTDVEDEREEGELPD  1860
9832        QDAETGIDNDATTVEDVPVKSEAVMESLEEDLKTEDGKEEGQFTATTDVEDEREEGELPD  1860
            ************************************************************

10274       EPEQPDSTPPVLDVGEQAGDSFRAASPAGPTEKSDVDMPEETGEGDGTMESDQSPVPQSG  1920
10385       EPEQPDSTPPVLDVGEQAGDSFRAASPAGPTEKSDVDMPEETGEGDGTMESDQSPVPQSG  1920
9184        EPEQPDSTPPVLDVGEQAGDSFRAASPAGPTEKSDVDMPEETGEGDGTMESDQSPVPQSG  1920
8405        EPEQPDSTPPVLDVGEQAGDSFRAASPAGPTEKSDVDMPEETGEGDGTMESDQSPVPQSG  1920
8536        EPEQPDSTPPVLDVGEQAGDSFRAASPAGPTEKSDVDMPEETGEGDGTMESDQSPVPQSG  1920
8733        EPEQPDSTPPVLDVGEQAGDSFRAASPAGPTEKSDVDMPEETGEGDGTMESDQSPVPQSG  1920
9605        EPEQPDSTPPVLDVGEQAGDSFRAASPAGPTEKSDVDMPEETGEGDGTMESDQSPVPQSG  1920
9832        EPEQPDSTPPVLDVGEQAGDSFRAASPAGPTEKSDVDMPEETGEGDGTMESDQSPVPQSG  1920
            ************************************************************

10274       GADASPSQMADASPSPAREPSPNPVQAGAPPEQQNPTPPNPVQAGASSEQQNPATAAEGV  1980
10385       GADASPSQMADASPSPAREPSPNPVQAGAPPEQQNPTPPNPVQAGASSEQQNPATAAEGV  1980
9184        GADASPSQMADASPSPAREPSPNPVQAGAPPEQQNPTPPNPVQAGASSEQQNPATAAEGV  1980
8405        GADASPSQMADASPSPAREPSPNPVQAGAPPEQQNPTPPNPVQAGASSEQQNPATAAEGV  1980
8536        GADASPSQMADASPSPAREPSPNPVQAGAPPEQQNPTPPNPVQAGASSEQQNPATAAEGV  1980
8733        GADASPSQMADASPSPAREPSPNPVQAGAPPEQQNPTPPNPVQAGASSEQQNPATAAEGV  1980
9605        GADASPSQMADASPSPAREPSPNPVQAGAPPEQQNPTPPNPVQAGASSEQQNPATAAEGV  1980
9832        GADASPSQMADASPSPAREPSPNPVQAGAPPEQQNPTPPNPVQAGASSEQQNPATAAEGV  1980
            ************************************************************

10274       ETRSTRTINLTERARQNRQARILRSATQQNARGRGNQSLTYRKDGGRGTRGRGGRGQS    2038
10385       ETRSTRTINLTERARQNRQARILRSATQQNARGRGNQSLTYRKDGGRGTRGRGGRGQS    2038
9184        ETRSTRTINLTERARQNRQARILRSATQQNARGRGNQSLTYRKDGGRGTRGRGGRGQS    2038
8405        ETRSTRTINLTERARQNRQARILRSATQQNARGRGNQSLTYRKDGGRGTRGRGGRGQS    2038
8536        ETRSTRTINLTERARQNRQARILRSATQQNARGRGNQSLTYRKDGGRGTRGRGGRGQS    2038
8733        ETRSTRTINLTERARQNRQARILRSATQQNARGRGNQSLTYRKDGGRGTRGRGGRGQS    2038
9605        ETRSTRTINLTERARQNRQARILRSATQQNARGRGNQSLTYRKDGGRGTRGRGGRGQS    2038
9832        ETRSTRTINLTERARQNRQARILRSATQQNARGRGNQSLTYRKDGGRGTRGRGGRGQS    2038
            *********************************************************

Legend:
Amino acid substitution
TPR domain

Samples:
10274 : IRIS_313-10274  (LUSRB)
10385 : IRIS_313-10385  (LUSRB)
9184  : IRIS_313-9184   (LUSRB)
8405  : IRIS_313-8405   (LUSRB)
8536  : IRIS_313-8536   (HUSRB)
8733  : IRIS_313-8733   (HUSRB)
9605  : IRIS_313-9605   (HUSRB)
9832  : IRIS_313-9832   (HUSRB)
```

FIG. 16 Continued 5

>OsTPR
ATGCCTGAAAAAGGGGTAAAATTGTGGTTTCCTCAAGATTGGATGTGGGTGTAGGGATG
GTGCACGAATGTAGACAGATGTGAGATTTGTGATTGCTTCCAGCACTGCTTTGAAATATC
TATGTATTGTATCTGGACTATGCTGAAACCAATCTTGAAGTGTTTCATTGGTTGCATTTT
TTGCCACTGTATATAAGAATATAGCAATATGCTCTTCTACTGAAACATATAGTGCCAGTT
AGGTACTCTTTCTCACGTAACTTATTGACTAGTGCATGAAAAATGTCGACCTCCATACGG
AAGTTTCTTTTGCATAATCTTTCATGTCCTGTTAAAATCTCATGTACACGGCAACCCCCT
GTAAGTTTTGACGTGTGCATTGGTCTCCTAATACAAGATGATTGTGATGAATCTCCTAAA
GTAGGCAGAACAAAATGAATGAACTCATCATCACTTTCTGATATACGTCGGTAGCTTGGA
TTCATGGTGTGCAGATGTTACCAAACTGATGCTGTAAACTCAAATAGAAGAGAGCTAAAA
ATCAAGACTTTTGCTGAGGAAAAAACAATTTTGGTGCACCAGATGAACAAGTAGTACCTT
GTTGTTACACGAGCAAGTAACGTCCAGCTATGGTGGCTAGACGATGAGTAAAGCTTCTGG
AAAAATTATGCAGATAGTGAAGAGAAGAGCAAAGGATCAGCAAGCTTCTTCCACAGTTGA
TGAGCAAATAGAAGAACAGGGGAAAATGGTGCACAAGGCTAACGAGGGCTATTTATGCA
CTTCAAAGCTAACGGCTAGTTGAGGGCCGATGTCAGTTGATGCAAACTTAAAAAAATATA
TTTCAAACGGCAGATTTCCTACACTTCTCCTGCGGTATATCCGAATGCACACTTTTTTTA
AATTCCTGACGTTTAGCTTCCCATAGGATTGGACTCCACAGCTATCCCTATTCCTTCATT
TTTCCTAATCCTATGAGTGAAAAAATCCTTTAAAACGAGTAAGCCCTTACTGTGACGATC
AGTATTTATCGGGAACGGGGTCTTTCCTTTTCTTTTGGAGGCTTTAACTTCTTCCAGCAT
           snp_2_31035009
TTTGACCGTTCCGTACCAACTACCAAGTGAGCTTCTGATGGTTTTGTCTAAGAAAACCAT
GATTTGGCGATGGCAGCCTTTATTGAAAGACATACCAAGCGCTGGGTGGTCACATCTCAG
GGCTTGTTTGGTAGAACTCTAACTTATAAATTTAGCTTCAAGAGTTGGGTCTGGAGTGAA
GTTGTGGAGCTGTCTAAACCCAGCTTTACCTTTCTAGTTCATTTTATGAGAGAACACTAG
CTCCGCTCCCATTTCAGGTGGAGCTGAAACGGTTTGGTTGAGCTCCAGCTCCGGGAGAGG
TGGAGTTGGAGCTGGAGCTGTGACAAACAGGCCCTCAGTTCCTAGATTTGCATTGACGCT
CCAACGGGAATATTCGTGCACAAGTAATCGAGTTTTGTATATTTACCGACGAATGGAATA
CGCATATTTTTTTTCTTTACTTGAACTCCCGTGCAGTGCACTGGAGATGACATCATTAG
AGCATCACCAAGAGATTACATATAACCTCTAAAAATTTGTTTTTTTTCATAAACTCAAA
ATAGGAAACAAAATAAGTAATATCTTAAAGAAAAACCTAAATTTTATTAAAAAAAATATA
AAAGTGAGACCTTATTAAACTACCAAAAGAATTTCCATTTTACTTCGTCAGCGCACACTA
TCTCCTGGCGCTCCCCTGAAGCCGCGCCAGGAGAGGAGGAAGGTGGGAGCAGCTAGATTG
GAAGTGGGCAAGGAAGCCGCTTTCTCCCGTATATCAACAGAGCAAATATTTCGGGAAAGA
GAACTCCAAAAATCATGCAACTGAGTAAGGGACTCGTTTGAGTGCTTTCTTTCACTAAAA
TCCCTCAAAATTGATTTTGAGATGAAATAGGGATAAAATAGAAGGACTGTTGGTGATGCT
TATTTATTCTCCTGTTTTATAGGGTTTTAACGAATTGAGATCAAATACAGTAGCTATTAG
GACTGCACACAATCTGAGCCCTCTATGTCTAAATCTAACGGCCAAAAAGGATTTGGCACA
GTACAATTAGAACAGTACCCTTCCACAGTAAAATGCTACAGTGTTTTCTACAGTCTCAGA
TGTATCTCGGACGTCCATTTTAATCATGCGATGCTAGTGTGACTGCTTATCTTGCATCA
CACTAGCTACTGCACCTGAATCGGGTCCGGTTTAAACATGTGAAACTCGGAAACGGCTTT
TTAGACGAAGACAGCCCACAAACTCATAGGCCTACACGCCACAGCCCGAGAAACAGAAGC
CCAGCAATCCGGCCCAAACAAGTCACTCAGCAGTCAGCAGGTCTCACAGGCCCACCAGAT
AGTCCATGGGCCTTGGGCCGAGCCTATCCGACCGCCTTCACGCGTCCTTCCTTCCGACCT
ATATTTCTGCCTCGCCCTCCTCTCGCCCCTTCCCCTTCGCGTTTGCGTTTCCTCCGCCTC
CTCACTCCAATTCCATTCGCCTTCCGCCACCACCACCCTTGGCTCCTCCCCTCCCCGCGG
GGCGCGCGACAAACCCTAGAACCTTCAGAGGCTAGAGCGGTAGAGCCATCCGCGAGGGC
                                   CDS Start
CCCGGGCGGGCTAGGGGCGCCGCCTACCCGACCCCGCACGCGGCGGCGATGCCGCTCTTC
ATGTCGGAGGAGGAGCTGCGGCTCTTGGGCGGTGACGTGGCCGCCGTCGCCGAGCGGGCC
GACGCCGCCATCCGCGAGCTCCGGCAGCAGGTGGACACCGTCCGTGCCGAGGCCGACGCG
GCGGCCATCGCGGCGGAGCAGACGTGCGCCCTCCTCGAGCAGCGCTACGACACTCTCTCC
GCCGAGGCCGATCGCTTCCGGGCCGAGCTAGCCGAGCTCGCGGCTGCCTCCGAGCGCCGC

FIG. 17

```
GCCGCCGATCTCGCCTCTTCCCAGTCCGAGATACACCAGCTCCGCATCCAAGCCGTACGA
ACCCTAGTTTTTATTTGGGTTCAGCTCAGTTTTTCGGCTTAGCTGAGGTCACACTGATCA
CTCTGTGCTGCTGATGGGGTTTGCAGATTGCGAAGGATGGCGAGATTGAACGGCTGAAAG
TAGAAATCTCGGAGGTGCACAAGTCCAAGTCGCAGTCACTGGAACTAATTGAGCAGAGGG
ATGCAGAGATAAGGGAGAAGGATGGCATCATCCAGAACTACCTCGATAAAATAGTAAGCC
ATCCTGACCATTTTGTACTCCCACTTCTAGTGATGCACAGCATCCAGCAAAATTGGAACT
CCATATCTAAGGTGATGTGCGAATATAGGATCATATGGATAAGTTGTTATCCAGTGCAAT
GCCTAGGTTGCTACTGTCGACAAACAGAGGACGGGGGTTTTATGATGTTCTAAGACTTGA
AGTAGCTTTCCTTTTAACCCTAGTCAGAGGGTAGGTCAGTTGCTTGATAGGTTTTACAAC
AGAAATTTTGTGGCTTCAATAGGCCACAAAATTTGTTTTCCTCATTTTGCATGTTACTTG
GCAGAAGTTGAGTTGCATGTGTATGAGACACAACTGCATTTTGTATGAGTTGTTACCCGA
ACGTCAGACATGATTTTAACTCGATTTACCTGTAGTTTTACGTCTGTCTCCATACTTTTT
TATTTTACATGTAGTAGCAAGTTGAATTTTTATTTTATTTATGCATCAGAGGTCATCCTT
ATCGGATACTTCAAATGAAAAATACACATTTAAATTATTTTCGTAATATCAGTTACTGG
CATTCTATTTCAGTTCTTTGGGCATTGCTTAGTTGATATGCCGTTTCAATAAATAAAACG
TACCATATGAATTATAATGACTTTGCAATTTTAAATAAGTTGTTGCTTTGTTGTAGTGTT
CTGATCGTATAACTTTACATGCTACTTTTTTTTTGTGCCTATCATGAACATTCATATCAG
TCTAGACTGTTTAAGATACTCAATTGTGTATCGTACCTTACATGTTATGTATCATTCCTT
GCATGTTGCGATCAACTTTTGAGTGTCGGACTTATTGTATGTAAGATATCTGCGATACTG
TTAGATCTCATTGCCTAGTTTGGAGTATTGGAGATTTCCCCGATTCGATGTAGGAATATT
CATTTATTTCCGTAAAATTCATTTGTTCCAATTGGACCCATACTTTTTCTTAAAATTTAC
TCTGTAGTTTTTCTGTTGGATAATTTTGACCTTATTAATGTGTCACTATTGAACCTTCTG
TATAATCAAGGAATTCATGTGATTTGGTATGCTTATATTCAATATCATTTATTAGCAAT
CGCAAGCGCTAGGCCTTATTCACTCTAGTTGGTAAGTCCTTTAGTTTTTCGCATTTTTGA
GATATCTATGCCCTTTCATCCTGGGAACTGGGAAGATTTTGTTTTGCATTTGTTGCATA
AATTAACTGTAGTTGTTGAATCGGTCTTCCTGTCAGGTAAATCTGGCAGACTCTTCTGCT
AGTAAAGGGGCAAGGATACAAGAAGTTGAAGCTAAGTTTACTCATCTGCAGGCCACATGT
AACCGAATTACGCAGGTATGCTATAAACAATTTGGTGTTATTTTGCTGCGTAAGATTGTA
GTATAAGGTGATGCAAAGTCTTTCTTGAGTTGTAGACTACTACCTAATCTGTTATCCATG
GAGTTTTACTTTAATTGTACCTATTCCATATGTTTGCACAGAGCAACCGTTGGTTCTTAT
TTAGTACTTTCCTGTTTAGGAGAAAGATCTGCTTGAAAAGCATAATCTCTGGCTTGACGA
GGAACTTAAAGAAAAAGTGAAGAACTTAGCTGAACTAAGGAAATCAAACATGGATGAGGA
GGCTAGGATGTCAGCAAAGGTTGCCGAGGTGAGTCCTATTCCAACCTTGACATGTGACAT
AATGCAAGCAGAAAGCAAAACCTGATTATGTTGGTTTCAGCTTGAAAGAGAGACTTCTGA
ATCATCCAGTTCCTTGAGGCGAAGCAAAGAACGGGTTTCTGAATTGGAGCAAAGGGTATC
ATATATGGAAAAGGTAAATTGTCAGATTTGTTAGCTTTTGTATTATTGCCATCATCTAAT
TTTTGCTTTGCTTTGCTTTTATGATCTAAAGGAGTTGTGCTCAACAAAGGATGCTGCAGC
TGCTAATGAACAACGCCTGGCTGCAGAGCTTTCAACTGTATGGTTTACCTTTATTCCCAT
TAACCCCCCCTTGTTTATTTCACCCTTACTGCTCCCACTCCCTGCTTGTTTAAATTTTAG
AAAGGAAATGGAAGAAAATGTGTGCTGAGCTATTTGTACTAGACCAGCAGATCAGTCCAT
CGTTATTGTATATGCACACGGCACACCACAACTTAACCCATCTAGTGTATCTAGGATATT
TCTTTTTTTTAATGGAATGCACTGATGTTCCTCTCTATAAGCCAAGTCGATGACGCTTT
TAATTATTGCCTTTTGTTCTGTTTCCCTTAAAAGGTCATGAAACTTGCTGAACTTCACAA
AGAAAGTTCTGAGGAATGGTCAAAAAAAGCGGGGGAACTTGAAGGTGTTATTAAAGCATT
GGAGGTAATGCCTTTACTTGTATTTAATTTTGCCCCGCTCATGAACATGAAAATCTAATT
ATTCTTATTATTTTTTCGGTGTAAACCAGACACATTTGACCCAGGTTGAAGATGAATAC
AAGGAAAAGCTTGAGAAGGAGACTTCAGCCAAGAGGGACCTTGAAATGGTATATTGATTA
TTATTTTGGATGGTTTCTTATTGAAAAATCAGTTTGATATTGTGAGTTTCTTAGTTGAT
CTTTTGGCTTTCATGCTATTCAGGAAGCTACCTACTTAAAGCAAAAGCTTGAAAAGTGTG
AATCTGATCTGGAGAATACAAGGAAATCTAGTGAATTGAGCTTCACTCCATTGGTTGCAG
CAGACCCTTGTGATCTAGCAGGCTCACCGATGAAAGAAATGTATTATTTCTGAAACTTTA
TACTTTTAGTCTAGCGAGATATCTAAAGCAGGCGCTATTAGCATAGCTAAGTAACACTTT
CTAGAGAGCATTGTTCAAGGCTTTTTGATATTAATTGTGTTTTGCTCATTAAAGCTTATC
TTATTGAATGATGTTAACTTCTGTTTGTGCTGTACCGTTGTAAACATGATATTATCTTTG
TCCCAACACCAATAGTTCCCAAACATTTTGTAGTCATTCCTTATTGTGTTGATAAGTCAC
TGATCATATCTAGCTGGTGCTAGGGAAAACCATGATATGCAATGTTTTACAAATCATAAC
AGAAACACAGGAAGGAGTATGATCCAATTATTAAACAAGACCTTAATTTTCATCTATTTT
```

FIG. 17 Continued

```
GAATTCTTTTTGTTTCCTATTTGGCAGGGCATTTTCTGATCCAGCAAATCAGAATGATC
TAATGATTGTACCAAAAGTACCTACTGGTGTTTCTGGAACTGCATTAGCTGCTTCTCTTC
TTCGTGATGGTTGGAGTGTATGTCCAATCTCCTCTATACTGTTTAATCTGTGCATTTACG
TTTCAAATATTACCTGATTACCTTCACTGTGTCAGCTCGCTAAGATCTATGAGAAATACC
AAGAAGCTACTGATGCTTTGCGCCATGAGAGGTTTGGACGAAGGCACGCGGAAGCAGTTC
TGGAGAGGGTACAGTTCTGTTCTCGTCAGTTTATCTCTTAATTTGTATTAATCTCTACTC
TCTTTCCCATGATCCCATCATTTCCACTTTCCTAATAGATGTTTTAGACATCAAAAGTCA
AAACAGCTTTAAATACAAACTTTCAACCGTGCCATATTCTATCTATGTAACCACATGGAA
GTAGTCCCTCCTCTGAGAAGGTTGAAATGCAGATTTGCTAAGTTTTGATTACAAACTCAC
CATAATATGGATAGTCAAAATTTCAATAATCGGATTATACGCATTCTAAAATGACATTT
TTTTGAGATGGAGGGAGTACATCAATTTTCGCAGATTTACATTTATTTGAGATGGAGGGT
GAACATTAATTTTCACTGATATTCTCCAAGGTTTCAAATTTATGATTAATAGTTGATGGT
GTGAGAAGTGTTTGTAAAGTGCATGAAGTAAACGCACATGTAGTCCTGTATCATATTTTG
TGCTAAATGGGTAATCGTACTTGTGCAGGGATGCTCTGTTGCTTTTCTCATTGATTCATT
TCTGAAGTGTCCTATTCCTGTTGGATTACTGAATTATCTTTTGTTCAACAGGTCTTGCAT
GAAATTGAAGAGAAAGCTGAGCTTATCTTGGATGAACGAGGTAATGTGAAATGCATACAT
TGCTTCATTGCCTGATAGTACACTGATTATGCTTAAGTTTGGACATGTATGCAATTATTT
TGTGCTCAAGCATATCTTTGCATTTGACCCTTTCAGCTGAGCATAGGAGGATGGTTGAAG
CTTATGCTCTAATGGATCAGAAGTTGCAACAAGCATTGCTGGAGCATGACAATTTTGAAA
ATACCATTAGGAATCTAAAGGTGCGTACATCAATTTTCTGTTAAGTATAGTAGTCTCCCA
TAGTGAAGTTTTAACAATAATCTTGTTTTTGCAGTCAGAGTTAAAAAGGCGGGAACGTGA
TCATAGTATTGCTCAGAAAGAAATAGATGATCTGCAAAAACAAGTGAGTCTTTAAGCATG
ACATCTGCATTTTGTTCTTTTTGATTGATTCACAGATTAAATTGTCTATGTAAGGAAAAT
AGAAATGTTAACCTCTTGCCTACTCTCTAGATATTTAAGATCTGGTGCAACTTGATGTGA
TACTAGTTCTCACCAACATCTTTTCAAGGATGCTATTCTAAAAGGGGTGGAGTCCATTTT
TGGCACCTAAATATTTCTTGGACTCTAAATTTACGCTGAACTAAAAGATCGGTTTTAGTT
CACCTTCAACTTTTATTTATAAAACCAGACAAGTAACACCTCATACCTGATTCCATGGTG
GTTTAGTTGAGATGACATGGTTTTCACTGATGATTAGCTTCTATTAGCTGAGATTAATTG
ATGTTTAACCAGCTATTTGACATTCGCACCAACACAAGCTTGCATATTAGGAGTCTGCAC
TAGCAAAACTATTATGATATCAATGGAAACCACTGTGGAGCAGTGTTGAAGGTATTAAT
AGTATTTGTATGGTTTTGAAAGTCAAAGGGTGGAAAACACTAGCTTTTCAATTTGAAGTT
AAAATGGACCTAGAAAAGAGTCCAAGAGCCAAAAATAGACTATGCCCTTTGAAAATATGT
CGATGCTTGTGGTCCTCACCTGTTCAAATATAATTTGAAGGTGGATATTCATTCTTGCAT
GTCACTACTGACAAGAACATTGAATCAACATTTCTTTTGTGGTACTGCAGATGCTTTTGC
TAACTATATGCTGTGTCTGCCCTCTAAATATTTGCAGATAGCTGTCCTTTTAAAGGAGTG
CCAAGATATACAGCTTCGTTGTGGTTCTAGCCTTCCAAATGTAGGAGATGGTGCTCTTTC
TACAAGCACAAGCACTGGAGTGCCTGAAGTTGAAAACAATATCCATGAGCATGTGAGTAT
GCTAGTCCGTTGTATTCTCTTTCAGTTTCACTGTGTTGGTGCTTGCTTTAACTGTTCGAT
ACTGTGTTTCAGATGACATTCAATGATATCAATGGGTTAGTACAGCAAAATGTGCAACTC
CGGAATCAAGTTCATTTGCTCTCTGCTGATCTTGATAAAAGGGACATGGAACTCAGGGTA
TATATAAAGTTTGACTTTGTTTTTCTATAGTTTCAAATGTTTTAGTTTGTTCATACATC
AGTGTCAGGGCATACTTTTGTATCCAATGACATGAGTACGTGATGAAAAATATCTCGTTT
CTGTACTTTCCAGGAGAGCTTCCAAATTGAGTTGAAGAAGATTACAGATGATGCTGCGTC
CAGGGTTGAGAAAGTGATGAAAAAATCCGAAGAACAAGCAATAATGATTGAATCCCTTCA
CAGATCTGTATGTTTTTGTATTCTCCTTGCCACGAAGTTGGAAATCTTCGTTTTGAAACC
CTGTCTGCAAAATTTCAATTGCATGCTGTATGTGATACCAGTCCTAAAATAGTTCTCTTT
                    snp_2_31026954
TTTGTAGGTAGCGATGTATAGGAAGCTGTGTGAAGAACAACAGAAGTCACGTTCCAATGT
TGAACACATACCCAAAAATTTGGAAGGTTTGTCCTTCTGATGTTTTCAGTTCAGGCAAAA
TGGTTAAATGTCTAACCATGATGGTTTCAACTGCATGTTACTGCTATAAGAAATAACCTA
CATGTGATGGTTTTATTTGTTCTCTAGATGATGGCAGAAAAGACCTGATGGTTCTATTT
GAAGGATCACAGGTAATTTTTTGATGATGGAAGGCTTATTGAGGCTTTAGAATACCATA
GATGTTGTGGTGTCTTTTTTCAAATTTCAATCTATTTTGACCAGGAGGTTTCAAGGAAAG
CTTATGAGCAAGTTTCAGAGCGTGCCAAAAGCCTTGATGAAGAGCTGACTAAGTTGAGGT
GGTGTTTTCCTCCCCTTTTAAATCTTATTGGCATGATAGAATAACAGCTACGGGAAGAAG
TCATTTGAATAATTTTCATTCCGATGTATCATTGGACAAGATGAATACTGATTACGAAGC
```

FIG. 17 Continued 2

```
AATGTAACAACATCCCTTTGCTAAAAAAAAGTAATATGAACGACTAAGGCCCTGTTTGT
TTCAGCTTAAAATTATTATAATCTAGATTATTAAGACATATTACTATAGGCTGGATTATA
ATAAGCCGACATAGAATAAGTTGTTAGTTGTTTGTTGCTCTAGATTATTAGCTGGTTGTT
AGGTGTTAGCAACCCAATAATCTAAAAAAAGCACCTTTAGAGTGGATTACTAGATTATAG
TAATCTGGCTTATAGATTGTAATAATCTATCATAATAAGCTATCTGTTTGTTTCAACTTA
CTCCTAATAGTCCAGATTATAATAATCCTAAGCTGAAACAAACAGGGCCTAAAGCATTAA
GGTTAACTTTCTATGGTCTTTTCAAACTATAGAAGTTTATGTCATGAAAAATAATTTGCA
AGCAATCCAACGTACTTATTTTACGTAGTTAGTCCATATACTTTTGCAATATGAACGACT
AAAGCGTTAAGGTTAACTTTCTATGGTGAGCTACACTTGGAAATGCACAGATCCTATGCT
GGCCTACATATGTAGACAAAGGGAGTACTGGAGTACTATGAAACGGATATCTTGAAATGT
TGTTAGTGCCCAGCTCTGTTGAGGTCGTGTCGTTATAACTAAGCATGCTGACGGAAGTGT
GAATGTAGCACTCCCTCCATCTGAAAATATAACACCTTTTAGCATTCAAACTTTCCCCAC
AATATAATAACTTCACCTATTCACTCATCTCAACCAATCACAACAATCTCTCGGGTAAAT
CTAATGGGCGGTGATCGCTGGGAGCGATCAACCCGCCCCTCCCCCCTATACGCTCTTCC
TCTCCCCCTTCCTCCTCCCCTTCTTCTCTTCCTACTACAGTACACCATAAATTTTTTAAA
AAATAAAAAAACAAAGTTGGAAAAATTTATGTATAGAAATACTATATATAAAAAACATTT
GAATTCAAATTCAAATTGAAACGGGTATGTAAACTTTTGACTTAAAACTTTAGGTGTATA
AACTTTAGATGTGTAAACTTGAGGTGTACAAACTTTAGGTGCATAAATTTACTAAAATAG
GAAAGTAATGCGGTGCCAAAAAAGGAAACCACGTGGAGGGAGGGGGGGATCCGAATCCTG
ATCGCTAGGGGCGCTTAGCAATCTCGCAATCTCCCACTTAATTTCTCGACCTACTTTCTC
ATCTCAACTAATAACAATTTTCCCCATTTAATTTCTCCTGCTTTCTTAATACCTTGTACA
ACTCTAGAAATCCTTATATTTTGTGATGGAGGGAGTAGTATATAGACGCACATCTAAGTT
ATCTGTGTCACGGTTGGTTTTAACTTACCATGTATCTGTGCTGTTAAGGGTTCCATTTC
TTGTTGGTTCTTCATTTTTACATGATTTTGGATGGCCCTACTTATTGTGGTATTTGGACT
GTTGTTGATTATGTTATATTATATTTGATCTTGCATAGAATTTCTGATCAATACTGATTA
CTATTCATTAGGACTGAGCTTCTATCTTTGCGTTCTGAGCGTGATAAGGCGGTTCTTGAA
GCAGAATTTGCTCGAGAACGACTTAATGGATTTACAGCAGAGCTTGAACACCAGGTTCTT
TCTTTGATGTGTTATATCATGATTTGTTAATATTTATGTTTGTTACACTGAAATGGACAT
AATAATGTCCATAACAGTCTTTTGGAAGAAGATAGCATTTATTACATGCTGTATCCTTAT
TTACTTTGTACATGTAAAAAACAGAGGAAGGAAGCTAATTCTATTTCGCTAAGAAATGCG
GAATTGATGCATTTAGTAGTTGATTACGAAAAAAGATTGCGTGAGAACTCAGAATCTATG
                              snp_2_31024549
AAGGCTGTAGAGGAGAACTCACGGAAGCTATTAATGGAGGTTTGTTGATATTTTTACATT
CCTCAAATAATATTAAGACCCAGAGTCCTGACATGATTTCCATTTCTCTAGATGTCTATT
CTAAAGAATGAAAAGAGATCTTAGCAAAGTCAGAGAAAAAGCTTTGGAGGAAGTTCAT
GATTTGACCACGAGGGTGCATCGCCTGCAGGTATTTCCCTTGCTGCCATATCTTTTCATT
ACTTTGGAGTTTCAATATTGTCTTGTACCCCCTCCATCCAATAAAAAAAGCGTGTCCATG
ATCGTAGCTAGGGTTGGTCTTTTTTTGGGACGGAGTAGTATGTATTGCAGTTTCTGTTAG
TTTGTTATGTTTCCAAAACAGTTGTAAAACTGTTATCGTCAATTATATTCTATACTTATG
AATATATACTCCTTCTGTCCCAAAAAGAATTAATTTCTAGGTAAGAATCTGGGCATAGAC
TATATGTCCAGATTCATAGTCAGAAATTGGTTCTTGTTGGGACAGAGGGAGTATATTATT
GTTATGCTCTTTTTGAAAGGATAATTTAGTACTTTTCGTAGCTCTGCCCTATATTTCTCA
TGACAAATTTGGAGCTGTCAGTTTCGCACAACTGTATGGTCTACTCAAGCATGAACAAGC
AAGATCTTTTAGCTATTTGTGTTTTTAATTTGCGATCTCAAATAAGTTAAATGTTCGTGA
AACAAATAAAACATGTCAATTACTTTGTCTTGAGGCTTTTATAAACTTGCACTGACTTGT
ATATATGATGCATTGCAGGCGACCATTGACACAATACATGCCACCGAGGAGGTTCAAGAG
GTACAATATGTCTAGATGAGTCACATTAATACTTGAAATTCTTCTCTGTCTATCTCTTAA
TCTGTGAATAATTTAGAATGCAAGGTCTATTGAAAGGAGAAATCAAGAGGAGTACATCAA
GAGACTAGAAGTAAGACTCCTATTTGGCATCACATATGCTTTAGTATTTTGTGCTTATGT
AGCTTCGTCATTGCCTCTCCTCTCACATTCAAGCTGTTCTTAGCTTTAAAATGTAATTTC
CTGTACTGATACCTTGAACATTGAGAATACTACTGTGACTCTGTGAGATTTGTTCTCTTT
CTGCATGCTCATTGTGGGGATATATTGCTCCATGTATTCCTTCTGTATCTTATCTTGGTT
GAGCTTATTCTAATTTGAAATGCATCCATAGAGGGACTGGGCTGAAGTGAAAAAGAGCT
TCAAGAGCAAAGGGATCATGTCCGCGTCCTGACGCTTGATAAGAAAAATGCCTTTGACGG
ATGTCTGAAGCAGGTAGAGGATATGAGAAAGAGTTACAAAATTCATGGAAAGCTGCTAC
TGATGCTGAATCTAGGGCTGCTGTTGCAGAGGTTTGTTCAAGTAATTCATTTTTCTATAG
```

FIG. 17 Continued 3

TTAATCGCAAACATATTATCTAACTGGTAACTATTTTGACATTTCTGTAGGCAAAGTGTT
snp_2_31023080
CTGATTTGGAGACAAAACTAAAATCAAGAAAGGTAGATACTTATAAAACTAATACACTGT
TATATTGTATATCTAATACAATGATGTTGAAAGCACCATACATCATAAAACTGTCTGTAT
GTAATTTCCTATTGATAATCTCTCGCAATTCCTGGTTTTGTCATGAGTAAATGATTTTCG
GTACAATTATTTCTAAGCTGTTTAATAGTCTGTTCTGTAAAGGAAGCACATGATTTCAGC
TGAATTACATAATCTTCATATCTTTGTACGATTGTCAAATTCTGCTTTGGATGTTGTCTG
ATCATTGAAATAGTCATATCGTTTTAATTGAAATGTCATTCATGGATATCCATGAAAAA
TAGTGGAATGATGCATCACGTTAGTTTTAGCATTAGTGCATGTTTAAAATTTTCTTTAC
AAATCAACATCAAATTTGTTGTCTATATTATCCGTTTGTAGGGAGCTAATTTCATTGCTC
TTGTTAATTAGCTATAGGTGTACACTGCATCTAAATATCTCTGTACTTTCTACCTTCTCT
CCTATATACTGTATCACCCTTAATTGAGCTGGTGTAACAATTCTGATTATAATTATGCAT
TCACGCGGTAACTTGTAAAGCATCCATGGATGCGTGTAGTTGCTGTACAATTTGTTCATT
ACCATGATTGAATTGAGTAGCATGTTTCTTTGATGAAAGCATGGATATTCTGGTAAATGT
ACTTTATTTCTTGGGCATTGATCTGAAACAAAATTAATCCTACAAAAGCAAATGGTGGGA
GTACAACTAAAAGCATGTAGTATTCTTAATACCTTTTCATTGTATTGTACATGCTATTTA
GCTTTCAGCTGACTGCTGTTATTCTGCTAGACCATTTTTAGGGATGGTGGTCGTGATATC
TTATCAGCAACTGAGGTGAGCTAGTTTTTTCCTGCTATTTGGACAATATCATATGCTTCT
ACATATTTTATATGGTTAAAGATCCTATGGTCTTAAAATTTCTGGATAATTTCAATGCTC
AGTTGTTAAAAATTTGCCCTGTAGGAGAATGATGAGCTTTTCCAGCTGAAAGAGGAGTTG
GAAAAGTACAAAGAGGAAGCTCAAGCAAATAAAAGCTACATGCTTCAGGTCAGTTTGCCC
CATCACCTTGAAAGGCTAAATTGTTTAATTACATTGTGGAGTCATCAAGCTCTTTTACCA
TTAGAAACATTGTCACTAGCTACATTTATTAGTTTATCATTTGACATCACCAAGGAGTAA
TATTCTGAATTTCCTCAACAACTATCTATCGCTGTGCACAAGAGATATTTTAGGTTTGGC
ACTCCCATTAGAGAAAGATTACCCCTTTACTTATAGGAAGTTATTGTTCATGGTGATAGT
GACATCACCATTAGGGAGCAGATGCTGACCCTTGAGAAGTTGAGGTTGTAGCCATCCCAT
CCCTCTTGCTTAATACATATCTTGTAAGCCTGACGAGGTTATGATCAATCATTCTGAGGT
CAAGTCGATGCCATGCTGGATGCAACTTTGATAATTTGTTCCCCTAATTGATCACCTTA
GCTCATAATATGCAACAGTTTTCTAGTTATCTATGATCGGTGTGGTCCATGGAGCTGGTT
TGAAGTGGATTAATTATTTTGTCATTCTTTGCTCCTTTTCACTCAATGATTCTATGCAT
TACACCAATTTCTGAAATGCTAGTGATATACAGATCATATCCATATCTGGTATTCTGGTT
CCAAGCATGAGAGGACCGTGCAACATAAACAACAATGGATTGTTATGATAATGAAGATGT
GATGTAATAGAGTTATTTTCCTCTCTTGAAGGCCCATGCATGAATAATATATCTAGCATA
GCCACCTTTGTCATAATCAGAAAGCACACCATATTTCCTTTTGAAAGGTCATTATAATGG
CTTAGTTGTTCTGTAGAGTAGGTGAACTGAATTCATTGGTGCTTGCGTAGTGTGGCCTGT
GTTTCTATTTTGCCTTGTAGAAGTCAATTATTTGCTGACCTCTTTAAGTCATATTATAAC
TCTAATTACTTGACAGTACAAAGAAATTGCAAACTCAAATGAATCTGCATTGAAGCAAAT
GGAGTCTGCACTTCAGGATTTCAAAACCGAGGTACTGAAATGCTTTCTGTATCCTTATCT
ACCTATGCTTGATATTTACATGAATTTCTATTTAATTTTCAGTCTGAGACTATCAAGAAA
AGCTTGGAAGATGAGATTACAAAGTTGAGGACCAAGATATCTGAACTGGAGAAGTGTTAT
ATAATGAAGTGTGAAGAAGCTGCCAGTGCAATTGAAGCTAAAGAGAAGGATACCACTTCT
CTCATGAAGGAAATCTCAGTTTTGAGAAATGAAGTTTCCGAGAAAGTGTAAGCAATTTAT
ATACCCTATAGAGGCAGGCATATGCTTTTCTCAATTTGGAGATGCTTCTTCGATTGATGT
TATCTCTTTTATTTTCTCATTCCTCAAAACAGAATACAGATTGAAAAATTAGAAACTGAA
CTGGCTTCCTCGAAGAGGGCTCTTGACGAGCAGTATAAGCGTTGGCGTAGCGCTCAGGAC
AACTATGAGCGTCAGGTACTTTGGGGCACTAACAATTTTGTCAAACAACACATAATGTTA
TTATGCTTTCTACTTATATCTTGGTGCTTGCGGTGCTGATGCTTCATTACAATTGATGTG
CAATCACAACTTGCAGTGATACTAATGTTATATGGAGCATGTTGCTAAATGTTTTCACCA
TTTTACTTGAACTGTAGCTGCTATTCTAGGCTACTATAAAAGACACCAGTGGTGGTGGTG
GCTGCACCTTTTACAAACTAGTCCCTGATAATTTCAGATATTATGCGAGTCTAATATTTG
TTTGAATCAAGTCAATACCATATATTCAAATAAGGAAACAAGTAATACTAGCATATTTGT
TAAAAAAATATTTTGTCTATGACATATACTTTCTTTTACCCATAGCAAAGCATGGTCATT
TTGCTAGTGTATGCAACTTAGTTCATAGCATCACCATCAAAGATCAGATGGCATGTACAT
GATACAATAAAGTAACTGAAGTATATCAAGTTCAGATTGATTTATCCTTCTTACTTATTA
CTTGCAATTCTTATAATGAATCTCCTTGGTGTTTATATACAATTATTTTTTTTGTACATA
CTGTGTTATCCTAGAATGAGGCTGTGAAAGCACTTATTGTGTGTGTGTGTGTGTGTAT FIG. 17 Continued 4

```
CTCTTCTGTATCTTCTGTAGGTTATTCTGCAATCGGAAACAATACAGGAGCTGACAAGTG
CTTCTAAGGAGCTATCTTCTTTGCAGCAGGAAATCATAGTGCTTCGTCAAACAGTAGAAA
CACAGAAGGCTGAAAATGTAAATTAAAACTGCTCCACTGACCCTCTTGTCTGAACTTCTA
TTCATTTGGCGTGTAAGAGTAGAAGTCTTTGTGTCTTGGACAGATCTAAAGGGATGTGTT
ATTTGTGGCTGAACTACCCTTAAATTAGGAGAAATAAACCTTACCAGCTAATGCTTAATT
TATGACGCTAGGTCTGCTAGGTGTGGCGTTACACGCTTCTGTGGTGCTTGCCCCAGTTGT
CATAGCCTCACATTTTAGCTAAAGTGTTGTGCTTGATCTGGCTGCTGCAAGCCCCAGGCA
AGGAACCAAATAACGTCAAGAAGTCTTTTAAAAGTTACACCTTGTACCTTCCCACTTGTT
GATCCAACCTTTTTGTGGATAAAAATGGTCTTATGGCATCTAAAATTCAAAGCACACAGA
TTAGCGATTACCACTAGTTCTTTGCTGGTGTTCAATAAAACCTTTGCAATTTTTGACAAA
TCGGGTGAATCAGTCGAGGAATAGTTCAATGTGTCTACCTTTCTGATATTTCTATTCTGT
GCATAACAGCAGTAATCTGGCTATACCTATACTACTTATGTTGCTTTTGGAATAGATTCA
TGATTAGTGATAACTTATCCTGATCGAGCTGTTCATAGGAACTAATCATCATTTGTTGTA
                                                      snp_2_31019010
ACTAATCGACACTGCAAATACTTTTTCAGGATGGTCTAAGAACCCTTGGAGAGCAAGAAA
AGATAGAGCTGGTGAAAGGAAAGGATGAGGCCTTGCAGAAATACAATGAGCTAAATGATC
AGGTTTAAAAGCTTGTAGCTATCGATATCCAGTTATTCTTAAAACATTCACGTTTTAGA
ATGTTATCTGATCTCCATGTTTCACTACCAAGAGCAAAAGTGGGATTTTACAAACCTAAG
GGAGCTGCTTATATAGCATTGACATTAAACAACTCAAACATGAAACAAAATCCTGGCAAT
AGCAACAAAAGAAAAGGGTGGATACTCCAGAGACTTCACATCCTGATTGTTGTTCCTTC
CTTCCAGCCATGACTGAACCTCACTTTCGACTTGTTCTAGTAGCTTTGCTCCACCTGCTG
CGCGCTTCTGTTTTCTTCTGACTTCTGCAAGAAGTACCAGTTAGTAACCCAGAAACTAAC
AGGAAAACTCATTTCAAATAGCCCCACTAAATGGCTGAAATCCCCGCGACAAAGTATCTG
CTTTCTGTTTTGAAATGGAATACCCATTTCTCTTTAAAGAATAAAATGAAACACCCATTC
TTCTAGCACCTGCAGCACATATCGAAGAATATTGTTAAAACCACGGGAACAGCTTAAGAC
ACCCCCATTTTTGGCATTTATGATCTTTTCCAATCCTTTTCTACACAGCGATCTTTGGTT
ATATACTCTTTTTAGCGTTAACAAAACACAAATTTTGATTTGAGAGGAATCCTGATTTTC
CACAAAATATTGTGTGCAAATTCCACTACTATCAATTCCAACCACAATTTCGGAATTACT
GGGATTAGTTTGGCATAGGAACCAGAATTGATTGGTTTGATTACTATAATGCTTAATTGA
TTATGGGATGGGTGTCGAATTTATGGACTTCTACATGCACATTTTGAGGGGTATGTATTT
TATACCTACCTATTGAGAACATACATATGAATATTTTTAATGATACAAATAAAATTTAA
TAAGGCACTTGTCTACATGGTGCTTTACACTAGGGTTTCATGGGCTTATTTTTGTTTTT
TTTAACATGCTTGATAACTATTTTCATAACAGTTGCCTGTTTCGACTTTCGAGCCTTAAT
ATAAACACTGCCTTACAAAATCAGTATATCACTACAGTAACTGATTGTACTAGTATATGC
TTAATTCGTTGGCAAGATAATGCTGGATTAATCTTGTTTTTCTGGTCTAAAAGATGTTCA
GCATATTTAAACCATAATCTAGAATGGTTACTGGTTGTAGTTGGTTGCCATTCATATTTT
TTGTTTGCTTCCATTGCATGTCCTTCCGTTCTGTATATAAACACGGGTGGTCGTTAGTTG
CCATTCGTGAAGATCACATGAATATACATTCTTGCTATTTTCTGTACTTGATGACAGTGG
GTTACCATGAATCACATATTTTCTTCAAATGCTGAATGCAGAATAAAATTCTACACAATC
AACTAGAAGCTTTGCACATTAGATTAGCTGAAAAAGAACGCAATATTGCTGGTCTTTCAT
CGCAACGCATTGATTCACATGGTGAAGATGATTTGCATAGCGTCATTGGCTACCTGCGCA
GATCGAAAGAAATAGTGAGTATAAGATTCAGTGTCCTCTTCTTCTTTATTATTCCTCTAC
TTGGAATGGGATGTTATTTATGTAGTCTGATGGTAATTTCACTATTTCAGGCAGAAACCG
AGATATCTTTGCTTAAACAGGAGAAGTCACGGCTTCAGATAGAAGTATGATCTGCTTGCT
CTTGCATATTGTTATTTGTTCAAATACCCATAATTGTGCCACGTCAACTACTGTACTCCT
CCATCCACAAAAGTTACACATTTTACTTTTGTCACCAAGACCATGAAGAAATTAAATTAT
CTTGGATGCTACAACATCAAGGAGTGAATGCAAGCATGCAACCAATGAGTATTTAGATGA
CTACTTGGGTTCTCATCAAACATTTAATTTATCTCTTCATTTAAGTCTTAAATACATAAA
GATTACAAATAGGTACAACTTATTTGGAAAAACTCAAATGTGAAATATGTCTAACTTTTG
TGGATGGAGTAAAACAGAACTCTACCTATGCTTACTTGAATTGTATGTAATTATAAAGGA
ACTGTTCTGTTTCTTTTGTTTTATGTAGTATGGTGACTGCGAATATTGAACTGCCACCTG
CCAGACTTTGTTGTTTTGTCATTTTGTTCCATGCTCCCATTTAATCTGCCCATAGGACAA
TTCCATGAAGTTTCCACTGTTTGACCCATCATATTTGGCATTTGGTATCATCATGGAACC
AATCCATATGGCCTTGTCTCCTTTGTGTGATTGCTTGCCAAGCTTGTCTCATTTAACTTG
ATCCTATGGCTCCACTCTGGTCTTGTATGAACATGTCATGTGCCTCTGTACTTTCAACAC
ATAACTGAAAGTTATGCATTATTGTTCAATCTGTTTGTCTTGCATGATTTGAGAACTTGT
```

FIG. 17 Continued 5

```
TTTCACTCCTCATTTTGACTATATGATTTCCTATTATGTGTTTTTGTCTGATGTAGTTTT
ATCTGTGTGCCTTCCATGATATTAGAACCGTTTCCGTGCTTGATTTTGTGGGGGCAGCTT
AAGGTGTTTCTAATCTGCTATAATTTTTTTCATGCTTATATAGTTGGAAAGTGCATTGAA
GTCCACAAAGGAGGCACAGGACTTGCTCCGCAGTCAAACTGATAGTGCAAGAACATCAAT
GCTCAAGGATGAAGAATTCAAGTCACTGCAATTCCAGGTGCCATTCTTGTCGACTCCCTC
CTCAAAATATCGCTATTTCTAGTGCTTAAATTTTGTCCCAGAATATAGCTATTTCTATAG
TCCTACTTTCCCCACCAAACACTCGTCTGCTTTTCACTCACCTCCATTCCTCCAACTATC
CCTCATTTATTTATTTATTTATTTATTTTTGGGGGGGGGGGCATCATAGTCTTTT
CCGTTGATCGTTAAATCTCTCCAAAAAGCCACAAGTTATATTTTAGGGCGGAGAGTGTA
TTGGGTATCTGTCATGACTGCTCCCTTTCTCTTGATTTTACTGTTGCTCTCTTATTCCTT
TTTTGTAGCTTGTTTTCTTTTGTATTAAAAATGCTTTACCTCAGGTGAGAGAGCTTAATT
TGCTTCGTGAAAGCAATATACAGCTTAGAGAGGAGAACAAGCATAATTTCGAAGAATGCC
AGGTAAGTTTATTGATGTTGTCTTGTTTATTTCTTTTATGGTGCATGTTTTGATGTGCTT
CATTGTTCTTTTTTTTCTCTCCTGGGTTCAGAAATTCCATGATGAGGCTCAAAAGGCTA
AAATGGAAGCTGAAAGGTTGCATAATCTTTTACTGGAAAAGCAGGTAGATGCTGAAATAT
GTAAAAAGAAATAGAGATGCAGAAGACCGAAATAGCTAATCTAAATCAAAAGATTTCCG
AGGTATGTTATTTACCCATTATCATTATGCAACGCATCATGAATATAATTGGTTTATTTA
TATGCGGTTAGCATTTCCTTAAGGTAGCTGACATTTGATACATGACCTTTTCTAATAAAT
AATAAATAAGAATTAAAATATAGCACTGTAGCAGCTAATGTTGTACTAGTACATTAGATA
GAGACCATGCCAGGTCAAAAAATATTTTCTTGAACTGGAGGAAGCAAACCCTCAAATGCT
GATGCTAGTTTTTTTTAGGAAACTTACATCTAAGCTAGGCAGCGCTTGTGTGGAAATGTG
CGTTTGTGTACATCTGACTTGATATTCTTGGTGCTACTTGTGTCTTCACTTTCTGTCATT
GGTTTTGTTATGAATGGAGGGACTTTAGGATTAGTTGCCCAGTGCATGTGCACAGAAAAG
GGTGTCTGAACAGCAGACCGGTGTGCCGGTGTGTACATCGAGCAGGGGTTCTTGCATTGT
GTATAAATTCAGTTTATGTTTTACCTCTTCATCAGTTAGTCTTGAATAGAATTTGTCTAG
TGTTTCCCAAAGTTCTAACATTATTATTAACATTGTTATAAGCTTGCTATTATCATTGTT
CTATCAGGTATTTTGTTTGACTCTTATGTCAACTTTATTCTTCTGCAGTTGGTTGAAAA
TAGTAGAGGCGTTGATTTGAGCACATATGAGACCATGAAGGATGAACTTCAAAACATAAA
AGTTAGTGGTTTTTTTTATTATTTTTATCTTTTCAAATCATTTGATAAGTATTTTTAGT
TATTATGTTATACTTATTCTTTTGGTGATTGAATTTGGTCTGAACATATTTTTGTTCTA
TAAATTGTACTCTGATCCAAGATATAAGAACTTCTGGTATTCTTGGGGATTAAGGAAAGA
GGTGAAATTGAATTGGGGATGGTTGCGATTAGTTGAGATGAGGAAACAAGTAGAGAAATT
AGATGAGAAATGGTTGTGATTAGTTGGGATGGGGGAGTAGGTGAAGTTGCTATATTTTGG
GACATTGAGAGTACTGATAAAATAATACTACATTTGTTCTTTTGTATGCTGGTTTGACTA
GAGATCAACTGTTTAATGAAGCATTCGGTTCTGAACCTAGTTCAAGCTTGGAATCAGATA
GCTACGGTAAAGAATAGGGAAAATGACCATTGGTGAGACAATTAGAGGGAGGGGACAGAC
AATATAGTCTGGAATAAGAACTTTGAAGCGAAACATACTTTCTAATTATTATCGGCTAT
CGCTGGTATTGGACTTGTTATGCCCTTTCATGCGCATATGCTGCTCGTTTTCTAATTATT
GATGGCAGTTGAGTTAGTTTCCCACTTTTCTCAACTTCTAATCGCTCGTTTTCCACACGC
ACACTTTTCAAACTGCTAAACAGTGTGTTTTGAAAAAAAACATATATATCGATTTTCA
ACTTTTTTTTTAAATAATACTTAATTAATCATGCTCTAATGAGTAGCCCAGTTTTCCATG
CAGGAGGGATAAGTTCTCAACCTGTATTAACGAACACAGCCTTAGTGATATATAACACTG
ATACTGATGTACATCCCTTAATTAGCATGGATGGCTGGCTTAAATTTCATTATTTGGTCA
ATACGACTGAACTTAATGAGTTTGTAAGGTTGAGTTTTGTGATAAACGATTATCACATGT
ATTTCTTAAATACAACAGGCAACCTTGAGAGAGAATTCGGCAGAGCTAGAGCGCACAAAA
AAACTTCTTTCTGAGAAGGATTCTGTAATAAGAAATTTGGAGGAAAAGCTTGCTGGATGT
``` snp_2_31013745

```
CAGTCTGAATTGGATGCTAGGGAAAAGAAGCTGAATGATGTTGAGGTCTGATATAATTTC
CAGTAACATTCTCCTGGCCATTTTTACTTTAGTTGTATTAGTAATGCCTTTCCTTTTGCA
GGCTAGCCTTAAATCTGAAATTGACAGACATAGGAAGATTAATATCAACATAAAGGTTAG
GATCTTTCCCTTGTTCTTCTATTGCAAGATCGAAAGTTCATTGCTGTTTTCATGTGCTTA
TATCATCCTATTAAATAATGTAGAGGAAGCTTGATGCATCAGCAAAAGAGAAGGAGGAAC
TGACGAAAGAAAAACAAAGCCTTTCAAAGCAATTGGAAGATCTCAAATCAAGTACTTAAT
TAATCTTATTACTTTCACACAACCACCTGAATTATATATTTTGTATGATCACTCATGTTT
TAAATTTGATATACTTTAGCAGGTCAGAAAACTACAACAGAAAATTCAAATGAACAGGCC
ATCAAAGAAAAGGACTTCAGGATACAGGTCAGGAGGTTGTGATTTTTATGAACATGAACT
```

FIG. 17 Continued 6

```
CCTTCAGGTTTCTTACATAAACATATATTAACAGACATTGGAAAAAGTCTTGGAGAAAGA
GAGAGATGATAATAAGAAAGAAAAAGCATTCCGCAGAAGGAATGAGAAAGTATTTACTAC
CGCCATTCAAAATATGAATCAGGTATTTCTTCCTCAACTAGCCTGAGTACAGTCTTGTCT
TAAAAATTTTTTTGTTTATCGTCAGTTGGGTTTAGATTGAGCACCAAATTTATCATGGAA
CTACTGATTTAATACAGATTGTCACAAAGCTACACATTAAGTAGCAAATTTGTCACAAAG
CTACTGGTTTATTGCCAATTTAATCCCAAAACTACAACGTCTATATCTTCAACATAACTG
TAGTGCTAGGGATTGAAAATCTAAAATCTGTAGTTTTTTTATAACTTGAGCAATAAATCT
GTAGTTTTGTGATACTTCTCCCTAAATCTGTACCTGATAGCTTTGGGGGAGTGGATTCTA
ATCCCTTGAGGGGATGTCCCGTCGTGTACCTTTTCTTTCAAATTCGATACAAATAGTTG
TAAAAATTTATGAAAAAAATTCGACCTACTATTTATATCTCTCGACGTGTGCGTTGCGTT
TGGACCTAAGATTTTATGGAGTTGTATACTTATGTTGTATGAGTGTTGTCGATCTTTTCC
AGAATTTTTCATAACCATTTGGATGGTTTTTAAGCAAACAAGGGGACATCCCTCGAGGGA
TCAAAATAGTTTCCCTAGTTTTGGCACTAAATGTATAGTTTTGTGATTTGTCTTAAATCC
GTAGTTTGTGAAATTTTCTCCTTTTTTTTAACCGATGCAGTAGATTTTCTAATAAGAAAA
GCCAAGGAAGTAGACATTAAGATAATGAAAGATTGATATGTTGACATGTTCACAGATGAA
CTTAGAAAAATGAAAAACTTAATGTGTTCTGGGATATACAAGATGAAACTTTTAAGTAGG
ATGTTTTAGTGTATTCTAGAGTTGGAAAGTTGGCATCATTATGAATGTTCTAAAGAATAA
GTGCCATTTTAAACCTTACCAAAAAATTGGCAAGCCAAATTTTGGTAAAGTTTGAGTGTT
TGGTTTATAACCAAGTTTTTGTCAATGTTGCTTGTGATGTATTGATTGTTTTGCCAAAA
TATTGGCAACACAAAATCTATGGCAACAAACCAAACACACACATTTTCTTGCCCTTGCCA
ATTTTTTTGTATAGTTTGTTTGGGCTATAAACCAAATGCTAAGTGTTCATGTCCATTGCC
AAACCAACCCTGAGTATTAAGCCTATCATTATGATCTACACTTTTCGTTACATTTTCTTC
TATTGAATGATTTCTTAGAATATGAAATTTCACTGTTTAAAGCTTGCAAATGTAGCATCA
TTTGAGTTTGCTAATGGTTAATGTTTAGCATGATCACAGGCAATTATAGTACACTATAGT
AAATTATTGTCTGGGGTTTGCTTATTGGCTTTTCAGGCCATGTCCCATTCCTGTGATAGC
CCTTAATGATCAGTTAGCATGCATTGCAGCTTGCTCCAACCTGTTTCCTTAGTATTTACT
CGTATTTGTTACCTAATGATACATGATGTGTACCTATTAAAAATGCAACATAACAACTTC
ATAGTTGCTTGTTTCTCCAATAATTAATCTGTCCTGCCTGGTTAGTGTGTGGTATATGCG
CACCCTCTAATCCACTTGTTGCTTTCGAAAATTAATTGCAGGAAAGGAAACAAGTAGAGG
AATCAATTGAGAAGCATAGGCAGGCTGTGAAAGAGGTGATTGAGGTACAGTTTATCTGCT
CCCATAGATTTCATGTTTCATTATTGCTGCTGCAAATGAAAGTTCCTAGTATATTTTATT
TAGAGCTTTGCTACAGCTGATGTGCGTTCTCTGCAGCATTATACTGGAATATCCTCTCAA
ATCCCATCTGGATCTGCAATCGATGAGCAGCTGCGTTCATATTTCCTTGCCATCAAAGCT
GTTGAGGAGTCTCCGAGTCCCTTCCAAGATGGTGCAGCAAGCCAGACACCATCTGTTGAA
AGTGCCGATGTGGATGCATCTGCAGCTACTGCAGGTTCCTTTCTGTTCAATTTTTCATTC
CACGCTGCTAGTGTATATTTAATGATCTCTATTAGTTAATCATAGTATCTGTTAATGACA
TGTGATACTTACTAGTTCAGAAATTATATTAGATCTGATCTATTACATGTACTCTTGAAC
TCGATGTGAATTTGGTTTTGAATGATTTGGCATGTCAGATATTGTTCGGACTTCGGAATG
TGATATGATATTGGATTTCTAATGCATCATTTTCTTGCATTGGTTCCATCGCGTGGATCT
GAATAATGTGTTTTTCCTTTGCTTTACCGTCACTTGATCAATATGGTAGTTCATAAGGCT
GCTGCTTTTTTTTTTTCTAATCTCAGGGAGACAGGTAGCTACTCCACCAAGGCCTGCTC
AAGTTAAAGTGGTGGAGGAGAGAGCAGTTTCTACTTTGCCCAAACCAAGCACTGAAGTAC
GTAGACCAGGAGGAAGGAGACCACTTGTTCGACCTTCACTTGAACGAGTTGAAGAACCCC
AAGCTGATATTGATACAACAGTAGTTGAAGGTTCCACAGAGAAAGGCGGCTTGTTGATGG
AGCGTGAAACTCCTGGTGGTGTATCTGCGTTACAGCCATCAAGTCGTAAACGTCTAATTC
CATCACCACAAACGAGAGATGATGCTTCACAAGGAGAGACAACGGATGCCAATCCACCAC
TGAAGAAACCCAAAGAAGGATCTTCACAATGTACTAGTGAGCTAAAAACTGAACAGTCAC
CTCATGAAGATGTCATGGCACCTGTTCCTGTGCTACCATCTACAGAGTTAGATGAGCAAC
AGCCTGGAGAAGAGATGGACACCGATCAGTCTTCCTTGCCAGTTGAAGAGGTTGAGGAAA
``` snp_2_31010249

```
CAAGGGAGGATGACTTGGGTGATAAGGATGACATGGAAACACATATAGACGCTTCAATGG
ACATCCAAGGACAAGATGCAGAAACTGGTATTGATAATGATGCAACTACTGTGGAAGATG
TGCCAGTCAAGTCAGAAGCGGTTATGGAATCACTGGAGGAAGACCTGAAAACTGAGGATG
GGAAGGAAGAGGGTCAGTTTACTGCAACCACTGATGTTGAAGATGAGAGGGAGGAGGGAG
AGTTGCCAGATGAACCAGAACAACCAGACAGCACTCCCCCTGTGCTGGATGTTGGTGAGC
AAGCCGGTGATTCTTTCAGGGCGGCATCTCCAGCAGGACCAACTGAAAAGAGTGATGTTG
```

FIG. 17 Continued 7

```
ACATGCCAGAAGAAACTGGAGAAGGTGATGGTACCATGGAATCAGACCAAAGCCCTGTAC
CACAATCTGGTGGAGCAGATGCGTCACCGAGCCAAATGGCTGATGCGTCACCAAGCCCTG
CACGTGAACCTTCTCCTAACCCAGTCCAAGCTGGTGCACCTCCTGAACAGCAGAATCCCA
CCCCTCCTAACCCAGTCCAAGCTGGTGCATCTTCTGAACAGCAGAATCCCGCCACTGCAG
CAGAAGGTGTTGAAACTCGTAGTACCAGAACAATCAACCTAACTGAGAGAGCGAGGCAAA
ACCGGCAAGCCAGGATTCTTCGCTCAGCCACTCAACAGAATGCAAGGGGCCGTGGCAACC
AGTCTCTTACATACAGGGTATGGTTTTATACTACAAGACTACTGAGTTTATTTCTGTTGT
GTTCTATTTTTGTTATATCCAGTGTTAATTCTGATGGAGAACAATGTTTTCTATGTGCAG
AAAGATGGCGGCCGAGGAACACGGGGTCGTGGTGGGCGTGGTCAGTCGTAGAGAATTTAG
GTTTGTCTTTGCTCAAGCGCGGAGACTAGTTTTTTGCAAAGGACATACTGAATCAGGGCG
GCATCATATTCATTTGTAGCACTATCAGAATTGCGAGCGTACATGTTACTCTGCTTAGA
CAAATTCATGTGGCTAAGCAGCGCTTATTAAAATGTTCTCATTGCCCGTGCGGATTGCCA
GATGACCTATATTTAAATTGAACTCTAGTTGACAAAGATGATATAAGCATTCGTAGCGCG
TAAGCTGATTTTTATTTTCTTTTTGATTCGCTGCGTAAGTTGATACTGAGTTGTAAATG
CGTACAAGGTTTGCTAACGAATGTCGGTTATAATTTGACTGTAGAAAACTGAACATTTCT
GAATGTTAGTCGGAGTAAATGATTTTGAACCGGACGATAATAAGATGAAGGCTACAGTTT
CACGATTGCTCATAGCTAAGCAGAGCTAGTAGACTCGGGGTCAAAAGATGAATAGATTAA
AGCCAATAATTAGATCTGAACAATGAAAAATAGCCTATAATCCCCTACATTTGAGATAAG
TTTGCACCCAGGATCTACAAAAGCCGCGTCGATCTACAGCCTCTAGTTTGGTTGTAAAAG
TAAAATCGGATGAGACGAGCCAGACACATCAGTGTATTATTAATAAATCGAAGTTCTCTT
TCAAAAAAATCCAAGTTTTTTTAAAAGCATGGCAAAAGAATTTTGCCTAATATATTTA
TGGAGTGGAAGATTGATAATAAATCAAAAGATTACATCAGCAAAGAATACATTAGGAGAA
TTTGCATACATGTTTCATTCTGCGCTAACAACTGGGACAACGACTTTGCTACTATCATTC
TGTTCGATTAGCTATATATATTCTAATGTACAGAAGTAACAGGCCGAGGCCGTCCAGTAA
CGTTCACTTTTTGTGCTTTAAAGAATGGGAAACAGTATAATCTCCACAGAAAAAAAAA
GCTAATAAACCCCAGCCACAAGCCGCAGTAGCCAGCCATACTGCAAGTTCTTCTCCTGC
ATGATACGGCCTCCACTCCACAGTCATCATCGGTCCTGCATCTGTGGGTAGGTAACACGT
CTGGTACATGGCATGCACTCTCCCACGGGGAGCCAACGCTTTGCCGGAAAATCGTTTCTG
GACAAACTTGAGACGACAATGCGCTCACACGGAAGGGTTGGCTGTCATCCTGAAGATAAG
TTTTTGGTATCATTGTTCATGCAAGTAAGGAGGAACTGGGAACA

>LOC_Os04g39430
TGTACAATTGTAGCTAACAAAACAGAATAGTAAGTGTAAGTACTCTCTCCATCTCATTTT
AAATATATTTGTGAAATTTTTGTTAAACGTTTATCTGTCTGTCTGATTTATTTTTTTATG
ATTAATATTTTTATTGTTATTATATGATAAAAACATAAATAATACTTTATGTATGACTTT
TTTATTTTTTCATAAAATTTTCAAATAAGATGGACGGTCAAATGCTGGATACATATACCC
ATAAATACACTTTAAATGAGACGGAGGAAGTACTCTTCTTGCGGTGGGCATAAGTAACAA
ATGCGAAATATATAAGAGAGTCAAGTCAGGACATCTGGTTGTGATAGTGATACGACGAT
GAATGCAGCAGTCAAGGTCCTAGGTGCGAGGACAACACCAAGTTTTTCTCCTTTCGTTTG
ATAGCATCAGGGCATCCTCAATCCACTTATATGCATATCTTCAATTCATATGTGCTTAGT
TTTCCTTATCCACCTATCCACTTAGAATTTTTCTGATTTAGTGAACTAAAGATGGCACAA
AGCCATTGTATATGTCCTCATAAATTCGATCACATATTCTAGTTACAATAGAATAGGAGT
AGAAGCAAATGGTATTTATAACTGAGACTTGAAGTTTAATCCAGTGGATTCTTTTTAAAG
TCCTACTCAAAGAAAGTTAATTGTTGGTGCTTGGTGTTGGGTACATTTTGGTGGCCATTG
TAGGAGTAGGTCTAATAATTGCCAGTAGAGGTAAGATTATACAGGGCGGGGAGGGTGGCA
GTGGTTGTCGGAGTTCCCCTGTTAGCAAGAGACCAGTTCCTGTTTGGTGTAAAATTTATA
CTTTGGCAAAACTAAAATATCGGTAAAAAAATGTATTACTGTAGAGTTTTAGAGGATAA
CTATCTTTAATGACAAGTTAAAAATGAATAACTATTTTCTCGGTGGTTTTCTACCGTTAG
TGCTACTATAATCACCGGTAGAAGAAATCTCTCAGTTGTTGATTTATAAATTCTACCACC
AATAGATAAAAACATTATACTAATAGTTAGGGTGGCAGTATAAATAGATAGGATCCAGT
AAAAAAAAGTCTAGATATCTATTATCAATAGAGACCATAGTAAAACACCTACTTCCTTCA
TCCCAAAATGTTGCTAGACAGATGATGTCCAGATTCATTGTTCTAGGATGGAGCAACATT
                              snp_4_23472861
TTGAGATGGAGGAAGTATAATGTATTACCCCGCAACCACTTGTTATACGAATGATTTGTA
```

GTATATATCTAGTTGAGTTAACTTGACACACTAAAACTTGAGCCATGCGCATATGCAATG
TTTATACATATTATAGCGTCGCAGGATTTTGATTATGTTTTAATGTGACTTTCTTTTCAT
              snp_4_23472700
GTTCTTATGAGATTGGATTGTTTGCACTTTCATTCTTCGTACACGTTTTTCGAACTACT
AAATGATGCGTGTTTTTTATAAAAAAAATATAGGACAGTTGCTTTGGAAAAAAATGTATT
AATCTATTTTTAAACTTTAAATAGTTAATACCCATTTTCTTTAATGGCTTATCTCGTATT
CTGTACTTCACAATCTTCTCATTTTCCTTCTCTCAAATACTCCATCCGTCCAAAAAAAAA
ACCCACTTCTGGGTTTGAATATGGACATAAGTGGTTTTTTTTTGGGAGAGTTACATGTTG
ACCTAGGACGACGAGATTGTGCATGCATGGGGAGACGTTTGACTTTTGAGCATAGCTCGG
CAAAGGCCGGCCAGATTGCTAGGGAGAAACAGGGCCAGGGGAGACATGACATATGTTGTA
              snp_4_23472273
CACTATACAACATCTTCAGAATTATGACAAAGCACACACAAGTCACCATAAAAAACACAG
ACAAACTGAAGTGAACAAGGCCAAATCGACCCCTGTTGCTGTAATTTTTGTCATGAAAAA
GAAGGGCTTTAGGAAATGACACAGATATGAGTCATCGAAGCAGGGGATCCCCAAGAACAG
ATTGCAAAGGCAAGGTGTGTGCGCGCGCGCATAAGCTTCATCAGATTCAGAGAGAGCT
TAATTATCACCGATGTCCCATGCATCGATCTGCACCTGGCTGTGCATGTACTACCCCAAT
GCATTTCTCTCTCTACCTGCGTGTTTGACTGCACCTTGAGCAGCAGCAGCAGCCTAGATG
CTAGCTACTCTGCATTGGACCATCCTCCTAGTCCTAGGCTGTAGGCTCATAGCCCTCCTT
GATAAAAGCTACTACTGGCACAGTATATGCATGCAGCCAATTCACTTCACTGCAGTAAAA
AAAAAAGAAAACAGAGAGAAACAGAGATCAAACAATGCAAGAAAGAAATACCCCTACTT
CTACTTTAAAACAAGGCCAAAGCAAGGAAACAAAAGGCAGCCTCTATTTTTTTCCCTCC
CCCCCCTGCTCATCACCCCTTTCCATCACTCCCTCCCTTTGCAAAGATCCTTCCTGCCTT
TGCTTCTACTGCTATATAGCCTCCCCCCTCACCTTCCATTCCAGAGAAAAATAGAGGGAG
GGAGAGGGAGAGAAGCAGAGTGTTGAGCACAAGCTAGTGAAAGGGTTAGATAGAAACTTG
GTAGAATAGACAGATAGGCAGAGAGAGAGAGAGAGCTTAGCAAGCTAAGGCTTAGCTGCT
GCAAGGCTCCATCCATGCTTCTTGTTGTGAGATGAGATTGAGATAAGATGAGCAGGGGGT
                             CDS Start
GGTGGTGCCTGGTGTGAGGCTATAGGTAAGATGGTGGGAGGAGAGCTTGTGCTGGCTGCT
CTGGTGATCCTGCTTGCTTTGCTGCTGACCCTGGTGCTGAGCCACTTCCTGCCTTTGCTC
CTGAATCCCAAGGCTCCCAAGGGAAGCTTTGGGTGGCCTCTCCTTGGTGAGACGCTGAGG
TTCCTCAGTCCTCATGCTAGCAACACCCTGGGCAGCTTCCTGGAGGATCACTGCTCCAGG
TAAATTAAAATCATATGCAGTAAACATTTCTATCAGTATCACCACCACAACCACACAGGA
GCAACAAGTGTCATCTTACCATGCAATTAAGTACTGTACCATTATTTCATGTGACAGCAC
AAGGTAATGCTGCTGTCCTGTCCCAGCAGCTTTATCACGCCCTTTTTTTTCCTCCCTGAT
GAGGGGGGTGCTGTAACATGAATTGGACAGTGTTTAGCATCTTGTTAAAGAGTTGTGCAA
ACCTTTTCTTCCGATGAACAAGCGAGAGAAAAGGAATGTAAAGGTTGCACAACACTTAAC
TAGCTAGCATGCATGGTGGTAGTAACACTGATGATGGTGTGATGATGATGATGCAGGTAT
GGGAGGGTGTTTAAGTCCCATCTGTTCTGCACCCCACCATAGTGTCCTGTGACCAGGAG
CTGAACCACTTCATCCTTCAGAATGAGGAGAGGCTGTTTCAGTGCAGCTACCCCAGGCCA
ATTCATGGCATTCTGGGCAAGTCCTCCATGTTAGTGGTCCTAGGGGAGGACCACAAGAGG
CTCAGGAACCTTGCTCTAGCACTGGTCACCTCCACAAAGCTCAAGCCCAGCTACCTTGGC
GACATTGAGAAGATTGCACTGCATATAGTTGGGTCATGGCATGGCAAGAGCAAGGACAAG
GGGATGGTCAATGTCATCGCCTTCTGCGAGGAGGCAAGAAAGGTTAGCAAGTGTACTAAC
TTGAAACCAGAGCCATATCACCACAAGGACATGATCCCTTGAAACAAGGGAGGGAAAACT
TTGCACATGTTAGCTACATACCATCATCATCATGTTGTTACTTGCTGCTGCATGAATCTT
TGTCCCAAGGTCACTTTGACTTACCATGGTCTTTTTTACCTTTTCTTTTTTTTCTCTCT
CTGGTGTGCTCTCTTTCCTTGAGAACCACAGTTTGCATTCAGTGTAATAGTGAAGCAGGT
GCTGGGGCTATCACCAGAGGAGCCGGTCACTGCCATGATACTTGAAGATTTCCTCGCCTT
CATGAAGGGTCTCATCTCTTTCCCTCTCTACATCCCAGGGACGCCCTATGCCAAAGCTGT
GCAGGCATGCAACTCAACATCTCATTTACACAAGTCGTTAAACTGTCAATAAAATTTTCA
GGCCATTTTATTTTTGTATACTTACCATAATAACTTCATCCTTTTGTCCGCGAATCCTCA
CAGGCCAGAGCGAGGATATCAAGCACTGTGAAGGGTATTATTGAGGAGAGGAGGAATGCT
GGCTCCAGCAACAAGGGTGATTTCCTTGATGTGCTGCTTTCAAGCAATGAGCTCTCTGAT
GAGGAGAAAGTGAGCTTTGTGCTGGATTCCTTACTGGGAGGATATGAGACCACCTCACTC
TTGATCTCCATGGTTGTGTATTTCCTTGGGCAGTCAGCTCAAGATCTGGAACTAGTGAAG
GTATACAGACTTCTCATGCTGAAAAAGACAGAGCAGTACTGGTAAATAAGTACTTAATTA

```
AGTGGCCATCAATAAAATATATATTAACATGTTTGCATGCAGAGGGAGCATGAAGGCATA
AGATCGAAGAAAGAGAAGGACGAGTTCTTGAGCTCTGAAGACTATAAGAAGATGGAATAT
ACCCAACATGTAAGATGATCGTTCAATACATGCTTTAGGATTAGTTAGTAAGCCAGGGGT
ACCTTTTTTCCTATTATCAGCAACTACACAAATATGTGACCCTCCGAATATGAGGTTTA
CTCATATTCAGAACGATTCTCCTATGCCTACCCATATATGCAATTTTTGAATTAAGCAAA
AAAAAGAAAAGAAACAGAGAGAGAAAGAATCTCATTACAATAGAGTGAAAAGGGCGGAA
GGGACATGTTCTTCAATAATGGAAACTGTATGATGATGCATATGCTATGCCCTTACAGGT
TATCAATGAGGCACTGAGATGTGGCAACATTGTCAAGTTTGTCCACAGGAAGGCTCTCAA
AGATGTCAGATACAAAGGTAATTAACCCTACTTGAGGCTTTCCTTGAAGATTCCATTGTG
CTCATCACATGATAATGGATCAGGCAAAGTGGATGGTTGCACCTTTATTACTGATTTTTA
AGCATTGTTATTCCTAAAATACCTCAGCTTTTCATAGAAGATGCTCAAAAGCAAGTGGCT
CTTTTTTCTTTGCTCTGTTGCAGAGTATCTGATTCCTTCTGGTTGGAAGGTCCTACCTGT
TTTCAGTGCTGTTCATTTGAACCCCTTACTTCATGGAAATGCCCAACAATTTCAGCCCTG
CAGATGGGAGGTACGTTTGTTTCCATAATCTGTGAATGCTCCGCAATACTTACTAAATGT
TTATTGTTAATGACCTAATGAAAAATGTTTTGGACCAGCTAGGCCACGAAGCTTAGCTTT
CACGTAGTATACTTTTCTATAATACAAATTTATAAAATGAAAGTTCAGAGCACCTATCA
AGAGAGCTTATCTGGAGCCTTGAAAGAATCTTCTTTAAAGGGTGTTCTCTAACTAATTGC
TACCTTTAATTAGTGAGCGCCCAACTATGACATAATTACTCGCAACTATTCTGGTGTCTT
CAGATGCCAAACAAGCTCCCTGTGGCTGCAATGCCTTTTGTGCATGGTCCTAACCATGAT
TCCTCTCATTCAAAGCCAGCATTCTTGGCTTTGCTTCCTTTTCTTAGTTTCTGTGATGAA
GCTAATGGTCTGATTCATGTGTGTTCCTAATCTGATTGATGCAACAGGGTGCAAGCCAAG
GGACAAGCAAGAAGTTTACGCCGTTCGGCGGTGGCCCCGGCTCTGCCCTGGATCAGAGC
TTGCAAAAGTAGAGGCTGCTTTCTTCCTCCATCACCTTGTGCTCAATTATAGGTAAAACA
AAAGGGTATATTTGTCCTACCCGAGTAGAAGATGCATGGATCAAAGTTGACTGGCTTAAA
CAGCAATGAACAAAATACGTTCAGAAGTAATATTTAAGAAGCTGGTGCAGAGTAGTTGGT
GTTTAAATAGGCCATAGAAAACTGTTGAGGCAAACATGAACAGGAAAACATACTGATGCA
GTTACCACTCTCATACTGATAATACACACTACACTAGACCACTAGTAAGTAATGGCAAGA
AGGCCATGACAGCAACTAGGCAAATTATTTATGCTTTTGTCTGTAAGGACCGCAAGTCTG
AACTCAGCTATCTTGTGCATTTTCATAAGTGGCACTGTAGAGCATAGAATCAGACGACAA
CACACAGAACAAACATGACAGCATGGAGTTTTCGATAGGTAGGCTATGCAAGTTGAGTTG
AGGGCTGCCATACAAGATAAAATATACTACCACGATATGATCAAACTCTTTTTTTTAAAA
AAAAAACTAGGTTCATTAGCAACAATCTATACGTGACAACTGACAAGAACAGGCAGATTT
ATGTAAATTATGCGGTTGTTTCAGAGTAGAGTCTACATGTACTTACTGAATATCCATGCC
AGAGAAAGGCTGATCATCGTTCTTCGTTTCTTTCGTTTCTTGAAAACCTGTGCAGATGGA
GAATCGATGGCGATGACATTCCGATGGCATACCCGTACGTGGAGTTCCAGAGAGGTCTGC
CCATAGAAATCGAGCCACTTTGCTCTGAATCCTGACAGGTTTGCAGTTGCAGCCACGGTG
AGCGAGTTCATCAAATCATCCCCGCAAGCGAGGGGGAGATGCGGGCGAGAACGACGGACT
GAGAGGATTAGTCAGTGAAACAAAAAAAGGAGAGAAAATATTTCAAGAACTGAAGAATG
CACTGAGCATTAGCTAGTAGTACCTATCAATGAGCCAAGCTGAGATTGTAATTTGCTGTA
CATGGTGTAGATATATTTGTCCATGCCGATTGCTTGCGGTGGTGGTGGTGCGGTGCTTC
ACCCTGTAACATCCTCCACTGTTTCAACTTTCATCTGCTATTCTATAGAAGAAAAAAAA
AGAAGAAAATTGGGCTATTGGGCTATTGAAAAGATTTTGGATGAAGCCAAAGATCTTCAA
AAACAAATCATTGAAACTTTGAAAGAGTACTCCTATCCTTTAATAATATGAACATGAACA
TGAACATGTATGGACTGTACTCTGCACTACTTCTCAGGGAATTTCGGAGCAGACAAATTC
GATCGTGGATAATCCCTATCAATCGGAGATGGCTGGTCCCGTTTGGATTGGAGGAATTTC
TGAAGGAATCCTTTCCTGCAGGGGAAATCTTAGTTTCAGTGTTTCTGGACTGAAGGAAAA
AACCGGACGAACAGCAGCATTATTCCATAAGAGTGGGAGTTCCCCCCCCCCCCCCCTCA
CATCGCTAGACGATTTCACGGGATAACAGTCCCCGAATCCACCACGCGTAACCTCGCCCA
GGATCGAGGCCGAATTCCAGCCGAAGCCGCGCCGCGCCGTCGTCCCCGTATCCAATCCAC
CGCGGCGTCGACTCTCCCGCCGTTGCGCCCGGCCCAACGCCGGCGGCGGTCCCGCCTCTA
GCGGCGCCCGCAGGATCATCTGCACACCCCGCGCGACACCGCCGCCCGCCATGCCCGCC
GCTCGAGCTCAACGTGAGAAGGGGAAGGGGAGAGAGATCATAGTATGAGAGGTTTACTGG
AGAGGATAAGTTAAAGAGAAAAAGGTATAAAAAGAAAGAAAGAGAAAGATCATAATAT
GATTTTTCTATGTTTTTTTACCAAAATTTTCGATGTTTATTTTTACCAGAATTTTCTA
TGTTTATTTTTACCAGAATTTTCTATGTTTATTTTTACCAAAATTTTCTATGTTTGGT
GGAGTAATCCTCAGTTTTTGCAGTCGTGTTGCTGTGTTTTCTTTTTTGCGCCTATATTCC
TGTGTAATTTGTATAGGGCATAAAGTTTGTCGGAACTTGGGATTATGTGGAACATAGCAT
```

FIG. 17 Continued 10

CGCATTGTTCAGGAATGAGGACTGCAATTTTGATCTTCGGGGATTTGATCTTGAAAAACA
TACGCACATACAAAATTGTATCACATTGTTCAGGACTCAGGATTGC

>LOC_Os11g35390
AGTTTCAGTTTCAGAGAGAGGAGTCAGTGGCTGTATGCTGCCATGGCTCTCAAGGTGGCT
AGATAGACAGACATGTTGCCCATCAACTTAAGAAGCAACTAGCTGCTGCTGCTGCTAAGG
GAGAGCTATAGGCTTAGCTGTGGTAGGCTATAGATATTACTATTAGGTAGCTACTAGCCT
        CDS Start
ATAGGCAGACATGGGGAGACCTCCATGCTGCGACAATGGCGTCGGCGTCAAGAAAGGGCC
ATGGACGCCAGAGGAGGACATCATCCTCGTCTCCTACATCCAGCAGCATGGCCCCGGGAA
CTGGCGCTCCGTGCCCGAGAACACCGGTTAGCCCCCCCCCCCTCCCCCTGGCTCTCGCGT
TTTCGATCCATTCGTCGTCGAATGATCGATATTGCATGTGTTTGATTTTTGCATGGTTGA
TATCAGAAGCTGTTTTAGTTATGCTTCTGTTGTTGTTTAGGAGTTGATGATAAGTTTGTT
                                                    snp_11_20737146
TCTGTTGTGTTTTTGTATGTGTTTAGGATTGATGAGGTGCAGCAAGAGCTGCAGGCTGC
GGTGGACGAACTACTTGAGACCGGGGATCAAGCGTGGCAACTTCACCCCTCATGAGGAGG
GGATCATCATCCACCTCCAGGCATTGCTTGGCAACAAGTAATCACGTACATAACTCAATT
TAAATAAATTGTTGTATCATATACATGAGCATCAAAATCTAATGGATGTTTTTAGTTTA
TTTTCTATCCTTGAAGAGATATATATACATCCGTACCACTCCGAGATAAAAAAAACTGTA
AATCAATTGAACTGATTAGAATTGACATTGTTAGAATTTTCCTGGTTCTTGGGATGAATA
AAATGTTTACTTTTATATGTGAATCTAGATGTAGATTATGTCCAGATTCATTTAAAAAAT
AGACTTATTTTATAACGGAGGGAGCATATAACCTCATAGTTTTACACGTAAGGTACATAC
CTCCTAACTAATACTCATACCTCTTAAAGATTGAAGAAAACGCCAACAAATATATAGGTG
AACTCCCAATCCTACTCTCATTTGTTATGATATTGGTTTTGGTACATCACTTCACAGATC
TTATATACCTCTGAACTCTAGTCCAAGAATGAAAGAAAACCTCTATGCACTCCTATATAT
TGTTTATAGTTTAAGCTTAGTTTATGATAACTCAAGCAAACCCTGACTTTCTGATGATC
ATCTGAACTTTTTCAAAATCATATTGTCTTTACCTTAATCATGCTTTACCTTTTGCATAT
ATTACATGACAGGTTATAACATACGCCCTCCGTCCCAAAAAACTCAACTTCTAGAGATTG
AATTTTGTCTAAAAAAAACAACTTCTATCATCCTACCTACTCTCAGTACGTAAAACGAGA
AGTTTTATCCCTTCAATACCCTTTACCTATCTATCTCTCTTACTACTTTTTTTCAATGAT
TATGGGTATTTTAGTCAATCTTCATCTCCACTATTTTGTCTTGGGATGTTAGGATTGAC
ATTTTTATGGGACGGAGAGAGTAGTGCCTAAATATTTATCTATTGTGCATGCAGGTGGGC
AGCAATAGCCTCCTACCTCCCCCAAAGAACAGACAACGACATCAAGAACTACTGGAACAC
ACACCTCAAGAAGAAGGTGAAGAGGCTGCAACAACAACAACAATCACACCCTGATCATCA
TCACCACCATTCCTTCCAAACCACCCCTTCTTCCTCCAATGCAGCAGCAGTAGCAACAAC
CAGCCCAAACTACTACAACCCTAACAACAGCAACAGCAACAGCAGCAATTACCTCCATAA
CAACAACCACAATCTTGAATCCATGCAATCCATGGCCACTGCACCTAGCAATGAGGCCAC
CACCATCCCCAAGCTCTTCCAGTTCCAGACATGGATGAAGCCATCACCAGCAACAACATC
ATCAGCAGCAACAGCTGCTGCAGGTAGCTGCTACAAGCAGGCCATGGCCATGCAGGAGCT
CCAAGAGGAGCAAGAGGGCTCTGCTGCTGCTGCAATGGCTTCTTCCATTGATGGCGT
CTCCAAGGACCAGGATTATCACATGTGTGCTGTGATCAGTGGTGATGACAAGTCGTCGTC
GTCGGAGATGATGACGGCTGCGGCAATGGCCGGCCATGGCGAGGCGGCCACGACGACCTT
CTCGCTGCTCGAGAACTGGCTGCTCGACGACATGCCGGGGCAGGCGGCCATGAGCGCCGC
CATGGATGGGTTCTTGGAGATCTCTGCTGGATACTGCTGTGCAGACCCTATCATGTTCTG
AACTTTCTGAACTTCTGATGATCATCTCAGCCTTAATTTCCCATATGAGTCTCTCTTTGC
TATAGGTTTCTTAATTTCACTGAGTTAATTTGCACTTGTACTAGCTGTTTGATGCTCTCT
CTCTCTCGATGATCTTGTGTTTCCGGTAATAAACCGTTGGTTTAATTTCCTCAAGAAAAA
GCAATCCACCTGGAAATAATCTGTTGGTTTGGAGAAATATTGTCAGTTCTCAAGGATGT
AATAAAAGGATTAAAGCTGCCATAATTCGTTGCCTGATATGCAATGTTCTTGTTGTTTTT
GGAGATGG >LOC_Os06g40780
ATGTAGTATATTTTTATTCTACTGGCTCTTGTACTGGATGTTGCTGCTGCAAGTGATCGA
    CDS Start

FIG. 17 Continued 11

TGCATGCATGAGAGTGATGAGCTGCTTCTGCTTGTTGCCTTCCTCACTTTGGGCATTTCT
CTCTCGCCTTCCTGTCCATTGCTGGCCTTATGTGAGGTTTTGCCAATACCTCTAATCATC
TCCTCTCTCACTTTCTCTCTCTCTTGATGCTACTACTGCCTTGCAGAGGCAGCAACAGGA
GAGAGTAGCAGATTCCTTTGTTGTTCTGCCCACAAGAGAGAACTCACAACTCACAAGTAG
TAGCAGTAACAACATCAGCAGCAGGTACTACTAGACCCACACACATGCAAGCACAGATAT
GAGTATATGATCTTTCTCCCATGCCACAAGTGAAAAGATTTCTCCCTCTCCATTATCCTT
TGTTTCCTTTTGCCTTTTGTATTGTTCTGAATGCATGCTGCTAGCTACTCCAGCTACTGG
TTGCTCTCTACACATGTGTGTATACAACTACACATACTATGCTTATTTGTACAAAATT
TTGTGCAGGGTTGGAAGCAAGGGATCTCTGCATGCTGTGGTTGCATGACACAGATGCACA
TGTCCCTTTTGGTGGGTAATGATGGGGTGCAGGTGGAGGTGATGATAGATTGCCTCATCT
GGGGACTGAGACATTCCATCCAAGGGTGCCCAATGCCATGCCCTCACATTCACTCACAGC
TAGTAGAGCTATCCCCCTCCCCTCCCCTCTTTGCAATATTCCATTTGTTTGCTAATGTGT
TGTATCAAGATGCCCTTGATGTGAGTGTTCACTGCCCTCTCTGTCCCTCATTTTTTGCAT
CTCTCATTCTCATGCATTGCATACCATGTACAACTACTGCTTCAGCTAGAATTGCATGTG
ATGTATATATATGATAGTATATCCTTTGCATCTCGGGAAATATGTAGTGCAAATCACAT
ATATAGTGGAAACTTGAAAACTACCGTTGAATCGAGAAATGGACGTCCGAGATTCGTCCA
CGTCATCATGAGTTAAAATTTAACTCGCAGATTCACTCATGAGTTAAAATTTTACTCGGA
GTTAAATTTTAACTCATGATGACGTAAACGAATCTCGGACGTCCATTTCTCGATCCAATG
GTAGTTTTCAAGTTTTCACTACATATGTGGTTTGTACTGTATATTTTCCCTTGCATCTCC
ATGTATCTCAAAAGTTACATGAGTGGCACTTGCTACTGTGCATGTAGTATGTGTAGCAGC
TAGGTTATAAATTTCTTTATGTGTAACATGTGTGTGATGCATAGTATATGCAATGTGAAA
CACTGACACAGCTAGACCAGGTGTGGGGGGTGTGCTTGTTCTTGTTGCAAGGAAGTTATC
                                                              snp_6_24312857
TGGAGGCCATCATCAATGAAGATCCCACCAAGGGACAAAACATGAGATGGTTGGAGACTT
GGGTCTGTCTAGTCTCTATTCAACCATTTAAAGCATTGCGTGTGTAGGCTACACTCGGAG
AGAGAACACAGAGCAGCCGTCCAAACCGTCTGAAATGATAACTTACTCTAAGCTAGTAGG
AGTGCTAGTAGTACCCTCTATATGTGCAATTTTATTCGTTAAAAAGGTTTCCATGCATGC
TTTTTTAGTTTATCAATAGCCTAAACCTTTTGAATTATTAAGAGTTAATTAGTCCCAAGT
GTGTATGATTACTCCCCCAAATTCTCTTTGTTTTCTTCGAAAAATTTGCAGTTATTTAAG
TGAGGTCCTCTCTCTCTCTCTCTCTCTCTCTCTCTTTGATAAACTGAGGTTCTCAAGTTT
CATGTTTTACCAATTAATCAATCCCAAGTAGGTTTTATTTTGTTGATTTAAGTCCTCGG
ACCTCAAGCCCTGAACATTCAATAATTTATCAAATTCAAGGACCTGCAGTTAGATAATTT
                                     snp_6_24313378
TTAGTTAATAGAAAAAAATATCGCATTTGTTGCAACGGGTGAAGACTATTTTAATCTTAT
TATTGTTATACGGTTTAGCTAGGGTAAAATTTACTCTAAAAATTCGTTTGAACTTTTTTT
AAAAATGTCATGAGCTACAATTAGGAGTTTGACTTTCGTCACAAGTTAGCATGCAAGTTT
TTTTAAATATATTTCTTATACGACTCCTTTTGTATTTTCAAAAGTGAACAAACATAAAAG
CTAACTCAAACACAAATCTATATTTGCAAAAGCGAACGAAATTAAAAACCAGCTCAAACA
AGAATGACATACAAAGTACTGACAAAAACATATTTAATTTTTATAATAGTAGAGATATGA
GTAAAAGGGACCAAAATCAACAAAGCAAATAGTGGAGAGCCGGAATCAACACTGTCTGAC
TTGGTGAAGATCTCAATTACACAAAATGAATGCTTTAAAAGGATCATTTAATTAAAGAA
ATACCAAATATATAATAATAGCTAGTACCATCATATTATATATACTCCCTTTGTCCCTGA
AAGAGTATTATCCAGATTCATTCATAGCTAAAATACACTCTTTTAGAGATGGCCGGAGT
ATCATTATATGTCTATAGCATATACTTCTACTTAACATATATAAATACATACTCCCTCCG
CCCTAAAATAAGTGCAGTTTTGCACTATTCACGTTCAACGTTTGACCGTCCGTCTTATTT
GAAAATTTTTTATGATTAGTATTTTTATTGCTATTAGATGATAAAACATGAATAGTACTT
TATGTGTGACTAAATGTTTTTAATTTTTTATAAATTTTTCAAATAAGACGGACGGTCAAA
CGTTGAACGTGAATAGTGCAAAACTGCACTTATTTTGGGACGGAGTTAGTACATATATAT
ACACATTACACATTGCATACATAAACATACAACCACACTGCCCTCTAGCTATACACATGC
CATGATGCCAAGAGCCAATGATCACCACCCAAATCCTTCTAGCAATAGCTCCCTATGGCA
CAAACAGTCACAGCTGCACAAACACACACACACACACATATCACCCATTCATCTACTC
TAGCTAATCTAAAGGCACTAGCATAGTACTACAATCAACCAGTAGTAGTAGCCCTCATTT
GCATGTTTTATTTCGCCCACCAATCCTTGGAATGTTTTAGATTCCCCCCTCTCACTCTC
TCATCAAGGAATGAGCATCCCCCATTCTCCCCCAACCCCTCATATTTTCAGTTTCTCACT
CTACCTTTCCCCTCCTCCCCTAGCTAACCCCTCTCTCTTTCTCTCTCTAAAGCTCCAATC
TTTCTACCTTTCTCTCTCTAAAAGCTGGAGTAGCTTAATTTCTTTCTTTCTTTTTCTTTC FIG. 17 Continued 12

```
TCAGCTGGGATTGCACAGTGAAGCTAGGGAGAGGCTATAGCTATGGGGGTGATGTAGCTG
GGCAGTGAGGCTAGTGACAATCTCTCTCTCACACACACACACACAAAAACACTTGTGTAT
TTTTGGCAGATGATGTCCTGTCAAGGAAGCTGCAATTGCAAGCCCAGATGTTGGACGTGC
ACGCTCGCCCTCCCTATTAAACCCGCCCTCCTCCGATGCTCCCTCTCCTCCTCCCCCCTC
GCCGCCGCCGCCGCCACCTTCTCCGGCAGCTCACCGTCGTTGTAGTAGCTCTGGTGGTGG
TGGTGGTGACGACGACGGCTACGGCGGCGGCGACGGCATGCTCCGGTCACTCCACTCCTC
GTCGTCTTCTGACACGGATAACAACAGCGGTGGCTGCAAGAACAATGGCGGCGGCGGTGG
CGAGGCCGCCGCCGCCGTTGAGGGTGGCGGTGATCAGCGTGCCGTTGCGGCGGCGGCGCC
GTCGACGCGGGACTTGCTGCTGGCGTGCGCGGACCTGCTGCAGAGGGGGGACCTGCCGGC
GGCGAGGCGAGCGGCGGAGATCGTCTTGGCGGCGGCGGTCGCCGCGGGGCGACGCGGC
GGACCGCCTGGCGTACCACTTCGCCCGCGCGCTGGCGCTCCGGGTGGACGCCAAGGCCGG
CCATGGCCACGTCGTCGTCGGCGGCGGCGCGGCGCGGCCGGCGTCGTCCGGGGCGTACCT
GGCGTTCAACCAGATCGCGCCGTTCCTGCGTTTCGCGCACCTCACGGCGAACCAGGCCAT
CCTCGAGGCCGTCGACGGCGCGCGCCGCGTCCACATCCTCGACCTCGACGCCGTCCACGG
CGTGCAGTGGCCGCCGCTGCTGCAGGCCATCGCCGAGCGCGCGGACCCGGCGCTCGGCCC
GCCCGAGGTCCGCGTCACCGGCGCCGGCGCCGACCGCGACACCCTCCTCCGCACCGGCAA
CCGCCTCCGCGCCTTCGCCCGCTCCATCCACCTCCCCTTCCACTTCACCCCGCTCCTCCT
CTCCTGCGCCACCACGGCGCCCCACCACGTCGCCGGCACGAGCACCGGCGCCGCCGCCGC
CGCCTCGACCGCCGCCGCCGCCACTGGCCTCGAGTTTCACCCGGACGAGACGCTCGCCGT
GAACTGCGTCATGTTCTTGCACAACCTGGCCGGCCACGACGAGCTCGCCGCGTTCTTGAA
GTGGGTGAAGGCCATGTCGCCCGCCGTGGTGACCATCGCCGAGAGGGAAGCAGGCGGCGG
CGGCGGCGGCGGCGACCACATCGACGACCTGCCGCGGCGGGTCGGGGTGGCCATGGATCA
CTACTCGGCGGTGTTCGAGGCGCTGGAGGCGACGGTGCCGCCGGGGAGCCGGGAGCGCCT
CGCCGTGGAGCAGGAGGTGCTGGGCCGGGAGATCGAGGCCGCGGTGGGGCCCTCCGGCGG
CCGGTGGTGGCGCGGCATCGAGCGGTGGGGCGGCGCCGCCCGCGCCGCGGGGTTCGCGGC
GCGGCCGCTCAGCGCGTTCGCCGTGTCGCAGGCGCGGCTGCTGCTCCGGCTGCACTACCC
GTCGGAGGGCTACCTCGTGCAGGAGGCGCGCGGCGCCTGCTTCCTCGGGTGGCAGACGCG
CCCGCTGCTCTCCGTCTCAGCGTGGCAGCCGTCGTCGTCGTAG
```

According to a specific embodiment, the OsTPR protein sequence is:

```
>OsTPR
MPLFMSEEELRLLGGDVAAVAERADAAIRELRQQVDTVRAEADAAAIAAEQTCALLEQRY
DTLSAEADRFRAELAELAAASERRAADLASSQSEIHQLRIQAIAKDGEIERLKVEISEVH
KSKSQSLELIEQRDAEIREKDGIIQNYLDKIVNLADSSASKGARIQEVEAKFTHLQATCN
RITQEKDLLEKHNLWLDEELKEKVKNLAELRKSNMDEEARMSAKVAELERETSESSSSLR
RSKERVSELEQRVSYMEKELCSTKDAAAANEQRLAAELSTVMKLAELHKESSEEWSKKAG
ELEGVIKALETHLTQVEDEYKEKLEKETSAKRDLEMEATYLKQKLEKCESDLENTRKSSE
LSFTPLVAADPCDLAGSPMKEMAFSDPANQNDLMIVPKVPTGVSGTALAASLLRDGWSLA
KIYEKYQEATDALRHERFGRRHAEAVLERVLHEIEEKAELILDERAEHRRMVEAYALMDQ
KLQQALLEHDNFENTIRNLKSELKRRERDHSIAQKEIDDLQKQIKLSIYLTFAPTQACIL
GVCTSKNYYDINGNHCGAVLKIAVLLKECQDIQLRCGSSLPNVGDGALSTSTSTGVPEVE
NNIHEHMTFNDINGLVQQNVQLRNQVHLLSADLDKRDMELRESFQIELKKITDDAASRVE
                  snp_02_31026954
KVMKKSEEQAIMIESLHRSVAMYRKLCEEQQKSRSNVEHIPKNLEDDGRKDLMVLFEGSQ
EVSRKAYEQVSERAKSLDEELTKLRTELLSLRSERDKAVLEAEFARERLNGFTAELEHQR
                          snp_02_31024549
KEANSISLRNAELMHLVVDYEKRLRENSESMKAVEENSRKLLMEMSILKNEKEILAKSEK
KALEEVHDLTTRVHRLQATIDTIHATEEVQENARSIERRNQEEYIKRLERDWAEVKKELQ
                               snp_02_31023080
EQRDHVRVLTLDKKNAFDGCLKQVEDMRKELQNSWKAATDAESRAAVAEAKCSDLETKLK
SRKENDELFQLKEELEKYKEEAQANKSYMLQYKEIANSNESALKQMESALQDFKTESETI
KKSLEDEITKLRTKISELEKCYIMKCEEAASAIEAKEKDTTSLMKEISVLRNEVSEKVIQ
IEKLETELASSKRALDEQYKRWRSAQDNYERQVILQSETIQELTSASKELSSLQQEIIVL
         snp_02_31019010
```

FIG. 17 Continued 13

RQTVETQKAENDGLRTLGEQEKIELVKGKDEALQKYNELNDQNKILHNQLEALHIRLAEK
ERNIAGLSSQRIDSHGEDDLHSVIGYLRRSKEILESALKSTKEAQDLLRSQTDSARTSML
KDEEFKSLQFQLVFFCIKNALPQVRELNLLRESNIQLREENKHNFEECQKFHDEAQKAKM
EAERLHNLLLEKQVDAEICKKEIEMQKTEIANLNQKISELVENSRGVDLSTYETMKDELQ
                                                          snp_02_31013745
NIKATLRENSAELERTKKLLSEKDSVIRNLEEKLAGCQSELDAREKKLNDVEASLKSEID
RHRKININIKRKLDASAKEKEELTKEKQSLSKQLEDLKSSQKTTTENSNEQAIKEKDFRI
QTLEKVLEKERDDNKKEKAFRRRNEKVFTTAIQNMNQERKQVEESIEKHRQAVKEVIEHY
TGISSQIPSGSAIDEQLRSYFLAIKAVEESPSPFQDGAASQTPSVESADVDASAATAGRQ
VATPPRPAQVKVVEERAVSTLPKPSTEVRRPGGRRPLVRPSLERVEEPQADIDTTVVEGS
TEKGGLLMERETPGGVSALQPSSRKRLIPSPQTRDDASQGETTDANPPLKKPKEGSSQCT
SELKTEQSPHEDVMAPVPVLPSTELDEQQPGEEMDTDQSSLPVEEVEETREDDLGDKDDM
 snp_02_31010249
ETHIDASMDIQGQDAETGIDNDATTVEDVPVKSEAVMESLEEDLKTEDGKEEGQFTATTD
VEDEREEGELPDEPEQPDSTPPVLDVGEQAGDSFRAASPAGPTEKSDVDMPEETGEGDGT
MESDQSPVPQSGGADASPSQMADASPSPAREPSPNPVQAGAPPEQQNPTPPNPVQAGASS
EQQNPATAAEGVETRSTRTINLTERARQNRQARILRSATQQNARGRGNQSLTYRKDGGRG
TRGRGGRGQS FIG. 17 Continued 14

METHODS OF ENHANCING GRAIN YIELD, PLANTS AND PRODUCTS GENERATED THEREBY

RELATED APPLICATIONS

This application is a Continuation of PCT Patent Application No. PCT/IB2020/055840 having International filing date of Jun. 21, 2020, which claims the benefit of priority under 35 USC § 119(e) of U.S. Provisional Patent Application Nos. 62/926,585 filed on Oct. 28, 2019 and 62/864,548 filed on Jun. 21, 2019. The contents of the above applications are all incorporated by reference as if fully set forth herein in their entirety.

SEQUENCE LISTING STATEMENT

The ASCII file, entitled 90442SequenceListing.txt, created on Dec. 21, 2021, comprising 47,024,652 bytes, submitted concurrently with the filing of this application is incorporated herein by reference.

FIELD AND BACKGROUND OF THE INVENTION

The present invention, in some embodiments thereof, relates to methods of enhancing grain yield, plants and products generated thereby.

Altering the panicle architecture of rice was a major breeding target to improve grain yield during green revolution (Zhu et al., 2013). Compact dense panicle with more primary and secondary rachis branches was preferred, resulting in more number of grains and thus increased yield (Sweeney and McCouch, 2007). Rachis branching pattern in rice mainly depends on the inflorescence meristem activity abortion. Also, delay in rachis branch meristem conversion into terminal spikelet meristem, and next order rachis branch formation lead to an altered number of secondary rachis branches (Ikeda-Kawakatsu et al., 2009).

Molecular genetics mechanisms underpinning rice panicle architecture identified yield-enhancing genes that were functionally validated using mutants or the transgenic approach (Ying et al., 2014). Genes belonging to growth-promoting hormones and transcription factor families were characterized, which influenced rachis branching and the number of grains in a panicle (Xing and Zhang, 2010). Such genes affecting the rice panicle architecture include MOC1 (Li et al., 2003), FZP (Komatsu et al., 2003), Gn1a (Ashikari et al., 2005), APO1 (Ikeda-Kawakatsu et al., 2009), DEP1 (Huang et al., 2009), SPL14 (Miura et al., 2010), LAX (Tabuchi et al., 2011), SPIKE (Fujita et al., 2013), TAWAWA1 (Yoshida et al., 2013), PAY1 (Lu et al., 2013), FUWA (Chen et al., 2015); Ghd7 (Weng et al., 2014), OsNAM$_{1 2.1}$ (Dixit et al., 2015), GRF4 (Sun et al., 2016), and DWARF11 (Wu et al., 2016) among others.

Increase in grain number targeted through more secondary rachis branches can create a tradeoff between yield and grain quality (Mohapatra, 2013). Inferior grains (in the lower part of the panicle) formed due to secondary rachis branches have inordinate protein content, poor palatability and reduced milling quality due to high chalk as compared to the grains located on the primary rachis branches (Matsue et al., 1994; Matsue et al., 1995). Paradoxically, the number of secondary rachis branches is more important for yield than the number of primary rachis branches (Adriani et al., 2016). Increase in the number of grains on upper secondary rachis branches can improve grain quality including lower reduction in grain weight (Wang et al., 2008). The trade-off between yield-enhancing factors and maintaining better grain quality must be considered to ensure wider adoption of high yielding rice varieties (Das et al., 2018). Genes that increase the number of secondary rachis branches bearing grains that are not compromised for quality traits are thus desirable for a meaningful increase in yield.

SUMMARY OF THE INVENTION

According to an aspect of some embodiments of the present invention there is provided a method of enhancing grain yield of a Gramineae plant, the method comprising:
(a) crossing a recipient plant with a donor plant comprising a sequence variation in a TPR allele, the sequence variation imparting enhanced grain yield; and
(b) selecting a progeny plant of the crossing comprising the sequence variation by identifying said variation, the progeny plant being characterized by an improved grain yield relative to the recipient plant.

According to an aspect of some embodiments of the present invention there is provided a method of enhancing grain yield of a Gramineae plant, the method comprising:
(a) crossing a recipient plant with a donor plant comprising a TPR allele of haplotype I; and
(b) selecting a progeny plant of the crossing comprising the TPR allele of haplotype I by identifying said variation, the progeny plant being characterized by an improved grain yield relative to the recipient plant.

According to some embodiments of the invention, the recipient plant is heterozygous for the sequence variation or haplotype I.

According to some embodiments of the invention, the recipient plant is null for the sequence variation or haplotype I.

According to some embodiments of the invention, the selecting is based on phenotypic screening for a grain yield- and/or grain quality-associated trait.

According to some embodiments of the invention, the selecting is by marker-assisted selection.

According to some embodiments of the invention, the marker-assisted selection is by a method selected from the group consisting of: allele-specific hybridization; Southern analysis; Northern analysis; in situ hybridization, deep-sequencing; and hybridization of primers followed by polymerase chain reaction amplification of a region of a marker.

According to some embodiments of the invention, the method further comprises:
(c) backcrossing the one or more of selected progeny plants to produce backcross progeny plants; and
(d) selecting a backcross progeny plant comprising the sequence variation or haplotype I, the progeny plant being characterized by an improved grain yield relative to the recipient plant.

According to some embodiments of the invention, (c) and (d) are repeated one or more times.

According to some embodiments of the invention, the donor and/or recipient plant is a rice plant.

According to some embodiments of the invention, the recipient plant is a rice plant selected from the group consisting of: the *indica* rice group; the *japonica* rice group; and the *glaberrima* rice group.

According to some embodiments of the invention, the donor plant is a rice plant of the *indica* rice group.

According to some embodiments of the invention, the recipient plant is a rice plant of the *indica* rice group.

According to some embodiments of the invention, the recipient rice plant is of a variety comprising a sequence variation in a gene selected from the group consisting of D11, MOC1, and MYB4P.

According to some embodiments of the invention, the method comprises breeding the recipient plant, donor plant or progeny plant to comprise a sequence variation in a gene selected from the group consisting of D11, MOC1, and MYB4P.

According to some embodiments of the invention, the recipient plant or the progeny comprises a sequence variation in a gene selected from the group consisting of D11, MOC1, and MYB4P is show in Table A.

According to some embodiments of the invention, the grain quality-associated trait is selected from the group consisting of amylose content, chalkiness, gel temperature, viscosity, retrogradation, and cooking traits such as the cooked grain length or width.

According to some embodiments of the invention, the grain yield is manifested by at least one of TSP, USRB and head rice yield.

According to an aspect of some embodiments of the present invention there is provided a plant obtainable according to the method as described herein.

According to an aspect of some embodiments of the present invention there is provided an elite line of a Gramineae plant comprising a sequence variation in a TPR allele or a haplotype I, the plant being characterized by an improved grain yield as compared to a control plant.

According to some embodiments of the invention, the recipient rice plant comprises a sequence variation in a gene selected from the group consisting of D11, MOC1, and MYB4P.

According to some embodiments of the invention the plant is a rice plant.

According to an aspect of some embodiments of the present invention there is provided a part of the plant (e.g., seed, grain) as described herein.

According to an aspect of some embodiments of the present invention there is provided a processed product comprising DNA of the plant as described herein.

According to some embodiments of the invention, the sequence variation comprises at least one SNP selected from the group of SNPs shown in FIGS. 15-16.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a scheme showing correlations of multiple panicle traits. Correlations of primary rachis branches (PRB) and secondary rachis branches (SRB) at different panicle levels (bottom: BPRB, BSRB; middle: MPRB, MSRB; upper: UPRB, USRB; entire panicle: TPRB, TSRB), and total number of spikelets (TSP) per panicle of 310 resequenced *indica* accessions with colored boxes (shades of green) significant at 95% confidence level.

FIGS. 2A, 2B, 2C and 2D shows significant genetic variants in chromosomes 1 and 2 that are associated with USRB. (A) Manhattan plot depicting results of EMMAX associations tested across 12 rice chromosomes revealed significant peaks of multiple SNPs (lightgreen highlight) from chromosomes 1 and 2 associated to USRB rising above the suggestive line threshold (blue line) at q<0.0500 and p<1.5314E-05. (B) Quantile-quantile plot showed samples were unrelated and the sample population was normally distributed with evidence of inflation factor (0.95) less than 1.03 threshold. (C) Barplot depicting negative logarithm of the p-values and corresponding beta values (thicker bar: higher beta value, black color: positive effect; red color: negative effect) of tag SNPs belonging to different haplotype blocks within the significant region in Chromosome 2 associated to USRB. (D) USRB variation of the *indica* samples as explained by distinct haplotype blocks represented by tag SNPs within the significant region in Chromosome 2 associated to USRB based on GWAS results. Asterisks in boxplots indicate significant difference using two-tailed t-test (*P<0.05, P<0.01, *P<0.001, ****P<0.0001).

FIG. 3 shows phenotypic variation explained by significant nonsynonymous SNPs of OsTPR possibly regulated by important flower-related transcription factors, and allelic variation of OsTPR among *O. sativa* subgroups. Haplotypes formed with an upstream SNP overlapping flower-related cis-motifs (SPL3 and SPL14) in the promoter region of OsTPR plus six nonsynonymous genic SNPs of OsTPR revealed superior allele (AGGATCA, SEQ ID NO: 1) explaining higher branching-related traits and spikelet number but lower percent chalkiness, as compared to other alleles such as TATTCGG (SEQ ID NO: 2), TATACCG (SEQ ID NO: 3), and TATTCCG (SEQ ID NO: 4) which showed lower TSP and branching-related traits. Haplotype TATTCCG also showed highest chalkiness percentage among other haplotypes. Asterisks in boxplots indicate significant difference using two-tailed t-test (*P<0.05, P<0.01, *P<0.001, ****P<0.0001). The superior haplotype AGGATCA was also found to be enriched within *indica* subspecies while one of the inferior haplotypes, TATACCG (SEQ ID NO: 3), was abundantly present in *japonica* and other rice subspecies found in the 3,000 rice genomes in SNP-Seek Database. Panicle architectures of lines with high USRB (HUSRB, SEQ ID NO: 5) are present above the panicle architectures of lines with low USRB (LUSRB, SEQ ID NO: 6).

FIGS. 4A, 4B and 4C show nucleotide diversity calculation among different rice subgroups using OsTPR SNPs. Nucleotide diversity values were higher in *indica* subgroup compared to *japonica* or aromatic subgroups from SNP-Seek Database using either (A) the index SNPs from whole LD block significant region in Chromosome 2 where OsTPR was located, or (B) the seven significant SNPs of OsTPR. (C) Phylogenetic analysis of 13 crop species using OsTPR protein orthologues showed closer relationship of *Oryza sativa* subsp. *indica* to *O. nivara*, while *O. sativa* subsp. *japonica* was more related to *Oryza rufipogon*.

FIG. 5 shows an association network of SNPs with different branching-related traits and spikelet number of *O. sativa* subsp. *indica*. Multiple SNPs were significantly associated (P<0.05) to secondary rachis branches (SRB) at different panicle levels: bottom (BSRB), middle (MSRB), upper (USRB), and entire panicle (TSRB); total primary rachis branches (TPRB); and total number of spikelets (TSP) of *indica* samples based on multi-locus GWAS (blue nodes) and targeted association analysis (red nodes). Most common SNPs were found in OsTPR (pink edge) and reported genes related to panicle architecture such as DWARF11, MOC1, and TPR genes. Edge associations were based on beta-effects.

FIG. 6 shows a comparison of superior and inferior lines in terms of traits related to panicle architecture, yield, quality, and grain appearance as explained by different haplotypes of D11, MOC1, MYB4P and TPR. Superior lines (green) have TSP 1.5 times higher than the mean TSP (147.59) of all the 309 lines while inferior lines (orange) have TSP 1.5 times lower than the mean TSP. With some exceptions, superior lines usually had the superior alleles of the four prominent genes—D11, MOC1, MYB4P, and TPR—regulating panicle architecture traits based on slGWAS, targeted association analysis, and mlGWAS, while inferior lines possess at least one inferior allele of the aforementioned genes. Spirographs further showed distinction of the superior and inferior lines in terms of different sets of traits related to panicle architecture, yield and quality phenotypes with values normalized using common logarithm. Rootless phylogenetic tree constructed with D11, MOC1, MYB4P, and TPR significant SNPs showed unclear relationship of inferior and superior lines.

FIGS. 7A and 7B show coexpression analysis results. (A) Hierarchical clustering dendrogram and gene regulatory network derived from genes involved in different panicle developmental stages (>1 mm, 3-5 mm, 10-15 mm, 40-50 mm, and heading stage). (B) Network of genes co-expressed in the module containing the candidate gene OsTPR reflecting interactions at edge weight >=0.30089 with node sizes representing the degree of connectivity and the central hub gene marked with thick black border. OsTPR was found to be strongly coexpressed with multiple known genes related to panicle development such as D11, MOC2, LAX, SPL14, and APO2, among others.

Figure 10:
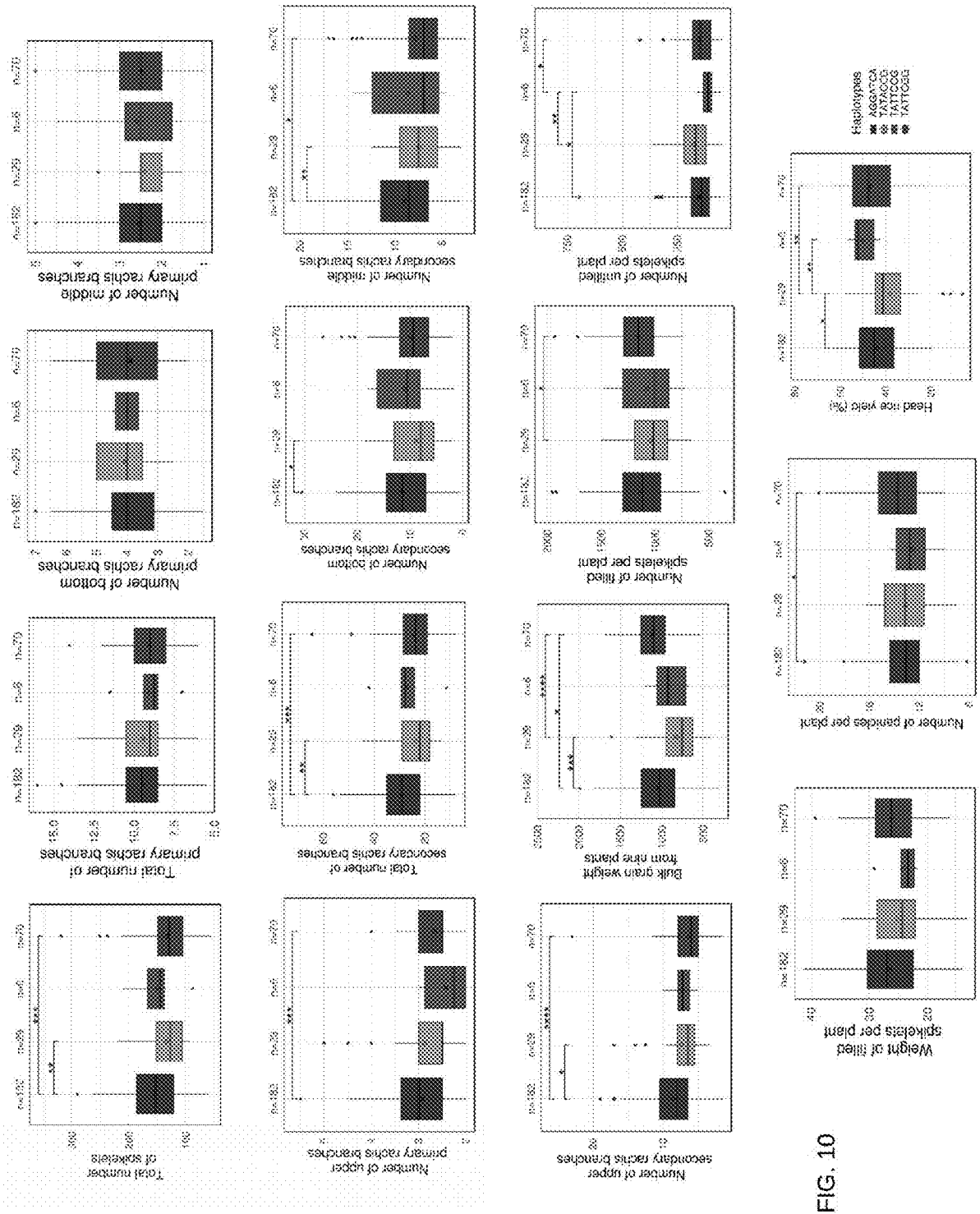
Figure 10:
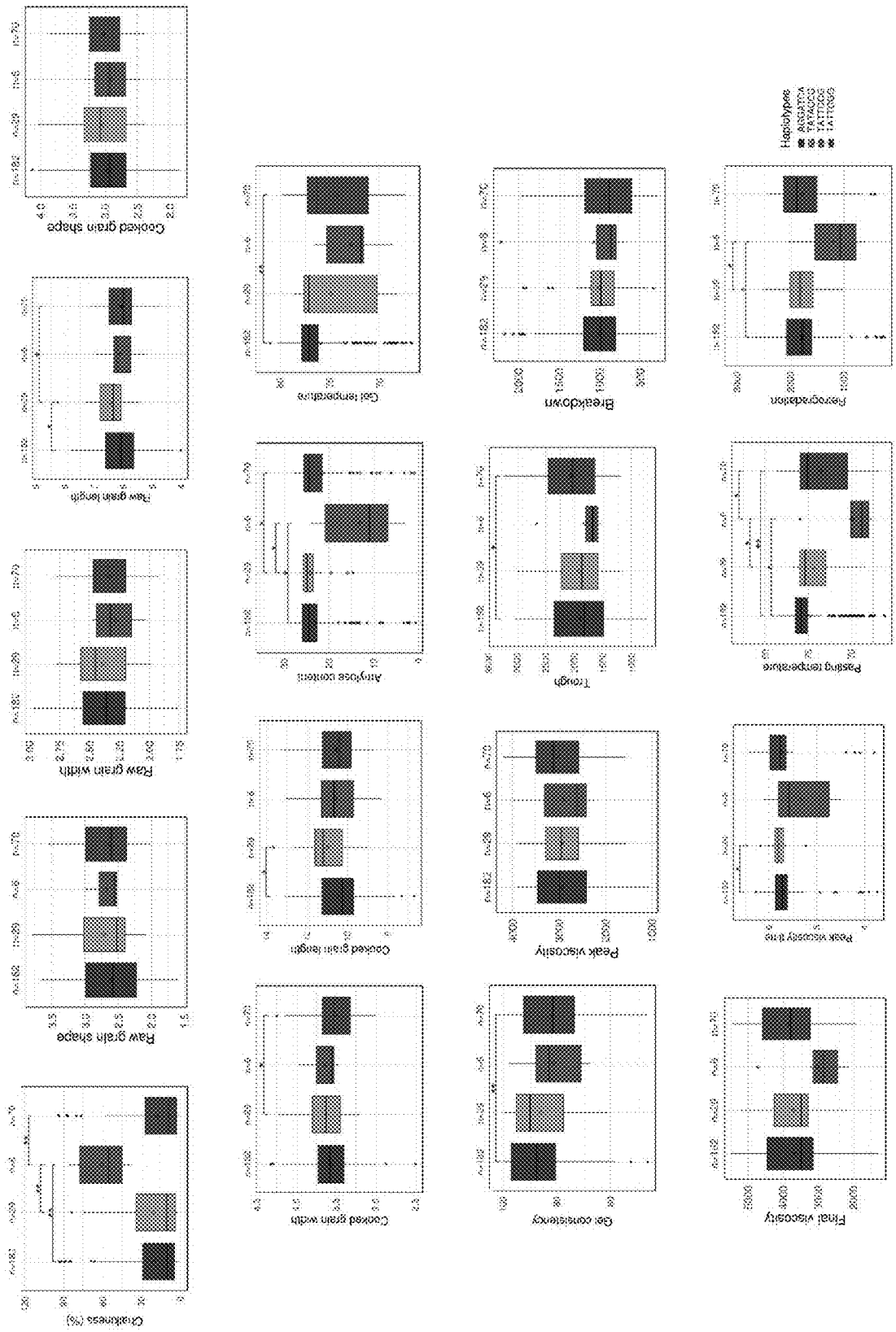

FIG. 10 shows phenotypic variation of the *O. sativa* subsp. *indica* samples as explained by OsTPR haplotypes in terms of panicle architecture, grain yield, and grain quality traits. Apparent tradeoffs and differences were observed between superior and inferior haplotypes in terms of the number of panicle components, number of panicles per plant, grain filling attributes, grain weight and some grain quality traits. The superior haplotype, AGGATCA, also showed high number of spikelets and branching-related traits and low chalkiness, whereas one of the inferior haplotypes, TATTCCG (SEQ ID NO: 4), had low number of spikelets and branching-related traits and very high chalkiness. Asterisks in boxplots indicate significant difference using two-tailed t-test (*P<0.05, P<0.01, *P<0.001, ****P<0.0001).

FIGS. 11A, 11B, 11C and 11D show D11 and MOC1 significant SNPs explaining phenotypic variation and correlations among *indica* samples, and their allelic abundance among different *O. sativa* subgroups. (A) Phenotypic variation in terms of traits related to panicle architecture, head rice yield, and chalkiness of *O. sativa* subsp. *indica* samples as explained by D11 and MOC1 haplotypes formed by significant SNPs. Asterisks in boxplots indicate significant difference using two-tailed t-test (*P<0.05, P<0.01, *P<0.001, ****P<0.0001). (B) Percent allelic abundance of D11/MOC1 haplotypes among different rice subgroups from 3,000 rice genomes in SNP-Seek Database. (C) Different sets of correlations for multiple phenotypes of *indica* samples having specific combinations of superior ($AAT^{D11}$, $CG^{MOC1}$) and inferior ($GGC^{D11}$, $GA^{MOC1}$) alleles from D11 and MOC. Shaded boxes (green: positive correlation; violet: negative correlation) significant at 95% confidence level. (D) Gene structures of D11 and MOC1 highlighting the significant SNPs used to form the haplotypes.

FIGS. 12A, 12B, 12C and 12D show TPR and MYB4P significant SNPs explaining phenotypic variation and correlations among *indica* samples, and their allelic abundance among different *O. sativa* subgroups. (A) Phenotypic variation in terms of traits related to panicle architecture, head rice yield, and chalkiness of *O. sativa* subsp. *indica* samples as explained by TPR and MYB4P haplotypes formed by significant SNPs. Asterisks in boxplots indicate significant difference using two-tailed t-test (*P<0.05, P<0.01, *P<0.001, ****P<0.0001). (B) Percent allelic abundance of TPR/MYB4P haplotypes among different rice subgroups from 3,000 rice genomes in SNP-Seek Database. (C) Different sets of correlations for multiple phenotypes of *indica* samples having specific combinations of superior ($AGGATCA^{TPR}$, $A^{MYB4P}$) and inferior ($TATACCG^{TPR}$, $G^{MYB4P}$) alleles from TPR and MYB4P, respectively. Shaded boxes (green: positive correlation; violet: negative correlation) significant at 95% confidence level. (D) Gene structures of TPR and MYB4P highlighting the significant SNPs used to form the haplotypes.

Figure 13:

FIG. 13 shows phenotypic variation of the *O. sativa* subsp. *indica* samples as explained by D11, MOC1, OsTPR, and OsMYB4P superior and inferior haplotypes in terms of panicle architecture, grain yield, and grain quality traits. Superior lines (green) have TSP 1.5 times higher than the mean TSP (147.59) of all the 309 lines while inferior lines (orange) have TSP 1.5 times lower than the mean TSP. Although with some exceptions, superior lines usually had the superior alleles of the four prominent genes: D11 (AAT), MOC1 (CG), MYB4P (A), and TPR (AGGATCA), while inferior lines usually had inferior the alleles. Compared to inferior lines, the superior lines had significantly higher number of spikelets and branches, grain weight and grain filling without substantial changes in head rice yield and grain quality traits such as chalkiness, cooked grain dimensions, amylose content, gel consistency, trough, final viscosity, and retrogradation. Tradeoff in the number of panicles per plant was observed in superior lines relative to inferior lines. Asterisks in boxplots indicate significant difference using two-tailed t-test (*P<0.05, P<0.01, *P<0.001, ****P<0.0001).

Figure 14A:
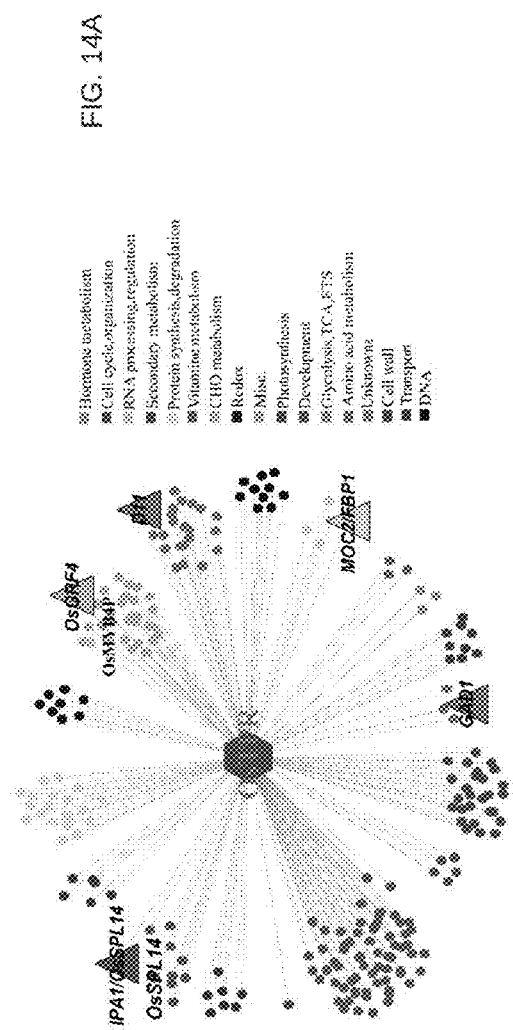
Figure 14B:
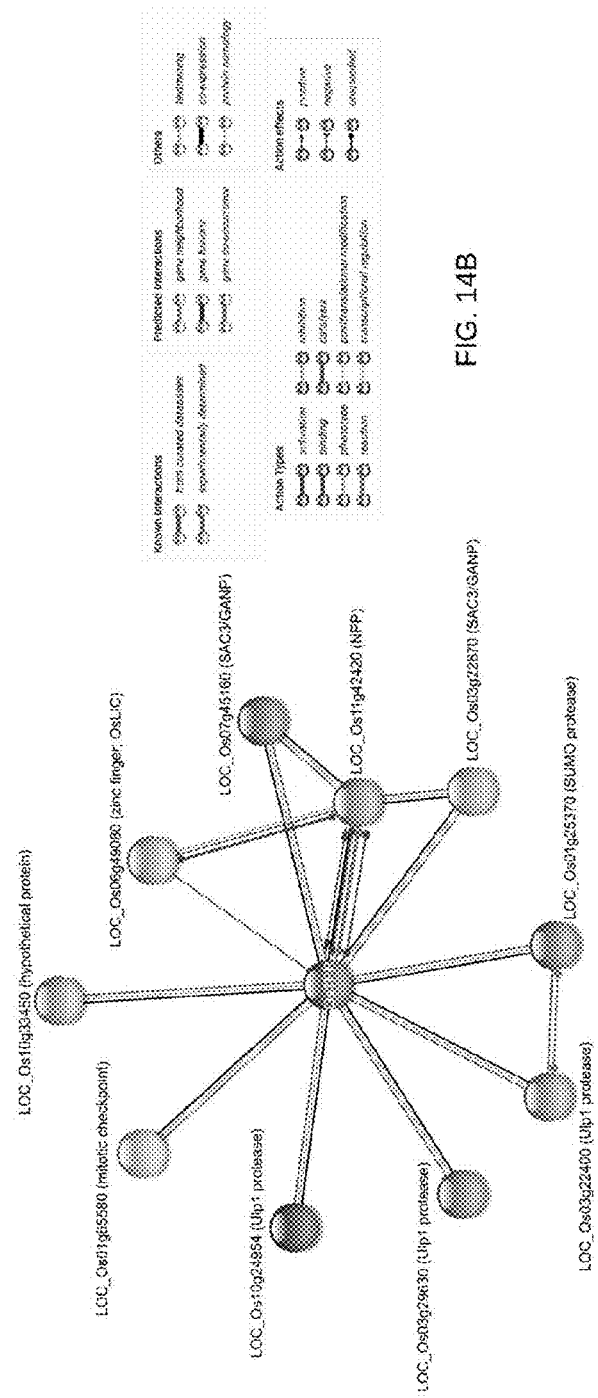

FIGS. 14A and 14B show first-shell neighbors and protein interactors of OsTPR. (A) The first neighbors of the candidate gene OsTPR from the blue module in coexpression analysis were identified to be involved in different important molecular functions such as protein metabolism and RNA processing among many others based on MapMan annotation with highlights on some major genes (e.g. OsSPL14, D11, MOC2, etc.) known to be involved in panicle architecture development. (B) OsTPR predicted first-shell protein interactors and molecular actions based on different types of evidence at high confidence level (0.7) suggests the importance of OsTPR as it interacts with other proteins involved in SUMOylation, ubiquitination, and plant architecture regulation in rice.

FIG. 15 shows the protein sequence alignment of nuclear-pore anchor-encoding proteins from *Arabidopsis* and rice. Amino acid sequence of OsTPR (XP_015625577.1, SEQ ID NO: 8) from *O. sativa* Nipponbare reference genome aligned with AtTPR (AT1G79280, SEQ ID NO: 10) from *Arabidopsis thaliana*, with amino acids highlighted in pink representing the translocated promoter region (TPR) domain.

FIG. 16 shows comparison of amino acid substitutions in OsTPR between superior and inferior *O. sativa* subsp. *indica* samples. Six significant non-synonymous SNPs in OsTPR showed distinct amino acid substitutions between samples with high number of upper secondary rachis branches (HUSRB; IRIS_313-8536 SEQ ID NO: 21, IRIS_313-8733 SEQ ID NO: 22, IRIS_313-9605 SEQ ID NO: 23, and IRIS_313-9832 SEQ ID NO: 24) and samples with low number of upper secondary rachis branches (LUSRB; IRIS_313-10274 SEQ ID NO: 17, IRIS_313-10385 SEQ ID NO: 18, IRIS_313-9184 SEQ ID NO: 19, and IRIS_313-8405 SEQ ID NO: 20).

FIG. 17 shows SNP locations on the OsTPR nucleic acid sequence (SEQ ID NO: 7) protein sequence (SEQ ID NO: 8) and LOC Os04g39430 (SEQ ID NO: 32), LOC Os11g35390 (SEQ ID NO: 33) and LOC Os06g40780 (SEQ ID NO: 34).

Figure 18:
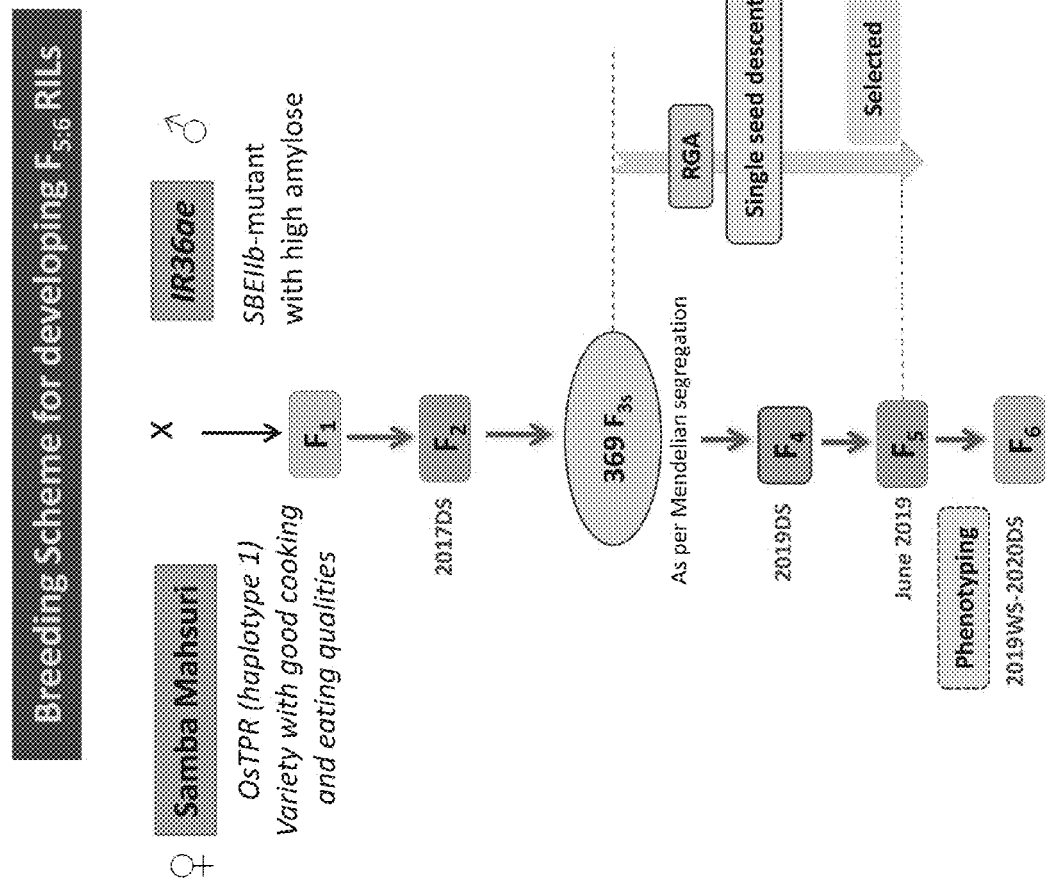

FIG. 18 provides a breeding scheme for Samba Mahsuri and IR36ae from F1 until F6 generation.

DESCRIPTION OF SPECIFIC EMBODIMENTS OF THE INVENTION

The present invention, in some embodiments thereof, relates to methods of enhancing grain yield, plants and products generated thereby.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

Rice is the staple for nearly half the global population. Ensuring food security by increasing crop yield of rice by meeting the demographic consumer preferences is critical. The classical tradeoff between yield increases for reduced grain quality is unacceptable in rice as value proposition defined through milling, visual and palatable qualities remain as economic drivers. The present inventors report 188 genetic loci interlinking several panicle architecture traits that increase yield and maintain grain quality as desired by rice traders and consumers. Multi-omics, single- and multi-locus GWAS, gene regulatory network and gene set analyses identified novel genes influencing secondary branching at upper and bottom part of the panicle, leading to increased superior grains. Multiple non-synonymous SNPs in a nuclear-pore anchor protein-encoding gene (OsTPR) were specifically associated with superior haplotypes of increased upper secondary rachis branches (USRB) and grain number. These grains maintained the quality traits including low chalk. This confirmed a critical role for OsTPR in influencing yield while maintaining quality and suggest directed evolution under artificial selection towards the desirable haplotype composition of the elite *indica* lines.

The present inventors identified additional genes D11, MOC1 or MYB4P or alleles thereof that can function optionally together with OsTPR in increasing yield.

Thus, according to an aspect there is provided a method of enhancing grain yield of a Gramineae plant, the method comprising:
(a) crossing a recipient plant with a donor plant comprising a sequence variation in a TPR allele, the sequence variation imparting enhanced grain yield; and
(b) selecting a progeny plant of the crossing comprising the sequence variation by identifying said variation, the progeny plant being characterized by an improved grain yield relative to the recipient plant.

According to an alternative aspect there is provided a method of enhancing grain yield of a Gramineae plant, the method comprising:
(a) crossing a recipient plant with a donor plant comprising a TPR allele of haplotype I; and
(b) selecting a progeny plant of the crossing comprising the TPR allele of haplotype I by identifying said variation, the progeny plant being characterized by an improved grain yield relative to the recipient plant.

So that the invention may be more readily understood, certain terms are first defined. Other definitions are provided throughout the description.

As used herein, the term "plant" refers to an entire plant, its organs (i.e., leaves, stems, roots, flowers etc.), seeds, plant cells, and progeny of the same. The term "plant cell" includes without limitation cells within seeds, suspension cultures, embryos, meristematic regions, callus tissue, leaves, shoots, gametophytes, sporophytes, pollen, and microspores. According to a specific embodiment, the plant is a plant line.

According to a specific embodiment the plant line is an elite line. The phrase "plant part" refers to a part of a plant, including single cells and cell tissues such as plant cells that are intact in plants, cell clumps, and tissue cultures from which plants can be regenerated. Examples of plant parts include, but are not limited to, single cells and tissues from pollen, ovules, leaves, embryos, roots, root tips, anthers, flowers, fruits, stems, shoots, and seeds; as well as scions, rootstocks, protoplasts, calli, and the like. According to a specific embodiment, the plant part comprises the nucleic acid variation in a TPR allele as described below. According to a specific embodiment, the plant part is a seed.

As used herein, the phrases "progeny plant" refers to any plant resulting as progeny from a vegetative or sexual reproduction from one or more parent plants or descendants thereof.

As used herein the term "Gramineae plant" refers to the cereal grass family, which cultivated species include but are not limited to maize (corn), wheat, rice, barley, rye, sorghum or millet.

According to a specific embodiment the Gramineae plant is a cultivated plant.

As used herein the term "rice" refers to a cultivated *Oryza* plant.

As used herein the term "cultivated *Oryza* plant" refers to a cultivated grass rice species having a diploid genome, 2n=24 (AA genome). Examples of domesticated *Oryza* species include but are not limited to, *Oryza sativa* (Asian rice) or *Oryza glaberrima* (African rice). The term may be interchanged with the term rice.

Domesticated *Oryza* varieties contemplated herein according to exemplary embodiments refer to long grain, short grain, white, brown, red and black.

There are three main varieties of *Oryza sativa*:

*indica:* The *indica* variety is long-grained.

*japonica: japonica* rice is short-grained and high in amylopectin (thus becoming "sticky" when cooked), and is grown mainly in more temperate or colder regions such as Japan.

*javanica: javanica* rice is broad-grained and grown in tropical climates.

Other major varieties include Aromatic and Glutinos.

Figure 3:
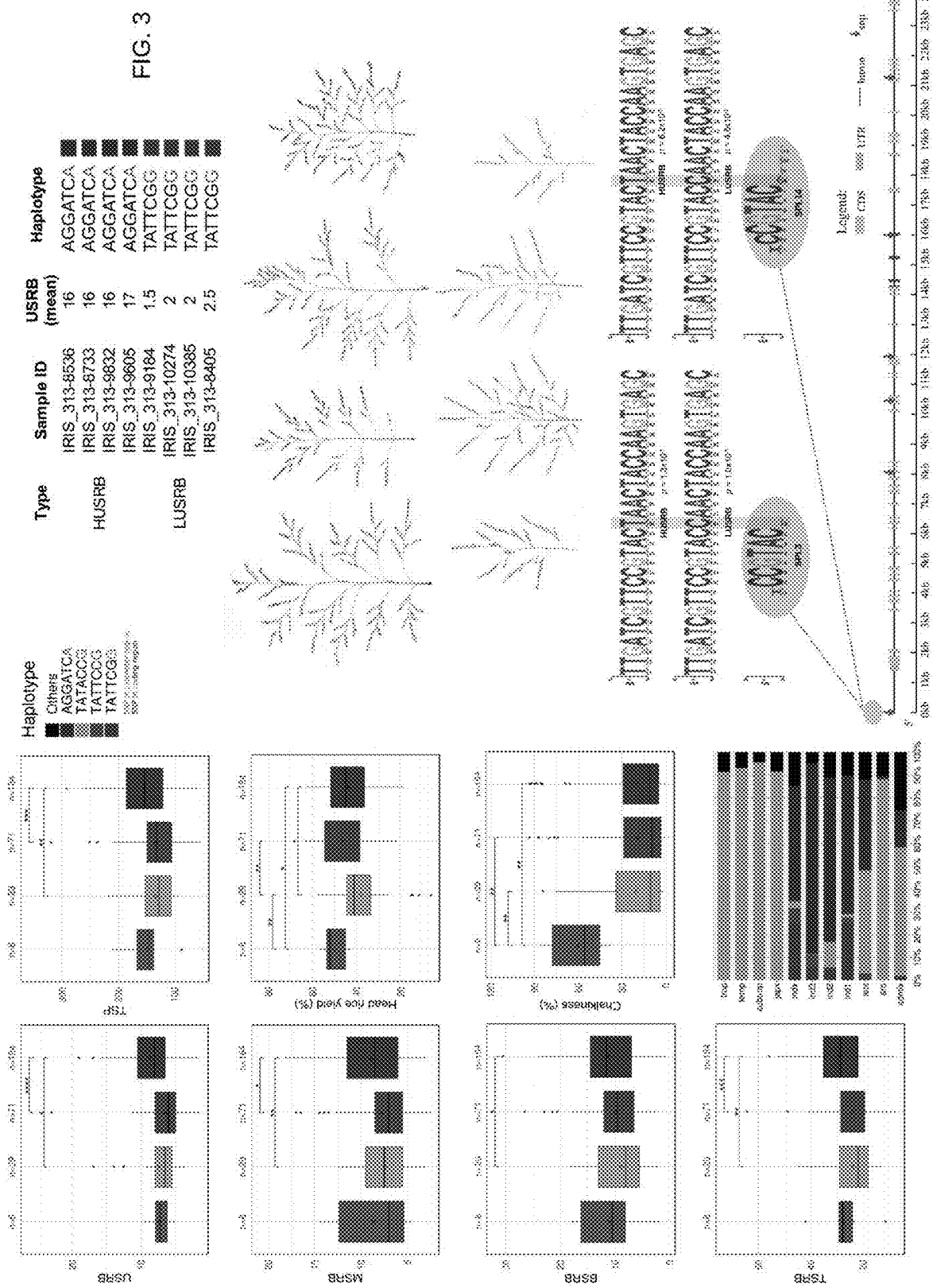

Allele mining using 3 k rice genomes revealed that within the *indica* subgroup the superior haplotype 1 was enriched while the inferior haplotype 3 was least represented (FIG. 3). The superior haplotype1 was not found in *japonica* subgroup suggesting its importance as an approach for improving the *japonica* rice lines.

According to a specific embodiment, the donor plant is *indica*.

According to a specific embodiment, the recipient plant is *indica* or *japonica*.

Within each variety, there are many recipient cultivars, each favored for particular purposes or regions. Any genetic background of domesticated *Oryza* e.g., *Oryza sativa*, can be used. Other varieties and germplasms which can be used according to the present teachings are selected from the group consisting of: IR64; Nipponbare; PM-36, PS 36, Lemont, 7S 27, Arkansas Fortuna, Sri Kuning, IR36, IR72, Gaisen Ibaraki 2, Ashoka 228, IR74, NERICA 4, PS 12, Bala, Moroberekan, IR42, Akihikari, Nipponbare, IR20, IR56, IR66, NSIC Rc158, NSIC Rc222, and NSIC Rc238.

As used herein the term "maize" is also interchangeably referred to as "corn" "*Zea maize* L." or "*Zea maize* subsp."

As used herein "cultivated maize" refers to the conventionally grown *Zea mays* for human or animal food or beverages or as a source of raw materials, food supplements, chemicals or fuel. The maize plant is diploid (2N=20) in nature.

Any genetic background of *Zea maize* can be used. A number of commercial varieties are available including, but not limited to:

*Zea mays* var. *amylacea* (typically used for producing corn flowerflour)

*Zea mays* var. *everta* (typically used for producing popcorn)

*Zea mays* var. *indentata* (Dent corn)

*Zea mays* var. *indurata* (Flint corn)

*Zea mays* var. *saccharata* and *Zea mays* var. *rugosa* (Sweet corn)

*Zea mays* var. *ceratina* (Waxy corn)

*Zea mays* (Amylomaize)

*Zea mays* var. *tunicata* Larrañaga ex A. St. Hil (Pod corn)

*Zea mays* var. *japonica* (Striped maize)

As used herein the term "wheat" is also interchangeably referred to as "*Triticum* L." or "*Triticum* subsp.".

As used herein the term "common wheat" is also interchangeably referred to as "Bread wheat" or "*Triticum aestivum*".

As used herein the term "durum wheat" is also interchangeably referred to as "Macaroni wheat" or "*Triticum durum* Desf." or "*Triticum turgidum* subsp. *durum*".

Wheat is conventionally grown for human or animal food or beverages or as a source of raw materials, food supplements, chemicals or fuel. The common wheat plant is allohexaploid (6N=42) in nature, whereas the *durum* wheat is a tetraploid (4N=28).

Any genetic background of *Triticum* can be used. A number of commercial varieties are available including, but not limited to:

*T. aestivum* (95% of the wheat production, also known as common wheat, typically used for producing flour for baking)

*T. aethiopicum* (commonly known as Ethiopian wheat)

*T. araraticum* (commonly known as Armenian or Araratian wild emmer)

*T. boeoticum* (commonly known as Einkorn wheat)

*T. carthlicum* (commonly known as Persian wheat)

*T. compactum* (similar to common wheat)

*T. dicoccoides* (commonly known as Emmer wheat, Farro, Hulled wheat)

*T. dicoccon* (commonly known as Emmer wheat, Farro, Hulled wheat)

*T. durum*

*T. ispahanicum* (commonly known as Emmer wheat, Farro, Hulled wheat)

*T. karamyschevii* (commonly known as Emmer wheat, Farro, Hulled wheat)

*T. macha*

*T. militinae*

*T. monococcum* (commonly known as Einkorn wheat)

*T. polonicum* (commonly known as Polish wheat)

*T. spelta* (commonly known as Dinkel wheat)

*T. timopheevii* (commonly known as Zanduri wheat)

*T. turanicum*

*T. urartu* (commonly known as Einkorn wheat)

*T. vavilovii*

*T. zhukovskyi*

The term "crossed" or "cross" in the context of this invention means the fusion of gametes via pollination to produce progeny (i.e., cells, seeds or plants). The term encompasses both sexual crosses (the pollination of one plant by another) and selfing (self-pollination, i.e., when the pollen and ovule are from the same plant or from genetically identical plants).

Although the present description refers in a more detailed manner to rice, other species of Gramineae are equally envisaged.

According to a specific embodiment, the donor plant and the recipient plant are from the same species (e.g., rice/rice).

According to a specific embodiment, the donor plant and the recipient plant are from different species (e.g., rice/corn).

According to a specific embodiment, the donor plant and the recipient plant are from the same cultivar (e.g., *indica/indica*).

According to a specific embodiment, the donor plant and the recipient plant are from different cultivars (e.g., *indica/japonica*)

As used herein "enhancing" or "increasing" refers to an increase of at least 10%, 20%, 30%, 40%, 50%, 60%, 70%, 80%, 90%, 1.5 fold, 2 fold or more as compared to a control of the same genetic background without the sequence variation (i.e., control plant e.g., the recipient plant).

As used herein "reducing" or "decreasing" refers to a decrease of at least 10%, 20%, 30%, 40%, 50%, 60%, 70%, 80%, 90%, 1.5 fold, 2 fold or more as compared to a control of the same genetic background without the sequence variation (i.e., e.g., the recipient plant).

As used herein "grain yield" refers to the measure of the yield of grains per unit area of land cultivation.

Grain yield can be measured in pounds per acre, typically at 12.0% moisture. Grain yield of rice can be determined by the number of panicles per unit area, the number of fertile florets per panicle, and/or grain weight per floret. According to a specific embodiment, the grain yield is manifested by an increase in total spikelet number (TSP) per panicle.

According to a specific embodiment, the grain yield is manifested by an increase in total number of secondary rachis branches (TSRB).

According to a specific embodiment, the grain yield is manifested by an increase in upper secondary rachis branches (USRB).

According to a specific embodiment, the grain yield is manifested by an increase in middle secondary rachis branches (MSRB).

According to a specific embodiment, the grain yield is manifested by an increase in total number of primary rachis branches (TPRB).

According to a specific embodiment, the grain yield is manifested by an increase in number of upper primary rachis branches (UPRB).

According to a specific embodiment a cross between the claimed haplotype (in Samba Mahsuri) to an OsMOC1 genotype the following values were obtained (see breeding scheme on FIG. 18).

The determination of the plant architecture as mentioned by the above parameters can be done as follows: the length of each panicle starting from the first node until the last node is measured and divided by three—resulting to bottom, middle, and upper levels within the panicle. The sum of rachis branches based on category of primary or secondary is calculated for each level. This provides measurements for primary rachis branches (PRB) at the bottom (BPRB), middle (MPRB), and upper (UPRB) levels of the panicle. Similarly, this approach is used for secondary rachis branches (SRB) at the bottom (BSRB), middle, (MSRB), and upper (USRB) levels of the panicle.

According to a specific embodiment, the grain yield is manifested by an increase in percentage of head rice yield. The weight of head rice, expressed as a percentage of the original rough rice weight, is defined as the head rice yield (HRY) and may vary from 0, where all kernels are broken to a theoretical maximum of approximately 70% (no kernels are broken, 30% waste consisting of husk and bran). According to a specific embodiment, the grain yield is manifested by an increase in weight of filled spikelets per plant.

According to a specific embodiment, the grain yield is manifested by an increase in bulk grain weight per a predetermined number of plants.

According to a specific embodiment, the grain yield is manifested by an increase in number of panicles per plant.

According to a specific embodiment, there is an overall increase in spikelets (filled and unfilled) e.g., when superior alleles of the four central hub genes are pyramided (see FIG. 13) as compared to samples of the same genetic background without the sequence variation (e.g., the recipient plant).

According to a specific embodiment, the increase in grain yield does not compromise grain quality.

Hence grain quality in a plant comprising the sequence variation in the TPR allele is about the same as or better than that of a control plant of the same genetic background without the variation.

As shown in Example 3, there is an association of TPR (OsTPR) with increased USRB and TSP without compromising the grain quality. Additionally, analysis of grain quality traits indicated that the amylose content, gel temperature, viscosity, retrogradation, etc., and cooking traits such as the cooked grain length and width (FIG. 10), were better or maintained in the OsTPR haplotype 1 grains on USRB.

Rice grain quality is typically composed of several factors, including grain appearance and milling, storing, eating, cooking, and nutritional qualities; appearance quality is mostly determined by grain shape and endosperm opacity (or chalkiness) [Zhang Q F. Strategies for developing green super rice. Proc Natl Acad Sci USA. 2007; 104:16402-16409. doi: 10.1073/pnas.0708013104; Wan X Y, Weng J F, Zhai H Q, Wang J K, Lei C L, Liu X L, Guo T, Jiang L, Su N, Wan J M. Quantitative trait loci (QTL) analysis for rice grain width and fine mapping of an identified QTL allele gw-5 in a recombination hotspot region on Chromosome 5. Genetics. 2008; 179:2239-2252. doi: 10.1534/genetics.108.089862.].

Embodiments of the invention therefore relate to any manifestation of a grain quality. Such include but are not limited to amylose content, chalkiness, gel temperature, trough, viscosity, breakdown, raw grain shape, raw grain length, raw grain width, retrogradation, and cooking traits such as the cooked grain shape, cooked grain length or width, final viscosity, peak viscosity, pasting temperature.

According to a specific embodiment, the quality trait refers to the raw grain and is manifested by chalkiness, grain size and/or grain shape.

FIG. 10 relates to any such parameter which is envisaged in this case.

Chalk. An opaque region of the rice kernel resulting from loose packing of the starch granules. Chalk may occur throughout or in a part of the kernel.

Chalkiness is a major constraint in rice production because it is one of the key factors determining grain quality and price. Its reduction is a major goal, and the primary purpose of this study was to dissect the genetic basis of grain chalkiness.

Chalkiness parameters include chalkiness rate, white core rate, white belly rate, chalkiness area, white core area, and white belly area According to a specific embodiment, chalk is less than 5%.

According to a specific embodiment, the chalkiness of the progeny plant is similar to that of the recipient or better (i.e., reduced chalkiness by at least 20%, 30%, 40%, 50%, 60%, 70%, 75%, 80%, 85%, 90%, 95%, as compared to the same genetic background not carrying the variation i.e., control).

As used herein "amylose content" which refers to percent apparent amylose content is typically measured by a continuous flow analyzer.

Apparent Amylose Percent. The most important grain characteristic that describes cooking behavior in each grain class, or type, i.e., long-, medium- and short-grain. The percentage of the endosperm starch of milled rice that is amylose. Standard long grains contain 20% to 23% amylose. Rexmont type long grains contain 24% to 25% amylose. Short and medium grains contain 16% to 19% amylose. Waxy rice contains 0% amylose.

According to a specific embodiment the amylose content is intermediate, i.e., 20-25%.

As used herein "gel temperature" or gel (gelatinization) temperature refers to the temperature at which rice starch granules imbibe water and lose crytallinity in an irreversible manner. It can be measured using the alkali spreading method. According to a specific embodiment, moderate gel temperature is preferred, as well known to the skilled artisan.

As used herein "viscosity" refers to the flow resistance of a rice flour suspension. It can be measured using a Rapid Visco Analyzer (RVA). According to a specific embodiment an intermediate viscosity is preferred as well known to the skilled artisan.

As used herein "retrogradation" refers to the appearance of starch clumps. Retrogradation refers to the crystallinization of amylose chains at room temperature which results to the hardening of rice after cooking. This parameter can be measured using RVA.

Grain Length (L). Length of a rice grain is measured in millimeters and can be measured using a SeedCount SC5000 Image Analyzer.

Grain Width (W). Width of a rice grain is measured in millimeters and can be measured using a SeedCount SC5000 Image Analyzer.

According to a specific embodiment the grain length and/or grain width are about the same as that of the control.

According to a specific embodiment, the grain characteristic is selected from high head rice recovery (HRR) and low chalkiness (less than 5%).

As mentioned the method involves transferring a TPR nucleic acid sequence comprising the superior allele (as an example for sequence variation) to a donor plant.

As used herein"translocated promoter region" gene or "TPR" belongs to the nuclear-pore complex that mediate the transport of RNA and other cargo between the nucleus and the cytoplasm. In *Arabidopsis* the protein was shown to play a role in RNA homeostasis, flowering time and auxin signaling.

The *Arabidopsis thaliana* homolog AtTPR (AT1G79280) is typically represented by the sequence SEQ ID NO: 9, NM_001198507, SEQ ID NO: 10 NP_178048.2, for the nucleotide and amino acid sequences, respectively. The amino acid sequence is shown in FIG. 15.

The present inventors have identified the rice homolog OsTPR, represented by the sequence SEQ ID NO: 7 NC_029257.1, SEQ ID NO: 8 XP_015625577.1, for the nucleotide and amino acid sequences, respectively. The gene is located on chromosome 2: 31009161 to 31033605 bp; minus strand. The amino acid sequence is shown in FIG. 15.

As used herein a sequence variation in a TPR allele, refers to at least one mutation that can be any of a deletion, substitution, deletion, insertion, inversion of one or more nucleotides in the OsTPR reference sequence.

The variation can be at least 90% identical, but not full identity with the OsTPR allele, in the DNA or protein level.

As used herein, "sequence identity" or "identity" in the context of two nucleic acid or polypeptide sequences includes reference to the residues in the two sequences which are the same when aligned. When percentage of sequence identity is used in reference to proteins it is recognized that residue positions which are not identical often differ by conservative amino acid substitutions, where amino acid residues are substituted for other amino acid residues with similar chemical properties (e.g. charge or hydrophobicity) and therefore do not change the functional properties of the molecule. Where sequences differ in conservative substitutions, the percent sequence identity may be adjusted upwards to correct for the conservative nature of the substitution. Sequences which differ by such conservative substitutions are considered to have "sequence similarity" or "similarity". Means for making this adjustment are well-known to those of skill in the art. Typically this involves scoring a conservative substitution as a partial rather than a full mismatch, thereby increasing the percentage sequence identity. Thus, for example, where an identical amino acid is given a score of 1 and a non-conservative substitution is given a score of zero, a conservative substitution is given a score between zero and 1. The scoring of conservative substitutions is calculated, e.g., according to the algorithm of Henikoff S and Henikoff JG. [Amino acid substitution matrices from protein blocks. Proc. Natl. Acad. Sci. U.S.A. 1992, 89(22): 10915-9].

Identity (e.g., percent homology) can be determined using any homology comparison software, including for example, the BlastN software of the National Center of Biotechnology Information (NCBI) such as by using default parameters.

Hence according to a specific embodiment, the variation can arise from different cultivars of the species (e.g., *indica* to *japonica*) or different species.

According to some embodiments of the invention, the identity is a global identity, i.e., an identity over the entire amino acid or nucleic acid sequences of the invention and not over portions thereof.

As mentioned, this variation that may be of a single base to several hundreds or thousands of nucleotides e.g., 1-200 nucleotides confers the enhanced grain yield.

Methods of validating such variations and their effect in the phenotypes are well known in the art and described in length in the Examples section which follows.

The at least one mutation may be in the coding sequence.

Alternatively or additionally, the at least one mutation may be in the non-coding sequence.

According to a specific embodiment, the sequence variation comprises at least one single nucleotide polymorphism (SNP) selected from the group of SNPs of TPR and optionally other genes shown in Table A below.

According to a specific embodiment, the sequence variation comprises at least two single nucleotide polymorphisms (SNPs) selected from the group of SNPs of TPR and optionally other genes shown in Table A below.

According to a specific embodiment, the sequence variation comprises at least three single nucleotide polymorphisms (SNPs) selected from the group of SNPs of TPR and optionally other genes shown in Table A below.

According to a specific embodiment, the sequence variation comprises at least three single nucleotide polymorphisms (SNPs) selected from the group of SNPs of TPR and optionally other genes shown in Table A below.

According to a specific embodiment, the sequence variation comprises at least four single nucleotide polymorphisms (SNPs) selected from the group of SNPs of TPR and optionally other genes shown in Table A below.

According to a specific embodiment, the sequence variation comprises at least five single nucleotide polymorphism (SNPs) selected from the group of SNPs of TPR and optionally other genes shown in Table A below.

According to a specific embodiment, the sequence variation comprises at least six single nucleotide polymorphism (SNPs) selected from the group of SNPs of TPR and optionally other genes shown in Table A below.

According to a specific embodiment, the sequence variation comprises at least seven single nucleotide polymorphism (SNPs) selected from the group of SNPs of TPR and optionally other genes shown in Table A below.

According to a specific embodiment, the sequence variation comprises at least eight single nucleotide polymorphism (SNPs) selected from the group of SNPs of TPR and optionally other genes shown in Table A below.

According to a specific embodiment, the sequence variation comprises at least nine single nucleotide polymorphism (SNPs) selected from the group of SNPs of TPR and optionally other genes shown in Table A below.

According to a specific embodiment, the sequence variation comprises at least ten single nucleotide polymorphism (SNPs) selected from the group of SNPs of TPR and optionally other genes shown in Table A below.

According to a specific embodiment, the sequence variation comprises at least ten to 20 single nucleotide polymorphism (SNPs) selected from the group of SNPs of TPR and optionally other genes shown in Table A below.

According to a specific embodiment, the sequence variation comprises at least ten to 30 single nucleotide polymorphism (SNPs) selected from the group of SNPs of TPR and optionally other genes shown in Table A below.

According to a specific embodiment, the sequence variation comprises at least ten to 50 single nucleotide polymorphism (SNPs) selected from the group of SNPs of TPR and optionally other genes shown in Table A below.

According to a specific embodiment, the sequence variation is as set forth in haplotype I (AGGATCA, SEQ ID NO: 1).

According to a specific embodiment haplotype I and genetic variations in other genes are provided in Table A below:

ture which shows snp_02_31035009 (G/A; upstream SNP) as the first SNP (leftmost) and snp_02_31010249 (T/A) as the last SNP (rightmost).

Now the superior haplotype, AGGATCA, is a mixture of both reference and alternative alleles. Here, the alleles in bold (A and C) are from the reference while the ones not in bold are alternative alleles. The underlined allele (T) is an alternative allele which refers to the SNP which has both a missense and splice variant annotation (snp_02_31024549). The r-square values of snp_02_31024549 with the neighboring reference alleles, snp_02_31023080 and snp_02_31026954, are 0.623 and 0.564, respectively. Most of the seven SNPs have high D' (0.986 to 1.0) but the r-square values are variable (0.56 to 0.986).

Motif connection with haplotype SPL3/SPL14 in *Arabidopsis* bind specifically to the consensus nucleotide sequence 5'-TNCGTACAA-3'. For motif searching, the input sequence consists of a stretch of 31 bp, having the upstream SNP, snp_02_31035009 (G/A), in the middle (15th SNP) and is reverse transcribed for the software used. Snp_02_31035009 overlaps with the eighth position of the motif (5'-TNCGTACAA-3') having either T(A) for lines

TABLE A (variation is shown in a bigger font)

| | | | | | | | | |
|---|---|---|---|---|---|---|---|---|
| LOC_Os02g50790/LOC_Os02g50799 | OsTPR | snp_02_31035009 | 10231035009 | 2 | 31035009 | G | A | Variant in promoter region | — |
| LOC_Os02g50790/LOC_Os02g50799 | OsTPR | snp_02_31026954 | 10231026954 | 2 | 31026954 | C | G | Missense variant | Glu > Gln |
| LOC_Os02g50790/LOC_Os02g50799 | OsTPR | snp_02_31024549 | 10231024549 | 2 | 31024549 | C | T | Missense variant and splice region variant | Glu > Lys |
| LOC_Os02g50790/LOC_Os02g50799 | OsTPR | snp_02_31023080 | 10231023080 | 2 | 31023080 | A | T | Missense variant | Leu > Met |
| LOC_Os02g50790/LOC_Os02g50799 | OsTPR | snp_02_31019010 | 10231019010 | 2 | 31019010 | T | G | Missense variant | Gln > His |
| LOC_Os02g50790/LOC_Os02g50799 | OsTPR | snp_02_31013745 | 10231013745 | 2 | 31013745 | A | G | Missense variant | Val > Ala |
| LOC_Os02g50790/LOC_Os02g50799 | OsTPR | snp_02_31010249 | 10231010249 | 2 | 31010249 | T | A | Missense variant | Met > Leu |
| LOC_Os04g39430 | D11 | snp_04_23472273 | 10423472273 | 4 | 23472273 | G | A | Variant in promoter region | — |
| LOC_Os04g39430 | D11 | snp_04_23472700 | 10423472700 | 4 | 23472700 | G | A | Variant in promoter | — |
| LOC_Os04g39430 | D11 | snp_04_23472861 | 10423472861 | 4 | 23472861 | C | T | Variant in promoter | — |
| LOC_Os06g40780 | MOC1 | snp_06_24312857 | 10624312857 | 6 | 24312857 | G | C | Synonymous variant | — |
| LOC_Os06g40780 | MOC1 | snp_06_24313378 | 10624313378 | 6 | 24313378 | A | G | Intronic variant | — |
| LOC_Os11g35390 | MYB4P | snp_11_20737146 | 11120737146 | 11 | 20737146 | A | G | Synonymous variant | — |

Thus, the SNP can be located in an intron, a regulatory (e.g., promoter), and/or a coding region.

FIG. 3 shows exemplary locations of the SNPs which may build a superior haplotype such as haplotype I.

The at least one mutation can be in a functional domain. An example of a functional domain may be a promoter, a TPR domain, a binding region for SPL3/SPL14.

Exemplary SNPs include, but are not limited to:
snp_02_31010249, snp_02_31013745, snp_02_31019010 (SNP within the TPR domain), snp_02_31023080, snp_02_31024549, snp_02_31026954, snp_02_31035009 (SNP in promoter region).

As used herein "haplotype" relates to a set of SNP alleles that tend to always occur together (i.e., that are associated statistically).

The at least one mutation can be in a structural domain of the DNA, RNA or protein.

Haplotype and gene structure in FIG. 3, in connection with Table A. Since the OsTPR gene is in minus strand, the haplotype (3' to 5') is a reverse of the gene structure (5' to 3') presented. Given this, the sequence of SNPs (from left to right) in the haplotype is as follows: snp_02_31010249 (T/A), snp_02_31013745 (A/G), snp_02_31019010 (T/G; SNP in TPR domain), snp_02_31023080 (A/T), snp_02_31024549 (C/T), snp_02_31026954 (C/G), snp_02_31035009 (G/A; upstream SNP; colored as orange). But this sequence is reversedly presented in the gene strucwith high USRB (HUSRB) or C(G) for lines with low USRB (LUSRB). The alleles in parentheses are the reverse complement of the nucleotides in the genomic sequence. These alleles are colored in orange in the haplotype sequence, with A for HUSRB lines and G for LUSRB lines.

As used herein a "donor plant" which may also be referred to as a "non-recurrent parent" comprises the variation in the TPR gene.

According to a specific embodiment, Samba Mahsuri is a donor plant.

As used herein "a recipient plant" which may also be referred to as a "recurrent parent" refers to a cultivar e.g., an elite line, that could be made better (e.in terms of yield) by adding sequence variation.

The recipient plant may not comprise the variation at all, accordingly the recipient plant is null for said sequence variation, e.g., haplotype I.

According to other embodiments, the recipient plant may comprise a single allele or more but not all alleles which comprise the variation, in such a case the plant is heterozygous for the variation. In certain case, such a plant may be simply subjected to selfing to render it homozygous for the variation.

Accordingly, the recipient plant is heterozygous for the sequence variation e.g., haplotype I.

As mentioned, once progeny plants are selected for the trait, the progeny may be crossed to the recurrent parent (it is 'crossed back' to the recurrent parent, hence the term backcross). The progeny of this cross is selected for the trait of interest and then crossed back to the recurrent parent. This process is repeated for as many backcrosses as are needed to create a line that is the recurrent parent with the sequence variation from the donor parent. The goal of backcrossing is to obtain a line as identical as possible to the recurrent parent with the addition of the sequence variation that has been added through breeding.

According to an embodiment of the invention, the recipient rice plant may comprise a genetic background that comprises a sequence variation in a gene selected from the group consisting of D11, MOC1 and MYB4P (D11, MOC1, MYB4P, D11+MOC1, D11+MYB4P, MOC1+MYB4P, D11+MYB4P+MOC1). The present inventor identified a superior phenotype in terms of yield when variations in any of these genes were added to the TPR allele variation (see FIG. 6). DWARF11 encodes cytochrome P450 superfamily protein involved in brassinosteroid biosynthesis. Transgenic plants manipulated for His360Leu amino acid substitution were shown to confer clustered primary branch in rice (Wu, Y., Fu, Y., Zhao, S., Gu, P., Zhu, Z., Sun, C., Tan, L. 2016. CLUSTERED PRIMARY BRANCH 1, a new allele of DWARF11, controls panicle architecture and seed size in rice. *Plant Biotech. J.* 14:377-386. doi: 10.1111/pbi.12391. DWARF11 mutation leads to reduced rachis length, decreased grain number, and secondary rachis branches. Overexpression of DWARF11 leads to an increase in total grain number and thus yield enhancement by 16% (Zhou, Y., Tao, Y., Zhu, J., Miao, J., Liu, J., Liu, Y., Yi, C., Yang, Z., Gong, Z., Liang, G. 2017. GNS4, a novel allele of DWARF11, regulates grain number and grain size in a high-yield rice variety. *Rice.* 10(34):1-11. DOI 10.1186/s12284-017-0171-4. An exemplary sequence is provided in SEQ ID NO: 11 or 12.

MOC1 encodes a GRAS family transcription regulator which controls tillering, number of rachis branches, and spikelets in rice (Li, X., Qian, Q., Fu, Z., Wang, Y., Xiong, G., Zeng, D., Wang, X., Liu, X., Teng, S., Hiroshi, F., Yuan, M., Luo, D., Han, B., Li, J. 2003. Control of tillering in rice. *Nature.* 422: 618-621. DOI:10.1038/nature01518). An exemplary sequence is provided in SEQ ID NO: 13 or 14.

MYB4P encodes an R2R3 MYB family transcription factor which plays a role in cell differentiation, abiotic response, and phosphate acquisition (www(dot)uniprot(dot) org/uniprot/Q2R2L6; www(dot)ncbi(dot)nlm(dot)nih(dot) gov/pubmed/24813725) Yang, W. T., Baek, D., Yun, D. J., Hwang, W. H., Park, D. S., Nam, M. H., Chung, E. S., Chung, Y. S., Yi, Y. B., Kim, D. H. 2014. Overexpression of OsMYB4P, an R2R3-type MYB transcriptional activator, increases phosphate acquisition in rice. *Plant Physiol Biochem.* 80:259-67. doi: 10.1016/j.plaphy.2014.02.024. An exemplary sequence is provided in SEQ ID NO: 15 or 16.

According to a specific embodiment the recipient rice plant is of a variety comprising a sequence variation in a gene selected from the group consisting of D11, MOC1, and MYB4P.

According to a specific embodiment the method further comprises breeding the recipient plant, donor plant or progeny plant to comprise a sequence variation in a gene selected from the group consisting of D11, MOC1, and MYB4P.

Figure 6:
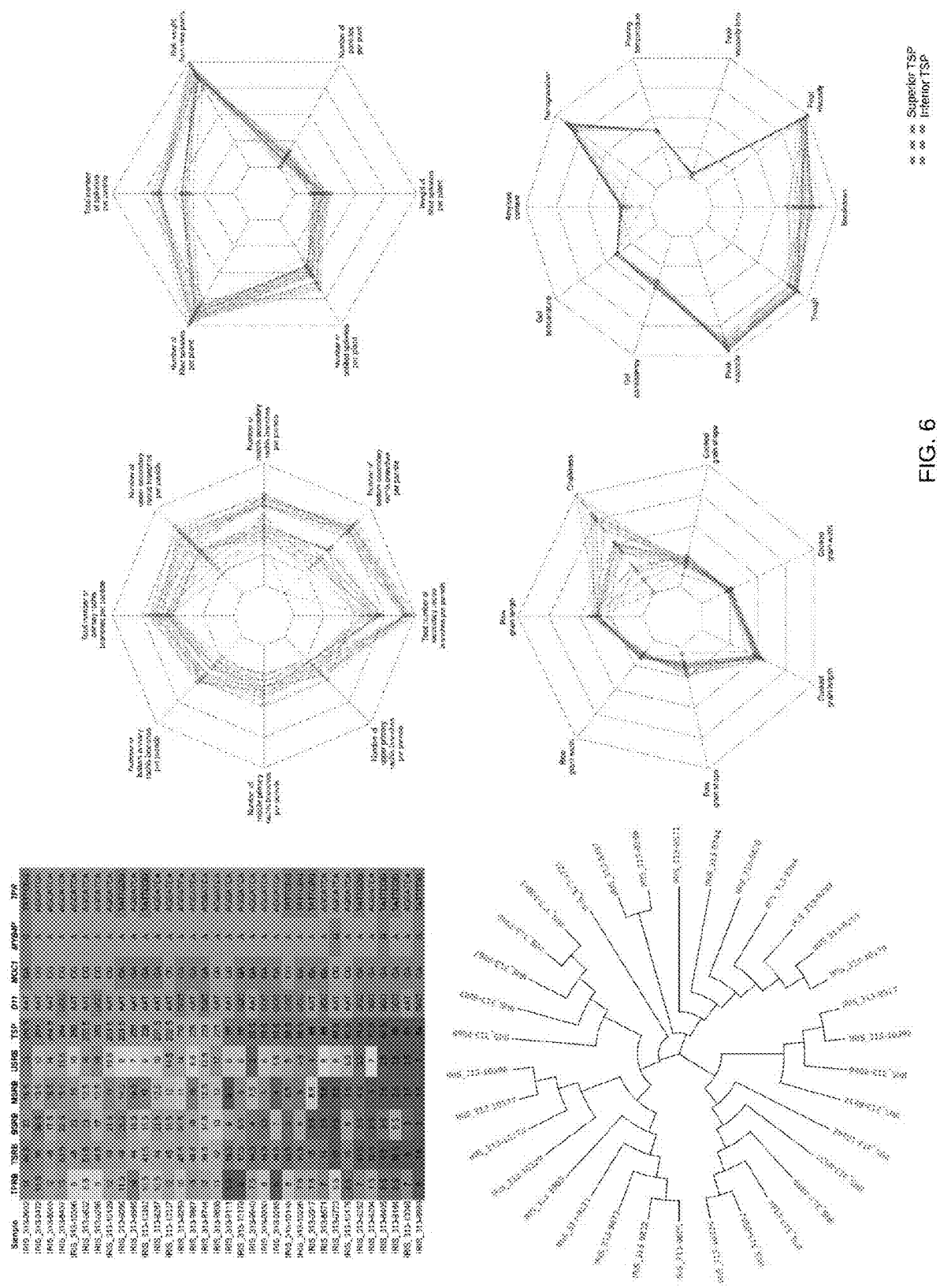

According to a specific embodiment the recipient plant or said progeny comprises a sequence variation in a gene selected from the group consisting of D11, MOC1, and MYB4P is shown in FIG. 6.

Such genetic backgrounds are available in the IRIS series shown in FIG. 6.

Exemplary haplotypes are shown in Table A above.

Other sequence variations are described in FIG. 17.

According to an additional or an alternative embodiment, the recipient plant is characterized by high amylose content (e.g., comprising a sequence variation which reduces expression of a starch branching enzyme IIb (sbeIIb, e.g., LOC_Os02g32660)), and optionally a sequence variation in MOC1. Such an exemplary line is IR36ae. According to a specific embodiment, the cross is between Samba Masuri and IR36ae (see FIG. 18).

Numerous ways are known in the art for crossing Gramineae plants or species thereof. The following refers to rice but in a non-limiting manner such that it can encompass other Gramineae or crosses therebetween (interspecific crossing).

Thus, according to one embodiment, for producing a rice plant with improved yield, protoplast fusion can be used for the transfer of nucleic acids from a donor plant to a recipient plant. Protoplast fusion is an induced or spontaneous union, such as a somatic hybridization, between two or more protoplasts (cells of which the cell walls are removed by enzymatic treatment) to produce a single bi- or multi-nucleate cell. The fused cell, that may even be obtained with plant species that cannot be interbred in nature, is tissue cultured into a hybrid plant exhibiting the desirable combination of traits. More specifically, a first protoplast can be obtained from a rice plant or other plant line that exhibits improved grain yield. For example, a protoplast from a superior *indica* line e.g., IR64. A second protoplast can be obtained from rice or other plant variety, preferably a popular *japonica* rice cultivar e.g., Nipponbare. Additionally, the second protoplast may be from a rice variety that comprises commercially desirable characteristics, such as, but not limited to disease resistance, insect resistance, weed resistance, etc. The protoplasts are then fused using traditional protoplast fusion procedures, which are known in the art.

Alternatively, embryo rescue may be employed in the transfer of a nucleic acid comprising the TPR variation as described above from a donor plant to a recipient plant. Embryo rescue can be used as a procedure to isolate embryos from crosses wherein plants fail to produce viable seed. In this process, the fertilized ovary or immature seed of a plant is tissue cultured to create new plants.

Traditional breeding techniques can also be used to introgress a nucleic acid sequence of the variation in the TPR allele into a recipient rice plant in which a higher grain yield is desirable. In one method, related to pedigree breeding, a donor rice plant comprising a nucleic acid sequence variation as discussed is crossed with a rice plant in which a higher grain yield is desirable. The resulting plant population (representing the F1 hybrids) is then self-pollinated and set seeds (F2 seeds). The F2 plants grown from the F2 seeds are then screened for improved grain yield and optionally grain quality. The population can be screened or selected for improved grain yield in a number of different ways. For example, the population can be screened by field evaluation over several seasons.

An embodiment relates to a rice plant having improved grain yield, or part thereof, comprising within its genome the TPR variation, wherein the variation is not in its natural genetic background. The rice plants having improved grain yield described herein can be of any genetic type such as inbred, hybrid, haploid, dihaploid. Further, the plants of the present invention may be heterozygous or homozygous for the variation. As mentioned, although the TPR variation may be transferred to any rice plant in order to provide for a plant having improved grain yield, the methods and plants described herein are related to Gramineae family.

Inbred rice lines having improved grain yield can be developed using the techniques of recurrent selection and backcrossing, selfing and/or dihaploids or any other technique used to make parental lines. In a method of selection and backcrossing, improved grain yield can be introgressed into the recipient plant (which as mentioned is also termed "a recurrent parent") by crossing the recurrent parent with a first donor plant (which is different from the recurrent parent and referred to herein as the "non-recurrent parent"). The recurrent parent is a plant in which an increase in grain yield is desirable. Optionally, the recurrent parent possesses commercially desirable characteristics, such as, but not limited to disease resistance, insect resistance, weed resistance, etc. The non-recurrent parent comprises a nucleic acid sequence with the TPR sequence variation. The non-recurrent parent can be any plant variety or inbred line that is cross-fertile with the recurrent parent (or fertilization may be aided by means which are well known in the art). The progeny resulting from a cross between the recurrent parent and non-recurrent parent are backcrossed to the recurrent parent. The resulting plant population is then screened (also termed here as "selected"). The population can be screened in a number of different ways. F1 hybrid plants that exhibit improved grain yield and comprise the requisite nucleic acid sequence for the variation are then selected and selfed and selected for over a number of generations in order to allow for the rice plant to become increasingly inbred. This process of continued selfing and selection can be performed for zero to five or more generations. The result of such breeding and selection is the production of lines that are genetically homogenous for the variation associated with improved grain yield as well as other genes associated with traits of commercial interest.

Instead of using phenotypic screens, marker assisted selection (MAS) can be performed using one or more of the herein described molecular markers (e.g., for haplotype I), hybridization probes, or polynucleotides to identify those progeny that comprise the nucleic acid variation. The MAS is used for by identifying said variation.

Molecular markers can include restriction fragment length polymorphisms (RFLP), random amplified polymorphic DNA (RAPD), amplified fragment length polymorphisms (AFLP), single nucleotide polymorphisms (SNP) or simple sequence repeats (SSR). A primary motivation for development of molecular markers in crop species is the potential for increased efficiency in plant breeding through marker assisted selection (MAS) and marker assisted backcrossing (MABC). Genetic marker alleles are used to identify plants that contain a desired genotype at one or more loci and that are expected to transfer the desired genotype, along with a desired phenotype to their progeny. Genetic marker alleles can be used to identify plants that contain a desired genotype at one locus or at several unlinked or linked loci (e.g., a haplotype) and that would be expected to transfer the desired genotype, along with a desired phenotype to their progeny.

After a desired phenotype, e.g., improved grain yield and a polymorphic chromosomal locus are determined to segregate together, it is possible to use those polymorphic loci to select for alleles corresponding to the desired phenotype: a process called marker-assisted selection (MAS). In brief, a nucleic acid corresponding to the marker nucleic acid is detected in a biological sample from a plant to be selected. This detection can take the form of hybridization of a probe nucleic acid to a marker, e.g., using allele-specific hybridization, Southern analysis, northern analysis, in situ hybridization, hybridization of primers followed by PCR amplification of a region of the marker, or the like. A variety of procedures for detecting markers are described herein. After the presence (or absence) of a particular marker and/or marker allele in the biological sample is verified, the plant is selected, i.e., used to make progeny plants by selective breeding.

Screening a large number of plants for improved grain yield can be expensive, time consuming and unreliable. Use of the genetically-linked nucleic acids described herein as genetic markers for improved grain yield is an effective method for selecting plants capable of fertility restoration in breeding programs. For example, one advantage of marker-assisted selection over field evaluations for improved grain yield is that MAS can be done at any time of year regardless of the growing season. Moreover, environmental effects are irrelevant to MAS.

Another use of MAS in plant breeding is to assist the recovery of the recurrent parent genotype by backcross breeding. Backcross breeding is the process of crossing a progeny back to one of its parents. Backcrossing is usually done for the purpose of introgressing one or a few loci from a donor parent into an otherwise desirable genetic background from the recurrent parent. The more cycles of backcrossing that are done, the greater the genetic contribution of the recurrent parent to the resulting variety. This is often necessary, because donor parent plants may be otherwise undesirable. In contrast, varieties which are the result of intensive breeding programs may merely being deficient in one desired trait such as improved grain yield. Backcrossing can be done to select for or against a trait.

Markers corresponding to genetic polymorphisms between members of a population can be detected by numerous methods, well-established in the art (e.g., restriction fragment length polymorphisms, isozyme markers, allele specific hybridization (ASH), amplified variable sequences of the plant genome, self-sustained sequence replication, simple sequence repeat (SSR), single nucleotide polymorphism (SNP) or amplified fragment length polymorphisms (AFLP)).

The majority of genetic markers rely on one or more properties of nucleic acids for their detection. For example, some techniques for detecting genetic markers utilize hybridization of a probe nucleic acid to nucleic acids corresponding to the genetic marker. Hybridization formats include but are not limited to, solution phase, solid phase, mixed phase or in situ hybridization assays. Markers which are restriction fragment length polymorphisms (RFLP), are detected by hybridizing a probe (which is typically a sub-fragment or a synthetic oligonucleotide corresponding to a sub-fragment of the nucleic acid to be detected) to restriction digested genomic DNA. The restriction enzyme is selected to provide restriction fragments of at least two alternative (or polymorphic) lengths in different individuals and will often vary from line to line. Determining a (one or more) restriction enzyme that produces informative fragments for each cross is a simple procedure, well known in the art. After separation by length in an appropriate matrix (e.g., agarose) and transfer to a membrane (e.g., nitrocellulose, nylon), the labeled probe is hybridized under conditions which result in equilibrium binding of the probe to the target followed by removal of excess probe by washing. Nucleic acid probes to the marker loci can be cloned and/or synthesized. Detectable labels suitable for use with nucleic acid probes include any composition detectable by spectroscopic, radioisotopic, photochemical, biochemical, immunochemical, electrical, optical or chemical means. Useful labels include biotin for staining with labeled streptavidin conjugate, magnetic beads, fluorescent dyes, radiolabels, enzymes and colorimetric labels. Other labels include ligands which bind to antibodies labeled with fluorophores, chemiluminescent agents and enzymes. Labeling markers is readily achieved such as by the use of labeled PCR primers to marker loci.

The hybridized probe is then detected using, most typically, autoradiography or other similar detection technique (e.g., fluorography, liquid scintillation counter, etc.). Examples of specific hybridization protocols are widely available in the art.

Amplified variable sequences refer to amplified sequences of the plant genome which exhibit high nucleic acid residue variability between members of the same species. All organisms have variable genomic sequences and each organism (with the exception of a clone) has a different set of variable sequences. Once identified, the presence of specific variable sequence can be used to predict phenotypic traits. Preferably, DNA from the plant serves as a template for amplification with primers that flank a variable sequence of DNA. The variable sequence is amplified and then sequenced.

In vitro amplification techniques are well known in the art. Examples of techniques include in vitro methods, including the polymerase chain reaction (PCR), the ligase chain reaction (LCR), O,.beta.-replicase amplification and other RNA polymerase mediated techniques (e.g., NASBA). Essentially any RNA can be converted into a double stranded DNA suitable for restriction digestion, PCR expansion and sequencing using reverse transcriptase and a polymerase.

Oligonucleotides for use as primers, e.g., in amplification reactions and for use as nucleic acid sequence probes, are typically synthesized chemically according to the solid phase phosphoramidite triester method, or can simply be ordered commercially.

Alternatively, self-sustained sequence replication can be used to identify genetic markers. Self-sustained sequence replication refers to a method of nucleic acid amplification using target nucleic acid sequences which are replicated exponentially in vitro under substantially isothermal conditions by using three enzymatic activities involved in retroviral replication: (1) reverse transcriptase, (2) Rnase H and (3) a DNA-dependent RNA polymerase. By mimicking the retroviral strategy of RNA replication by means of cDNA intermediates, this reaction accumulates cDNA and RNA copies of the original target.

There are many different types of molecular markers, including amplified fragment length polymorphisms (AFLP), allele-specific hybridization (ASH), single nucleotide polymorphisms (SNP), simple sequence repeats (SSR) and isozyme markers. SSR data is generated by hybridizing primers to conserved regions of the plant genome which flank the SSR sequence. PCR is then used to amplify the repeats between the primers. The amplified sequences are then electrophoresed to determine the size and therefore the di-, tri and tetra nucleotide repeats.

The presence of the variation in the genome of a plant exhibiting a preferred phenotypic trait is determined by any method listed above, e.g., RFLP, AFLP, SSR, etc. If the nucleic acids from the plant are positive for a desired genetic marker, the plant can be selfed to create a true breeding line with the same genotype or it can be crossed with a plant with the same marker or with other desired characteristics to create a sexually crossed hybrid generation.

As mentioned, selection can be also or alternatively based on phenotypic screening for a grain yield- and/or grain quality-associated trait, such as described above.

Once the appropriate selections are made, the process is repeated. The process of backcrossing to the recurrent parent and selecting for improved grain yield (or the variation or both) is repeated for approximately 2-5 or more generations. The progeny resulting from this process are heterozygous for the variation. The last backcross generation can then be selfed in order to provide for homozygous pure breeding progeny for improved grain yield.

The rice lines having improved grain yield described herein can be used in additional crossings to create hybrid plants having improved grain yield. For example, a first inbred rice plant having improved grain yield produced by methods described herein can be crossed with a second inbred rice plant possessing commercially desirable traits such as, but not limited to, disease resistance, insect resistance, weed resistance, etc. This second inbred rice line may or may not have relatively improved grain yield.

Regardless of the selection method, following trait selection and backcrossing the genome of the cultivated Gramineae plant e.g., rice plant of the recurrent parent is recovered to at least 85%, at least 87%, at least 90%, at least 92%, at least 94%, at least 96%, or at least 98%. That is, the plant of the invention has a genome being at least 85%, e.g., 85-99.9% that of the recurrent parent e.g., *Oryza sativa*.

Also provided are such methods, wherein the recovery of the recurrent rice plant's genome (e.g., *Oryza sativa*) is between 92% and 97%.

A rice plant having improved grain yield, or a part thereof, or an elite line obtainable by a method described herein is also an embodiment of the present invention.

According to an embodiment, the plant is not Samba Mahsuri.

According to a specific embodiment, the plant is not a breeding line.

According to a specific embodiment, the plant is not any of the below lines:
IRRI179
IR30
IR34
IRRI135
IRRI127
IR64
IRRI174
IRRI168
IRRI108
IRRI123
IRRI156

Also contemplated is an elite line of a Gramineae plant comprising a sequence variation in a TPR allele or a haplotype I, the plant being characterized by an improved grain yield as compared to a control plant (excluded are the lines described above).

Also provided are processed rice products which are produced from the plants described herein and preferably contain the nucleic acid sequence conferring the improved out-crossing rate described herein. Also provided are methods of processing the rice (e.g., to produce meal) or other processed products.

Food Characteristics:

Rice starch is a major source of carbohydrate in the human diet, particularly in Asia, and the grain of the invention and products derived from it can be used to prepare food. The food may be consumed by man or animals, for example in livestock production or in pet-food. The grain derived from the rice plant can readily be used in food processing procedures, and therefore the invention includes milled, ground, kibbled, cracked, rolled, boiled or parboiled grain, or products obtained from the processed or whole grain of the rice plant, including flour, brokers, rice bran and oil. The products may be precooked or quick-cooking rice, instant rice, granulated rice, gelatinized rice, canned rice or rice pudding. The grain or starch may be used in the production of processed rice products including noodles, rice cakes, rice paper or egg roll wrapper, or in fermented products such as fermented noodle or beverages such as sake. The grain or starch derived therefrom may also be used in, for example, breads, cakes, crackers, biscuits and the like, including where the rice flour is mixed with wheat or other flours, or food additives such as thickeners or binding agents, or to make drinks, noodles, pasta or quick soups. The rice products may be suitable for use in wheatfree diets. The grain or products derived from the grain of the invention may be used in breakfast cereals such as puffed rice, rice flakes or as extruded products.

Dietary Fiber:

Dietary fiber, in this specification, is the carbohydrate and carbohydrate digestion products that are not absorbed in the small intestine of healthy humans but enter the large bowel. This includes resistant starch and other soluble and insoluble carbohydrate polymers. It is intended to comprise that portion of carbohydrates that are fermentable, at least partially, in the large bowel by the resident microflora.

Non-Food Applications:

Rice is widely used in non-food industries, including the film, paper, textile, corrugating and adhesive industries, for example as a sizing agent. Rice starch may be used as a substrate for the production of glucose syrups or for ethanol production.

DNA detection in the processed products can be performed using methods which are well known in the art and are described in some detail hereinabove.

It will be appreciated that the present teachings contemplate the protection of cultivated Gramineae plants such as cultivated rice plants and will not in any way encompass wild Gramineae per se.

Applicant notes that all varieties designated IRIS are not restricted for use and can be provided by Applicant to $3^{rd}$ party for research purposes under a Standard Material Transfer Agreement ("SMTA").

It is expected that during the life of a patent maturing from this application many relevant markers will be developed and the scope of the term marker is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

When reference is made to particular sequence listings, such reference is to be understood to also encompass sequences that substantially correspond to its complementary sequence as including minor sequence variations, resulting from, e.g., sequencing errors, cloning errors, or other alterations resulting in base substitution, base deletion or base addition, provided that the frequency of such variations is less than 1 in 50 nucleotides, alternatively, less than 1 in 100 nucleotides, alternatively, less than 1 in 200 nucleotides, alternatively, less than 1 in 500 nucleotides, alternatively, less than 1 in 1000 nucleotides, alternatively, less than 1 in 5,000 nucleotides, alternatively, less than 1 in 10,000 nucleotides.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Generally, the nomenclature used herein and the laboratory procedures utilized in the present invention include molecular, biochemical, microbiological and recombinant DNA techniques. Such techniques are thoroughly explained in the literature. See, for example, "Molecular Cloning: A laboratory Manual" Sambrook et al., (1989); "Current Protocols in Molecular Biology" Volumes I-III Ausubel, R. M., ed. (1994); Ausubel et al., "Current Protocols in Molecular Biology", John Wiley and Sons, Baltimore, Maryland (1989); Perbal, "A Practical Guide to Molecular Cloning", John Wiley & Sons, New York (1988); Watson et al., "Recombinant DNA", Scientific American Books, New York; Birren et al. (eds) "Genome Analysis: A Laboratory Manual Series", Vols. 1-4, Cold Spring Harbor Laboratory Press, New York (1998); methodologies as set forth in U.S. Pat. Nos. 4,666,828; 4,683,202; 4,801,531; 5,192,659 and 5,272,057; "Cell Biology: A Laboratory Handbook", Volumes I-III Cellis, J. E., ed. (1994); "Culture of Animal Cells—A Manual of Basic Technique" by Freshney, Wiley-Liss, N. Y. (1994), Third Edition; "Current Protocols in Immunology" Volumes I-III Coligan J. E., ed. (1994); Stites et al. (eds), "Basic and Clinical Immunology" (8th Edition), Appleton & Lange, Norwalk, CT (1994); Mishell and Shiigi (eds), "Selected Methods in Cellular Immunology", W. H. Freeman and Co., New York (1980); available immunoassays are extensively described in the patent and scientific literature, see, for example, U.S. Pat. Nos. 3,791,932; 3,839,153; 3,850,752; 3,850,578; 3,853,987; 3,867,517; 3,879,262; 3,901,654; 3,935,074; 3,984,533; 3,996,345; 4,034,074; 4,098,876; 4,879,219; 5,011,771 and 5,281,521; "Oligonucleotide Synthesis" Gait, M. J., ed. (1984); "Nucleic Acid Hybridization" Hames, B. D., and Higgins S. J., eds. (1985); "Transcription and Translation" Hames, B. D., and Higgins S. J., eds. (1984); "Animal Cell Culture" Freshney, R. I., ed. (1986); "Immobilized Cells and Enzymes" IRL Press, (1986); "A Practical Guide to Molecular Cloning" Perbal, B., (1984) and "Methods in Enzymology" Vol. 1-317, Academic Press; "PCR Protocols: A Guide To Methods And Applications", Academic Press, San Diego, CA (1990); Marshak et al., "Strategies for Protein Purification and Characterization—A Laboratory Course Manual" CSHL Press (1996); all of which are incorporated by reference as if fully set forth herein. Other general references are provided throughout this document. The procedures therein are believed to be well known in the art and are provided for the convenience of the reader. All the information contained therein is incorporated herein by reference.

Methods

Phenotype Data Measurement and Transformation

A total of 310 diverse resequenced *indica* rice accessions grown in the experimental station of the International Rice Research (IRRI), Laguna, Philippines (14° N, 121° E) during the 2015 dry season was harvested before full grain ripening, and then phenotyped using Panicle Traits Phenotyping (P-TraP) Tool (A1-Tam et al. 2013). The phenotype values were transformed using WarpedLMM (Fusi et al. 2014), a transformation tool which ensures Gaussian distribution of residuals by incorporating all available covariates and genotype profile (i.e. individual genetic loci and polygenic genetic background) of each accession in order to increase GWAS power in identifying important genomic regions and increase the accuracy in estimating heritability and predicting phenotypic values.

Genotype Data Filtering

Genotype data consisting of 15,099,561 bi-allelic SNPs from The 3,000 Genomes Rice Project was filtered for the 310 resequenced *indica* accessions using PLINK 1.9 (Chang et al. 2015). Markers with missing call rate more than 0.20% were excluded, followed by samples with missing call rate more than 0.20%. Moreover, variants with minor allele frequency less than 10% were filtered out to include only common variants and to control false-positive results (Tabangin et al., 2009). A total of 747,087 high quality SNPs were retained from 309 samples after filtering.

Single Locus GWAS Analysis

The marker-based Balding-Nichols kinship matrix was calculated through the Efficient Mixed-Model Association eXpedited (EMMAX) ver. Beta (Kang et al. 2010) using the emmax-kin function. The kinship matrix was considered as covariate while the SNPs were treated as fixed effects for the variance component linear mixed model implemented in EMMAX. The EMMAX associations between the filtered genotype data and transformed phenotype data for each trait were then computed. Manhattan and QQ plots were created using R (ver. 1.0.153) (R Core Team, 2018) in order to visualize the significant genomic regions and assess the reliability of the EMMAX associations, respectively. The red line represents the Bonferroni threshold (7.17) which assumes independence among all the tests (Tabangin et al., 2009). However, this correction method is extremely stringent and renders high rate of false negative results; hence, it reduces true discovery rate. In this study, SNPs with q-value less than 0.05 were considered to be significant in order to increase the discovery rate and control the rate of false positive results (Lin and Lee, 2015). The blue line in the Manhattan plot represents the SNP with the highest significant p-value whose q-value is still less than 0.05. All SNPs within the red and blue lines in the Manhattan plot were considered to be significant.

PLINK 1.9 (Chang et al. 2015) software and HaploView (Barrett et al., 2005) software were used to define haplotype blocks with regions inherited without significant recombination in the diversity population. Haplotype blocks were determined using the blocks function in PLINK 1.9. HaploView was used to determine tag SNPs based on LD coefficient (D'≥0.80). The tag SNPs per block and the haplotype groups formed therewith were further visualized in boxplots for USRB.

Gene-Level and Gene-Set Analyses

Gene and gene-set analysis were performed using Multi-marker Analysis of GenoMic Annotation (MAGMA) ver. 1.06 in order to simultaneously determine the joint effect of multiple markers (de Leeuw et al. 2015). All significant SNPs previously identified from GWAS results were mapped to genes from the Rice Genome Annotation Project (MSU v7) based on genomic location (Kawahara et al. 2013). The SNP-wise mean model was used in MAGMA for the gene-level analysis, incorporating the p-values of SNPs computed from EMMAX and the filtered genotype data to estimate the LD between SNPs. After computing for the correlations between neighbouring genes and other gene-level metrics, competitive gene-set analysis was implemented as a linear regression model in order to test whether or not the mean association of the genes in the gene-set would be greater than that of the genes not in the gene-set. This approach used to create different sets of genes by removing one gene from the set of the top ten genes based on p-value for every gene-set.

Multi-Locus GWAS Analysis

Multi-locus GWAS was performed using Multi-Locus Random-SNP-Effect Mixed Linear Model (mrMLM) function in R, as described in Misra et al. (2018). Inputs were transformed phenotype data, filtered genotype data, and kinship matrix for each panicle trait: TSP, DSP, BRSB, DSBRB, MRSB, DMSRB, USRB, DUSRB, TSRB, and TPRB. The SNP data used in slGWAS was re-coded into ped and map files using recode function in PLINK 1.9, and then converted into diploid hapmap file using TASSEL5 (Bradbury et al., 2007). The methods implemented were mrMLM and FAST multi-locus random-SNP-effect EMMA (FAS-TrEMMA) considering a critical LOD score equals 3 for significant quantitative trait nucleotide (QTN), a search radius of 20 to identify potentially associated QTN, and restricted maximum likelihood (REML) for the likelihood parameter in FASTrEMMA. The QTNs identified with mlG-WAS methods were validated by slGWAS results.

Targeted Association Analysis

Biallelic SNPs within 2 kb upstream and 1 kb downstream of known panicle-related genes were extracted by aligning resequencing data of 309 accessions against reference genome Nipponbare and tested its association with TSP, TPRB, TSRB and sub-component traits (USRB, MSRB, BSRB). SNPs with p-values <0.05 were considered significant and used to form haplotype groups. Pairwise comparison of haplotype groups were performed with t-test and p-values were adjusted using Holm's method. Results were visualized using boxplots created using the ggplot2 package (Wickham, 2016) in R.

Association Networks of Genetic Variants Identified Through mlGWAS and Targeted Association The Cytoscape (Shannon et al., 2003) has been used to visualize the inter-relationship of SNPs associated to USRB, MSRB, BSRB, TSRB, TPRB and TSP traits. The SNPs with LOD score of 3.0 or above identified using mlGWAS with significant beta values (p<0.05) obtained from slGWAS and SNPs identified for known panicle architecture related genes through targeted association with significant beta values (p<0.05) has been merged together and transform as network input file (Source node:Traits,Target nodes-SNPs,Interaction-b values). Each trait has been grouped separately and shown as big circle nodes with distinct colors. The SNPs associated with each and across traits has been shown as out-degree edges highlighted in blue (multi locus) and red color (targeted association) with solid circles at each node.

Coexpression Network Analysis

The publicly available microarray data (GSE19024 and GSE41556) were extracted as CEL files from the six panicle developmental stages [Panicle1 (less than 1 mm), Panicle2 (3-5 mm), Panicle3 (10-15 mm) including three biological replicates, Panicle4 (40-50 mm), Panicle5 (Heading stage) with two biological replicates from two rice varieties Zhenshan 97 & Minghui 63] and additional heading stage of Nipponbare with 3 biological replicates. GCRMA normalization of all microarray samples was performed using the justGCRMA function (Wu et al. 2018) in R software. A total of 47 samples and 5041 panicles related genes were selected from Knetminer (Hassani-Pak, 2017) database based on published reports, and differentially expressed genes across the developing panicles in rice (Kudo et al. 2013).

Weighted gene correlation network analysis WGCNA package (Langfelder and Horvath, 2008) in R was used to identify the clusters (modules) of densely connected correlated genes. First the correlation matrix (coefficient=<0.75) was transformed into a matrix of connection strengths (an adjacency matrix) by raising the correlation matrix to the soft power $\beta$(beta) of 6. The adjacency function $\alpha ij$=Power (sij, $\beta$)=Isijl $\beta$ where sij is the co-expression similarity, and $\alpha ij$ represents the resulting adjacency that measures the connection strengths. The power $\beta$ is chosen using the scale free topology criterion proposed in (Zhang and Horvath, 2005). The adjacency matrix is converted to TO (topological overlap) matrix. Further the hierarchical clustering was done on TO similarity using cutreeDynamic function to identify modules. The eigenvectors for each module were calculated and clustered Modules with similar eigenvalue at threshold 0.25 has been merged using merge Close Modules function.

The edge weight indicates the strength of the co-expression from all nodes to all nodes. However, selection of a stringent threshold after module detection is required to remove noise. The genes were shown as nodes and the connection strength as weighted edges. Degree of connectivity was calculated to identify intramodular hubs. Nodes with an adjacency value of zero are removed from the modules and the edges with weight >=0.30089 were only selected. The genetic variants strongly associated with different panicle architecture traits were traced in the gene networks and highlighted its interactions. The visualization of co-expression network was done using Cystoscape (Shannon et al. 2003).

Cis Motif Searching

Potential binding sites of transcription factors that may alter the expression of candidate genes were determined using TomTom (Gupta et al., 2007). Probe sequences of specific length (30 bp) overlapping each of the significant SNPs detected with targeted association results were reverse transcribed and then used as input, considering an E-value<10. The motifs were compared with entries in JASPAR Core (2018) Plants Non-Redundant DNA Database (Khan et al. 2018).

Protein-Protein Interactions

Predicted protein-protein interactions of OsTPR were determined using STRING-DB ver. 10.5 (Szklarczyk et al., 2017) at high confidence (0.700) for the minimum required interaction score including less than 10 interactors for the first shell, and zero interactors for the second shell. The active interaction sources which served as potential evidence suggesting functional link include protein-protein experimental/biochemical data, associations in curated public databases, gene-fusion, co-expression data and text mining data (PubMed abstracts) were highlighted.

Gene Prediction

According to MSU 7.0 annotation, LOC_Os02g50790 and LOC_Os02g50799 were identified as two consecutive genes matching similar biological function showing homology to nucleoprotein TPR proteins. To confirm the annotation and gene models, the genomic sequence was extracted where these two genes are present in the genome. This whole sequence was used as input to the FGENESH for predicting gene model using standard parameters (Solovyev et al., 2006). Monocot sequences of Maize, Rice, Wheat and Barley were used as training set. The gene model prediction was validated with another abinitio method named as AUGUSTUS (Stanke et al., 2003).

Multiple Sequence Alignment and Phylogenetic Analysis

Multiple sequence alignment was performed for the protein sequence of the candidate gene to decipher the phylogeny among the close relatives. Overall 13 species were under consideration including two sub-species of *Oryza sativa*—*japonica* and *indica*. Protein sequence of newly predicted *Oryza sativa* spp. *japonica* TPR gene from MSU7 was used to identify orthologous protein in other species including *Oryza sativa* spp. *indica* (Zhang et al., 2016). Whole proteome sequences from Ensemble database (ww(dot)plants (dot)ensembl(dot)org/index(dot)html) for other species were used to identify the orthologous gene using locally installed NCBI-BLAST (Altschul et al., 1990). Multiple sequence alignment was performed using CLUSTALW (Thompson et al., 1994) after identification of candidate protein. MEGA X (Kumar et al., 2018) was used to create the NEIGHBOR-joining phylogenetic tree with 1000 bootstrap. Evolutionary distances were calculated using poisson correction method. Percentage of total replicates (1000 bootstrap) used to form the branches in the bootstrap test presented near to the branches. Another multiple sequence alignment of candidate protein was performed with 8 contrasting lines using CLUSTALW where 4 samples with higher number of upper secondary rachis branches and 4 samples with low number of upper secondary rachis braches were considered. Alignment was presented with highlighted domain and important non-synonymous SNPs.

Nucleotide Diversity Calculation

7 SNP positons for genic region and 15 SNP position for whole LD block region were downloaded from the SNP-seek (Alexandrov et al., 2015) data for whole 3 k set. Whole population was separated into different sub-population based on classification present at SNP-seek database. Minor allele frequency was calculated for each SNP at each sub-population level to verify how many candidate SNPs are present in other sub-populations. Nucleotide diversity computed using VCF tools (Danecek et al., 2011) and presented as line plot.

Example 1

Correlation Analyses Between Panicle Traits and Spikelet Number

Figure 1:
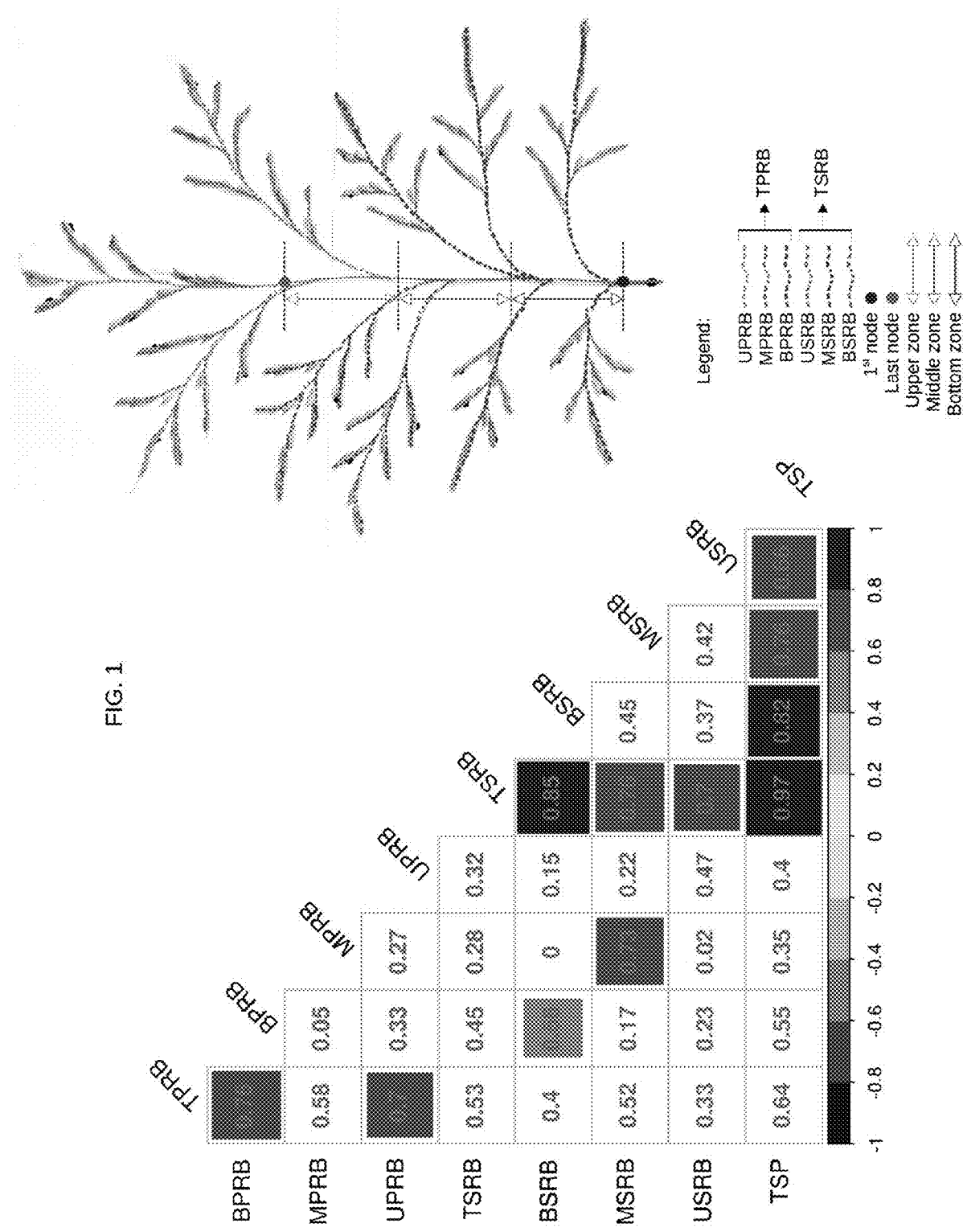
Figure 8:
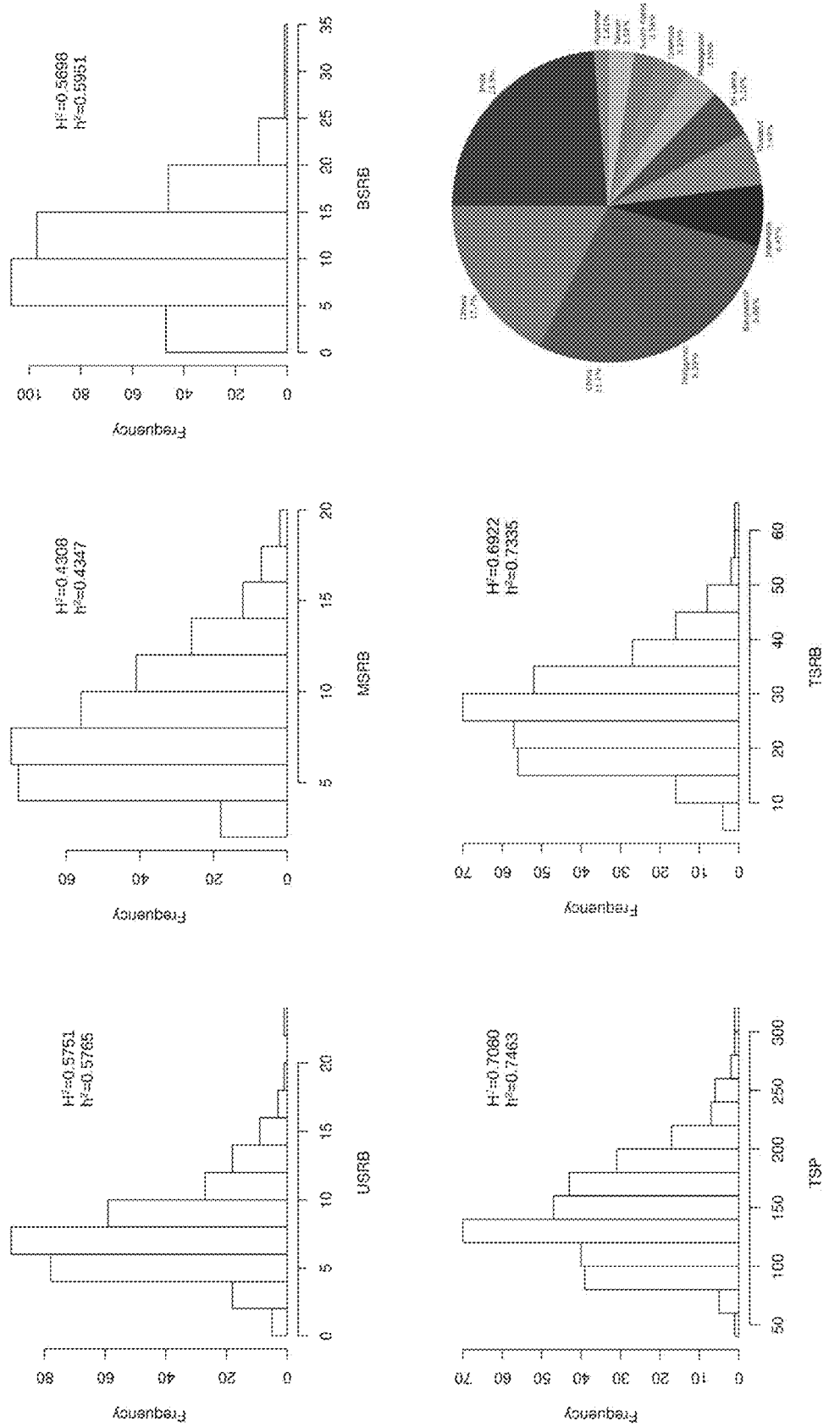
FIG. 8 shows the population used in the present study of diverse resequenced *O. sativa* subsp. *indica* samples. Frequency distribution in terms of total number of spikelets and secondary rachis branch-related traits along with corresponding heritability values of the 310 resequenced *indica* samples and their country of origin.

Using P-TRAP software 41 traits for panicle architecture were phenotyped in 310 *indica* accessions. The accessions represented diverse countries and exhibited a high heritability of $H^2=0.69$ for total number of secondary rachis branches (TSRB) and a wide range of phenotypic variation in this trait (FIG. 8). Correlation analysis revealed that TSRB was highly positively correlated with the total number of spikelets (TSP; $r^2=0.97$). The total number of primary rachis branches (TPRB) was only moderately positively correlated with TSP ($r^2=0.64$; FIG. 1). Apportioning the panicle into three zones, upper, middle and bottom, correlation of TSP with the number of upper, middle and bottom secondary rachis branches (USRB, MSRB and BSRB respectively) exhibited $r^2$ values of 0.66, 0.76, and 0.82, respectively. USRB was expected to have lowest correlation with TSP compared to BSRB due to acropetal reduction of SRBs within the rice panicles. On the other hand, TSP correlations with upper, middle and bottom primary rachis branches (UPRB, MPRB, BPRB respectively) showed much lower $r^2$ values of 0.4, 0.35, and 0.55, respectively. These results reinforced the idea of apportioning the panicle into three zones in order to appreciate which panicle trait modification held the promise of most gain for attaining optimal grain yield.

Example 2

New Genetic Loci Identified to Influence Upper Secondary Rachis Branches

Single-locus GWAS (slGWAS) underpinned genomic regions with significant association to various panicle architecture traits through 747,087 high quality bi-allelic SNP markers from 309 resequenced *indica* samples. The genotyping rate was 99.98% and minor allele frequency was greater than 10%. Genomic association was most pronounced for variation in USRB and a clear candidate region was demarcated by the slGWAS peak (FIGS. 2A-D). The quantile-quantile (QQ) plot (FIG. 2B) revealed that the effects of confounding factors such as population structure did not increase the rate of false positives in the GWAS. Results showed prominent peaks on Chromosomes 1 and 2 with 230 significant SNPs of q-values <0.05 (FIG. 2A, Table A in T) with genetic variance of 0.83. From the 230 significant SNPs, 33 were located on chromosome 1 and explained 0.62 of genetic variance ($\sigma^2 G$) in a 592.6 Kb interval between LOC_Os01g10680 to LOC_Os01g11660.

The 197 SNPs on chromosome 2 were mapped within a 126.4 kb interval with five distinct linkage disequilibrium (LD) blocks (FIG. 2B). The tagged markers found in this region exhibited equal beta-effects conferring genetic variance ($\sigma^2 G$) of 0.49. While all SNPs showed positive effect to the trait of interest based on beta coefficients ($\beta > 0.2880$), a single significant SNP (snp_02_14377682) in LOC_Os02g24780 showed high negative effect ($\beta = -0.5851$, p=1.0597e-05) on the USRB. Among the five linkage disequilibrium (LD) blocks, haplotypes defined, based on the tag SNPs within LD block 4, clearly distinguished a wide range of phenotypes for high and low USRB (FIG. 2C).

Figure 9:
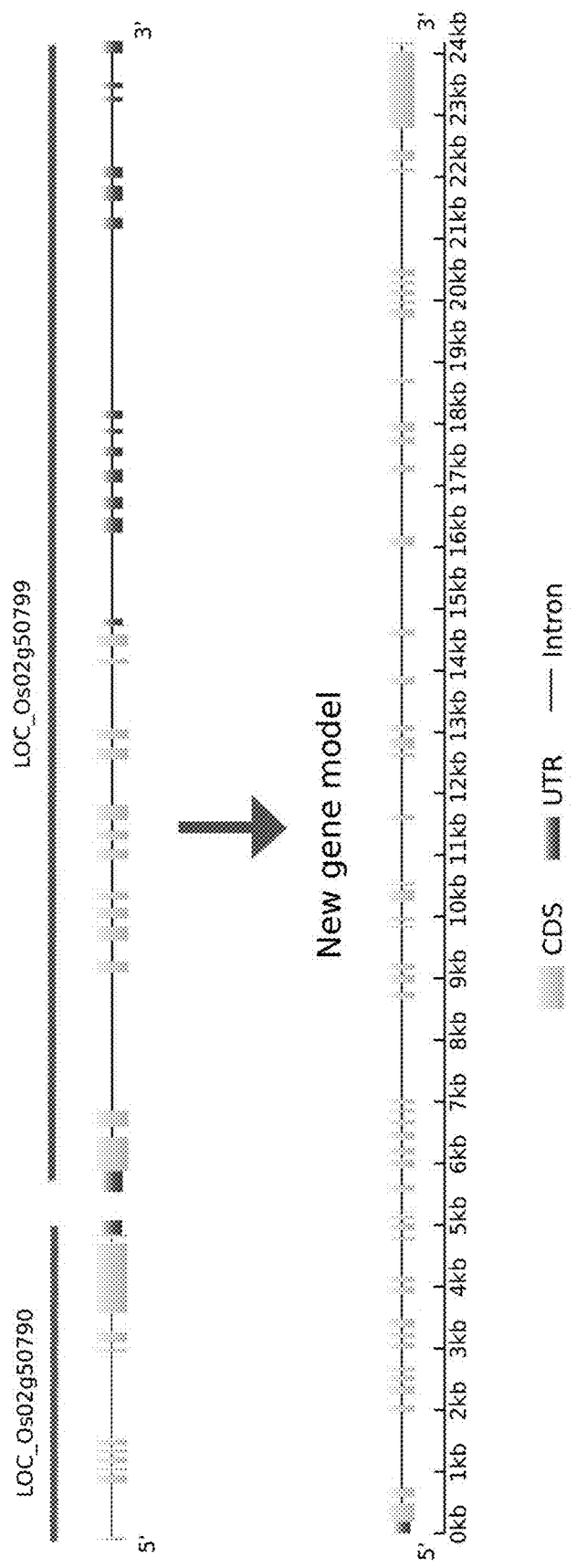
FIG. 9 shows the OsTPR gene structure. Gene model prediction revealed one long gene (24,444 bp) consisting of LOC_Os02g50790 (SEQ ID NO: 25) and LOC_Os02g50799 (SEQ ID NO: 27) which both encode nuclear-pore anchor proteins (SEQ ID NO: 26 and SEQ ID NO: 28, respectively).

To identify multi-marker cumulative effect, gene-set analysis was performed. Based on the gene level analysis, top 10 genes significantly associated to USRB with highest p-values were identified (not shown). The strongest association (p=0.013498) with USRB was detected in the gene set consisting of LOC_Os02g50700, LOC_Os02g50790 and LOC_Os02g50799. The two latter candidate genes (LOC_Os02g50790 and LOC_Os02g50799) were annotated in public databases as two separate genes with homology to nuclear pore anchor proteins. Both were related to flower development through gene ontology. However, gene model prediction using 'AUGUSTUS' with *indica* training set confirmed these to be a single gene of 24,444 bp encoding a protein of 2050 amino acids (FIG. 9). LOC_Os02g50790/LOC_Os02g50799 encodes an orthologue of the *Arabidopsis* translocated promoter region gene (AtTPR) belonging to nuclear pore complex (FIGS. 15-17). Therefore, it was called OsTPR. Interestingly, 60 SNPs were found in OsTPR. Among them, six SNPs were missense mutations causing amino acid changes. One such amino acid change was located in the TPR domain (c.3480A>C;p.Gln1160His; FIG. 16). In addition, one SNP was in the promoter region (snp_02_31035009) at a potential SPL3/SPL14 transcription factor binding motif of 5'-TNCGTACAA-3' (FIG. 3).

Example 3

Haplotype Analysis of OsTPR for Increased Panicle Branching and Yield

Haplotype analysis for OsTPR formed from the significant SNPs revealed that lines with high USRB contained the 'superior' haplotype1 (AGGATCA, SEQ ID NO: 1). In comparison, lines with low USRB were associated with 'inferior' haplotype2 (TATTCGG, SEQ ID NO: 2), haplotype3 (TATTCCG, SEQ ID NO: 3) and haplotype4 (TATACCG, SEQ ID NO: 4; FIG. 3). The direct proportionality between USRB and TSP reflected in that the superior haplotype had relatively high TSP, potentially leading to increased yield parameters. Haplotype3 had lowest USRB. The OsTPR promoter region in lines with high and low USRB contained binding motifs for SPL3 and SPL14 although lower p- and E-values were observed for latter (FIG. 3).

Importantly, lines of haplotype 1 had low chalk content and those with haplotype 3 had high chalk content. This result suggested an association of OsTPR with increased USRB and TSP without compromising the grain quality. Additionally, analysis of grain quality traits indicated that the amylose content, gel temperature, viscosity, retrogradation, and cooking traits such as the cooked grain length and width (FIG. 10), were better or maintained in the OsTPR haplotype 1 grains on USRB.

Figure 4A:
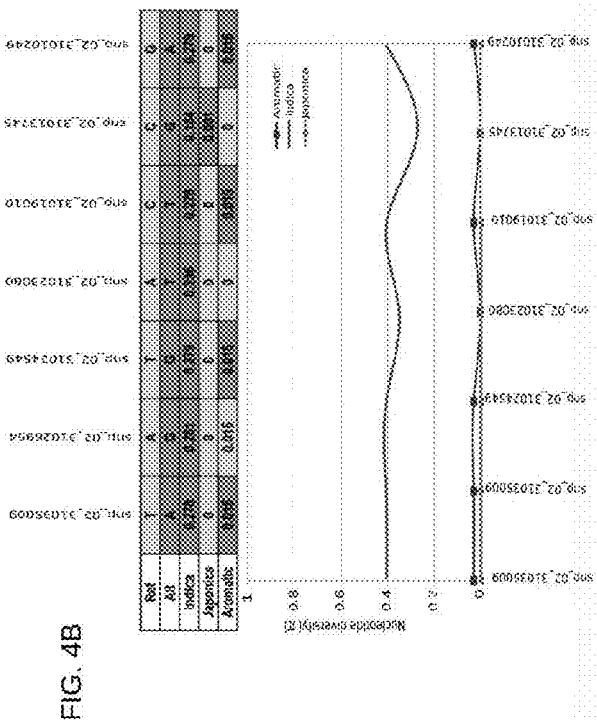
Figure 4B:
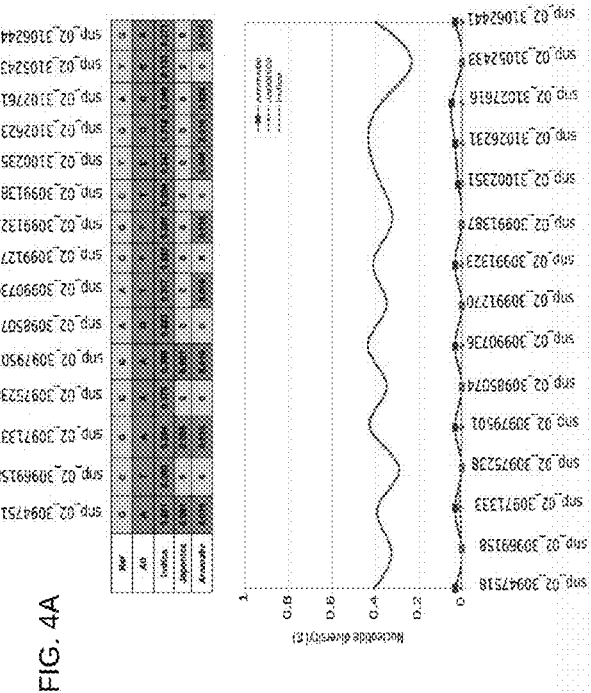
Figure 4C:
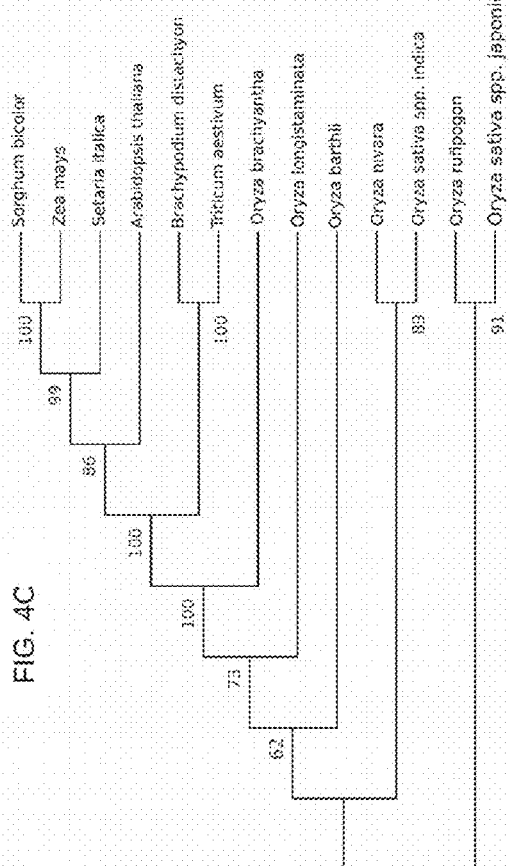

Allele mining using 3 k rice genomes revealed that within the *indica* subgroup the superior haplotype 1 was enriched while the inferior haplotype 3 was least represented (FIG. 3). The superior haplotype1 was not found in *japonica* subgroup suggesting its importance as an approach for improving the *japonica* rice lines. Phylogenetic analysis of 13 putative OsTPR homologues revealed that the *indica* haplotype was related to *O. nivara* while the *japonica* one was likely derived from *O. rufipogon* (FIGS. 11A-D). To test whether the 7 SNP haplotype, which is significantly associated with increased USRB, was differentially selected at the subgroup level, nucleotide diversity was calculated. It was found to be significantly higher in *indica* indicating its preferential selection compared to the aromatic and *japonica* sub-types (FIGS. 4A-C).

Example 4

Identification of Genetic Variants that are Associated with Primary and Secondary Rachis Branches Contributing to Increased Grain Number Since slGWAS does not account for small to medium effect loci, multi-locus GWAS (mlGWAS) analysis was used to identify the integrated effect of multiple markers on the phenotype and determine genomic regions of significant association with panicle branching traits and number of total spikelets. Additional 208 loci were identified across the 12 chromosomes for significant associations with different panicle architecture traits (not shown).

Figure 5:
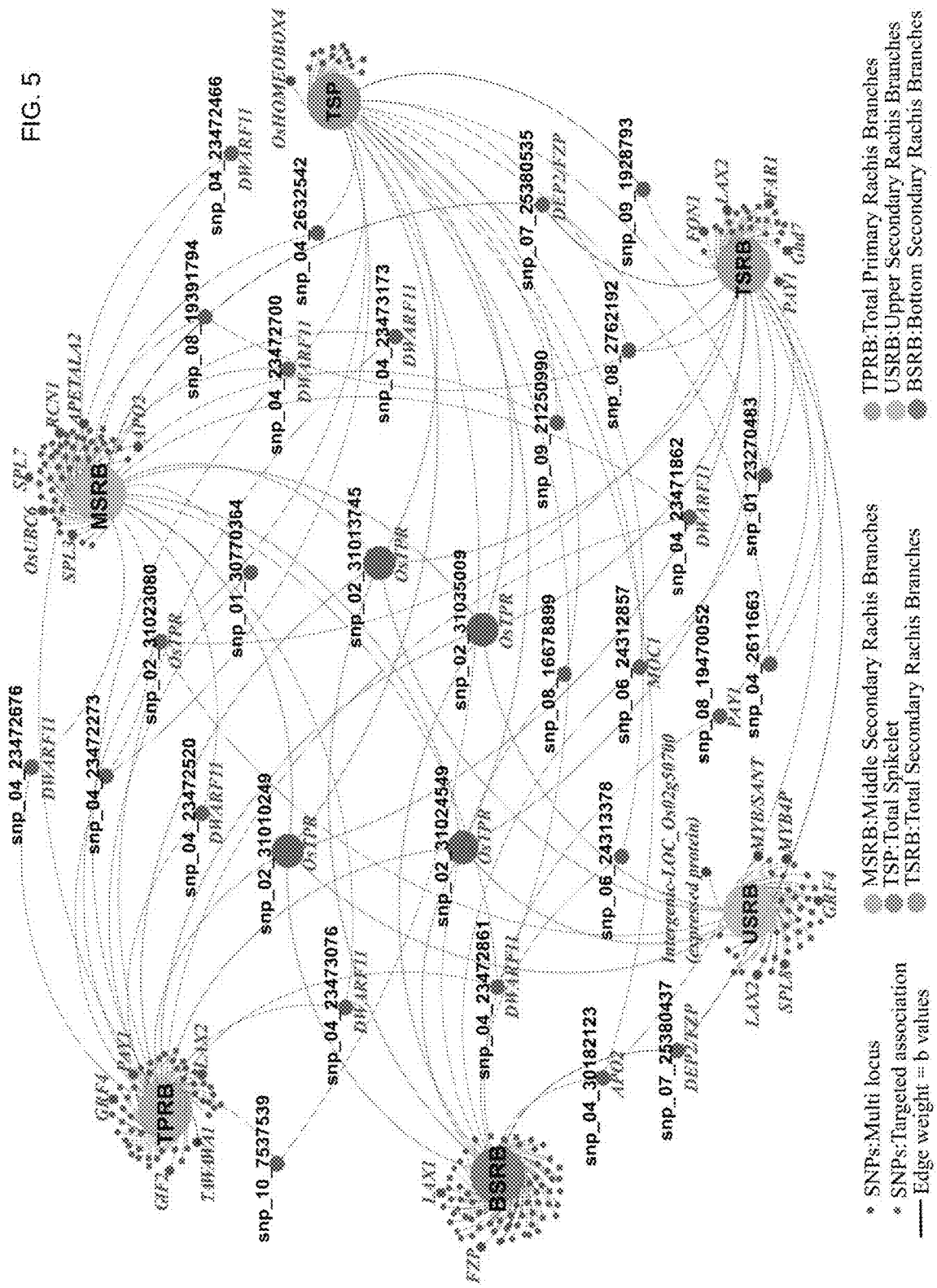

Among them were several important transcription factors and hormone responsive genes (FIG. 5). These included genetic variants in the upstream region of HOMEOBOX4 (HOX4), which strongly associated with TSP (LOD score 7.84); a SNP downstream of TAWAWA1 for TPRB (LOD score 7.79) and a non-synonymous SNP in FAR1-related gene for TSRB (LOD score 4.1). Additional SNP variants were identified among transcription factor genes (FIG. 5) encoding OsMYB4P and OsMYB/SANT (strongly associated for USRB); OsUBC6 and an APETALA2 (AP2) domain-containing protein (associated with MSRB); and OsFBOX75 and OsFBOX252 proteins (associated with BSRB). Among the genes identified in mlGWAS analysis only one was a cloned gene (TAWAWA1) validated to affect panicle architecture in rice.

Many SNPs found in the 37 genes (transcription factor and hormone responsive genes previously cloned useful in yield/flower/panicle traits) exhibited small to intermediate effect associations with primary and secondary rachis branching traits (not shown). To identify the association between sub-traits of branching with TSP, association networks for genetic variants identified from slGWAS, mlGWAS and targeted association approaches were delineated. Interestingly, DWARF11 and MOC1 contribute to increase in total spikelets due to increased number of rachis branches of MSRB, TPRB and BSRB (FIG. 5); Thus association network identified DWARF11 and MOC1 as central regulators to increase TSP by increasing secondary branching at the middle and bottom portion of panicles. The DWARF11 and MOC1 in such lines were thus the superior haplotypes. These lines also maintained superior grain quality (FIGS. 11A-D). Similarly, the superior haplotypes of OsTPR and OsMYB4P which associated with USRB contributed to increased total spikelets without impairing grain quality in terms of chalk content (FIGS. 12A-D). Interestingly however, lines that possessed superior haplotypes for all the four genes of DWARF11, MOC1, OsTPR and OsMYB4P exhibited additional total spikelet increase (median of 250) with higher number of filled spikelets per plant, due to recombined superior haplotypes of USRB, MSRB and BSRB (FIG. 6) and also exhibited slightly reduced number of panicle per plant. These naturally pyramided lines (IRIS_313-9472, IRIS_313-8903, IRIS_313-10396, IRIS_313-9832, IRIS_313-9605) with higher total spikelets (FIG. 6) had no trade-off with percentage of chalk and head rice yield (FIGS. 12A-D). When additional grain quality parameters and yield parameters were assessed, results demonstrated that when the superior allele of OsTPR was present, the increased number of spikelets (by virtue of increased upper secondary rachis branching) maintained superior grain quality (FIGS. 10, 12A-D). These results proposed that the novel gene identified, namely OsTPR, for the first time, enhance yield parameters without negative effect on grain quality.

Example 5

Figure 7A:
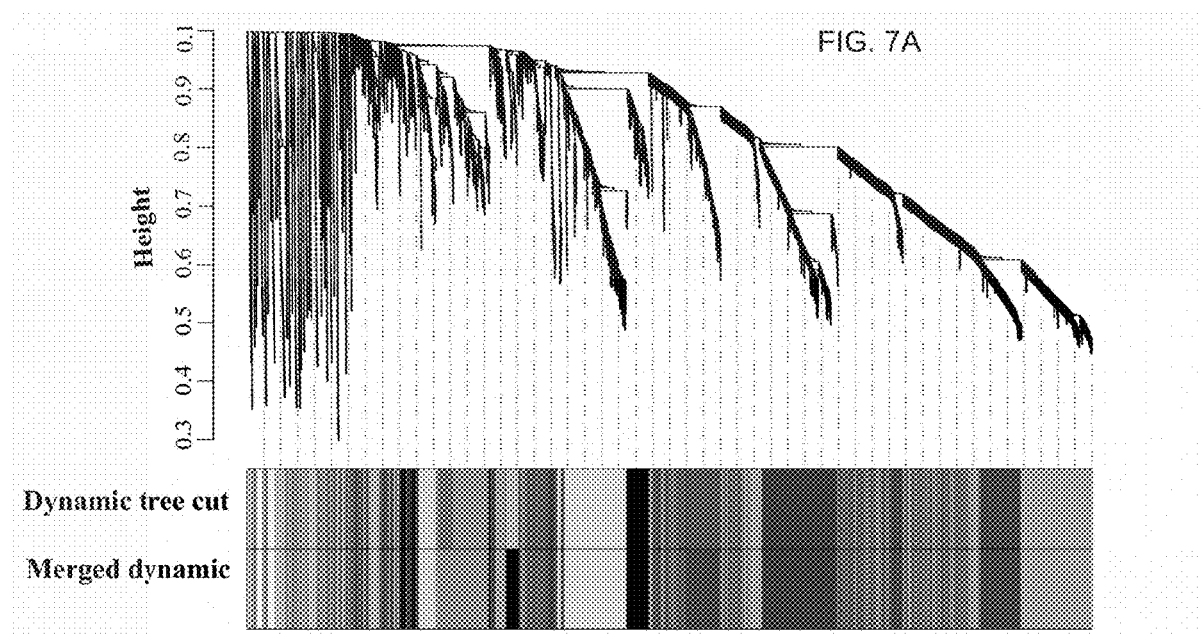
Figure 7B:
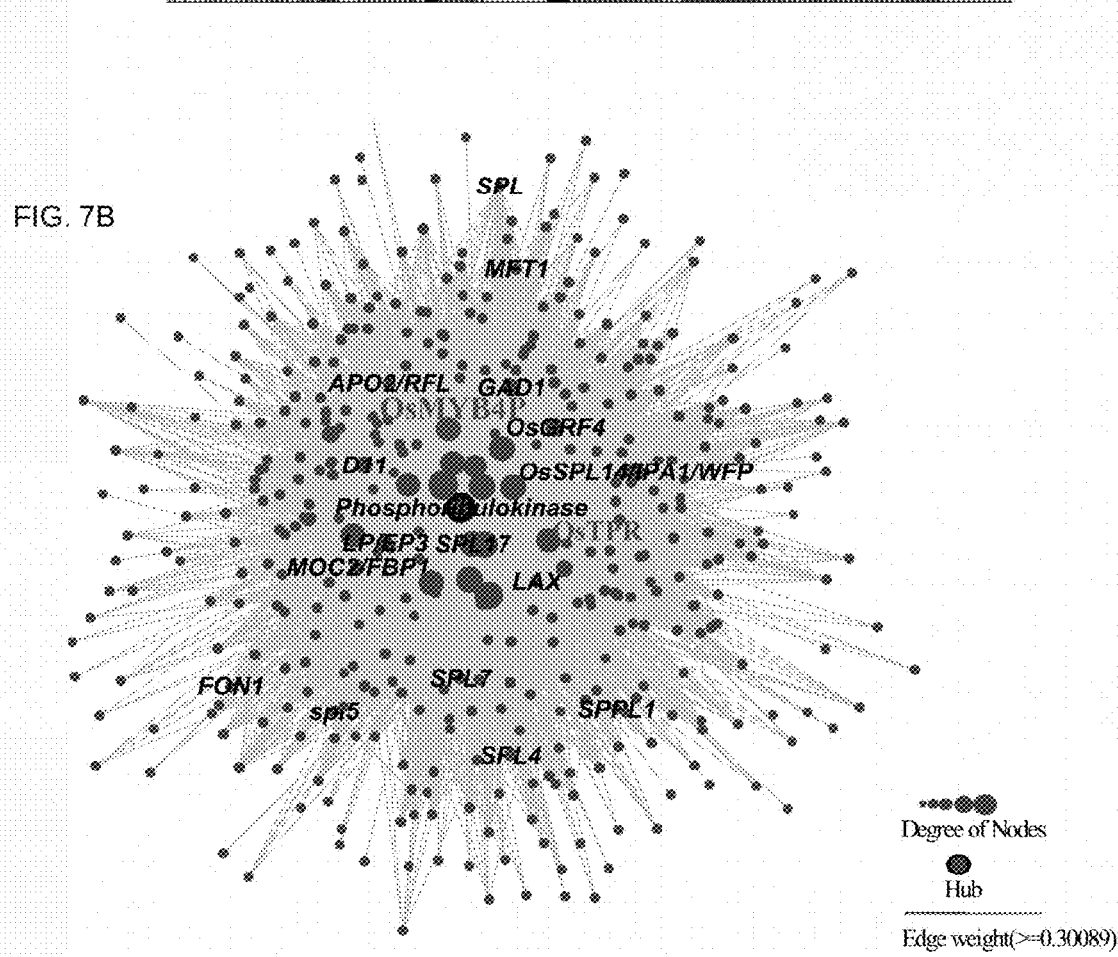

Integrating Genetic Variants Identified in GWAS with Coexpression Networks of Panicle Development To overcome any spurious association sometimes predicted by GWAS, genetic variants identified through slGWAS, mlGWAS, and targeted association approaches were linked to the transcriptome co-expression networks data at panicle development stage. This elucidated increased connectivity of nodal genes linked to key candidate genes as the central hub. The co-expression analysis of 5,041 genes, expressed during panicle development, clustered them into 17 modules (FIG. 7A). Among them, the blue module (FIG. 7B) possessing the phosphoribulokinase (LOC_Os02g47020) gene as central hub depicted high degree of connectivity with the 866 nodes with edge weight ≥0.3. Within this module, critical panicle architecture genes such as OsMyB4P and OsTPR displayed high to moderate degree of connectivity. Genetic variants of these two genes strongly associated with USRB phenotypes (FIGS. 12A-D). Further, analysis of the first neighbors of OsTPR identified 243 closely associated nodes (FIG. 14A). Major functional categories of genes coexpressed in the sub-module of OsTPR belong to cell cycle organization, photosynthesis, RNA regulation, developmental process, and protein synthesis. Important transcription factors such as G2-like, HB, MYB, bZIP, ARF, bHLH, C2C2(Zn)CO-like, zf-HD, GRF, $C_2C2(Zn)$GATA were found to be closely linked (FIG. 14A). Also, several genes involved in panicle branching linked with OsTPR at a higher degree of connectivity (FIG. 14A). These include OsGRF4 (LOC_Os02g47280) and LAX1 (LOC_Os01g61480) that associate with USRB; SPL7 (LOC_Os05g45410) associated with MSRB, andA PO2/RFL (LOC_Os04g51000) associated with BSRB. The genetic variants of these were validated in our targeted association analysis (not shown). In the same module, several SPL family members were found which includes SPL14/IPA1/WFP (LOC_Os08g39890), SPL5 (LOC_Os07g10390), SPL4 (LOC_Os02g07780), SPL (LOC_Os01g01080), SPPL1 (LOC_Os10g25360). Other key genes such as GAD1 (LOC_Os08g36320), Dwarf11 (LOC_Os04g39430), MOC2/FBP1 (LOC_Os01g64660), FON1 (LOC_Os06g50340), and MFT1 (LOC_Os06g30370) were linked with panicle architecture traits (FIG. 14A).

Further evidence for the importance of OsTPR protein came from protein-protein interactions (FIG. 14B). It suggested a role in positive activation of the nuclear pore protein (NPP, LOC_OSI1g42420). NPP binds with OsLIC, a transcriptional activator involved in rice plant architecture regulation. The NPP also interacts with a SAC3/GANP protein (LOC_Os07g45160) potentially involved in nuclear mRNA export. Two Ulpl proteases (LOC_Os03g29630 and LOC_Os03g22400 proteins), and a small ubiquitin-like modifier (SUMO) protease (LOC_Os01g25370), have gene ontology of flower development (GO:0009908) aside from hydrolase activity (GO:0016787) and protein modification process (GO:0006464). These three proteases are localized in the nucleus and potentially interact especially LOC_Os01g25370 and LOC_Os03g22400. Thus, OsTPR interacts with proteins involved in ubiquitination and SUMOylation pathway influencing plant architecture regulation (FIG. 14B). The *Arabidopsis* orthologue of TPR is also a SUMO interacting protein (Xu et al 2007).

Example 6

Breeding Proof of Concept to Increase the Upper Secondary Rachis Branching Methodology (Shown in FIG. 18)

The $F_5$-derived $F_6$ Recombinant Inbred lines (RILs) has been developed using single seed descent (SSD) method by employing the hybridization between high amylose mutant IR36ae (possess inferior haplotype of OsTPR TATTCGG haplotype SEQ ID NO: 2) and superior haplotype of OsMOC1 CG haplotype) and Samba Mahsuri (possess superior haplotype of OsTPR AGGATCA haplotype SEQ ID NO: 1) and inferior haplotype of OsMOC1 GA haplotpe). The Sambha Mahsuri parent is one of the most popular varieties consumed mainly across India due to its excellent cooking and eating qualities.

A total of 369 $F_3$ progenies were selected and eventually forwarded to advanced generation until $F_5$, utilizing single seed descent (SSD) method through rapid generation advancement. During the 2019 wet season a field experimental trial was conducted by growing a set of selected 298 $F_5$ progenies in randomized complete block design with 2 replications, which were eventually termed as $F_{5:6}$ RILs population. Out of them, a total of 280 samples from SM x IR36ae $F_5$ population was successfully phenotyped using GIMP and P-TRAP software. Genotype data for the candidate genes OsTPR and OsMOC1 identified previously using in silico approaches were obtained using the KASP genotyping assay technology. In the diversity panel GWAS analysis, AGGATCA (SEQ ID NO: 1) was the superior haplotype identified for TPR based on the reference genome Nipponbare. In the current genotype data generated using KASP genotyping assay technology, the complementary alleles of TPR haplotype TCCTAGT were generated since the TPR gene is in the negative strand (3' to 5'). Samples with missing genotyping data for the significant SNPs in each candidate gene were removed. In addition, lines containing heterozygotes were also removed when forming the haplotypes. Lines possessing haplotypes with homozygous alleles for OsTPR and OsMOC1 are 210 and 251 samples, respectively. A total of 195 samples have complete phenotype and genotype data for OsTPR and OsMOC1 haplotypes. Comparison of haplotype effects of OsTPR, OsMOC1, and combination of OsTPR and OsMOC1 with measured 21 panicle architecture phenotype data was done using t-test or Wilcoxon test. Boxplots were constructed using ggplot package in R after removing heterozygotes.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

REFERENCES

1. Zhu, Z. et al. Genetic control of inflorescence architecture during rice domestication. *Nature Communications* 4, 2200 (2013).
2. Sweeney, M. & McCouch, S. The complex history of the domestication of rice. *Annals of Botany* 100, 951-957 (2007).
3. Ikeda-Kawakatsu, K. et al. Expression level of ABERRANT PANICLE ORGANIZATION1 determines rice inflorescence form through control of cell proliferation in the meristem. *Plant Physiology* 150, 736-747 (2009).
4. Ikeda, K., Sunohara, H., & Nagato, Y. Developmental course of inflorescence and spikelet in rice. *Breeding Science* 54, 147-156 (2004).
5. Ying, J., Chen, Y., & Zhang, H. *Functional Characterization of Genes/QTLs for Increasing Rice Yield Potential, Rice: Germplasm, Genetics and Improvement* (ed. Yan, W.) DOI: 10.5772/51100 (InTech, 2014).
6. Xing, Y. & Zhang, Q. Genetic and molecular bases of rice yield. *Annual Review of Plant Biology* 61, 421-442 (2010).
7. Li, X. et al. Control of tillering in rice. *Nature* 442, 618-621 (2003).
8. Huang, X., et al. Natural variation at the DEP1 locus enhances grain yield in rice. *Nature Genetics* 41, 494-497 (2009).
9. Tabuchi, H. et al. LAX PANICLE2 of rice encodes a novel nuclear protein and regulates the formation of axillary meristems. *Plant Cell* 23, 3276-3287 (2011).
10. Ashikari, M. et al. Cytokinin oxidase regulates rice grain production. *Science* 309, 741-745 (2005).

11. Fujita, D. et al. NAL1 allele from a rice landrace greatly increases yield in modern *indica* cultivars. *Proceedings of the National Academy of Sciences*, USA 110, 20431-20436 (2013).
12. Komatsu, M., Chujo, A., Nagato, Y., Shimamoto, K., & Kyozuka, J. FRIZZY PANICLE is required to prevent the formation of axillary meristems and to establish floral meristem identity in rice spikelets. *Development* 130, 3841-3850 (2003).
13. Chen, J. et al. An evolutionarily conserved gene, FUWA, plays a role in determining panicle architecture, grain shape and grain weight in rice. *The Plant Journal* 83, 427-438 (2015).
14. Sun, P. et al. OsGRF4 controls grain shape, panicle length and seed shattering in rice. *Journal Integrative Plant Biology* 58, 836-847 (2016).
15. Wu, Y. et al. CLUSTERED PRIMARY BRANCH 1, a new allele of DWARF11, controls panicle architecture and seed size in rice. *Plant Biotechnology Journal* 14, 377-386 (2016).
16. Yoshida, A. et al. TAWAWA1, a regulator of rice inflorescence architecture, functions through the suppression of meristem phase transition. *Proceedings of the National Academy of Sciences, USA* 110, 767-772 (2013).
17. Lu, L. et al. Natural variation and artificial selection in four genes determine grain shape in rice. *New Phytologist* 200, 1269-1280 (2013).
18. Weng, X. et al. Grain number, plant height, and heading date7 Is a central regulator of growth, development, and stress response. *Plant Physiology* 164, 735-747 (2014).
19. Miura, K. et al. OsSPL14 promotes panicle branching and higher grain productivity in rice. *Nature Genetics* 42, 545-550 (2010).
20. Mohapatra, P. K. A *Physiological Approach to Design Rice Panicle Architecture in the Quest for High Grain Yield, International Dialogue on Perception and Prospects of Designer Rice* (eds. Muralidharan, K. & Siddiq, E. A.) 131-142 (Directorate of Rice Research, 2013).
21. Matsue, Y., Odahara, K., & Hiramatsu, M. Differences in protein content, amylose content and palatability in relation to location of grains within rice panicle. *Japanese Journal of Crop Science* 63, 271-277 (1994).
22. Matsue, Y., Odahara, K., & Hiramitsu, M. Differences in amylose content, amylographic characteristics and storage proteins of grains on primary and secondary rachis branches in rice. *Japanese Journal of Crop Science.* 64, 601-606 (1995).
23. Das, K. et al. Grain density and its impact on grain filling characteristic of rice: mechanistic testing of the concept in genetically related cultivars. *Nature Scientific Reports* 8, 4149 (2018).
24. Adriani et al. Rice panicle plasticity in Near Isogenic Lines carrying a QTL for larger panicle is genotype and environment dependent. *Rice* 9, 28 (2016).
25. Wang, F., Cheng, F., & Zhang, G. Impact of cultivar variation in grain density of rice panicle on grain weight and quality. *Journal of the Science of Food and Agriculture* 88, 897-903 (2008).
26. Nhung et al. A genome-wide association study using a Vietnamese landrace panel of rice (*Oryza sativa*) reveals new QTLs controlling panicle morphological traits. *BMC Plant Biology* 18, 828 (2018).
27. Crowell, S. et al. Genome-wide association and high-resolution phenotyping link *Oryza sativa* panicle traits to numerous trait-specific QTL clusters. *Nature Communications* 7, 10527 (2016).
28. Rebolledo, M. C. et al. Combining image analysis, genome wide association studies and different field trials to reveal stable genetic regions related to panicle architecture and the number of spikelets per panicle in rice. *Frontiers in Plant Science* 7, 1384 (2016).
29. Panda, B. B. et al. Compact panicle architecture is detrimental for growth as well as sucrose synthase activity of developing rice kernels. *Functional Plant Biology* 42, 875-887 (2015).
30. Krull, S., Thyberg, J., Bjorkroth, B., Rackwitz, H. R., & Cordes, V. C. Nucleoporins as components of the nuclear pore complex core structure and Tpr as the architectural element of the nuclear basket. *Molecular Biology of the Cell* 15, 4261-4277 (2004).
31. Jacob, Y., Mongkolsiriwatana, C., Veley, K. M., Kim, S. Y. &, Michaels, S. D. The nuclear pore protein AtTPR Is required for RNA homeostasis, flowering time, and auxin signaling. *Plant Physiology* 144, 1383-1390 (2007).
32. Tanya, Z. B. et al. The *Arabidopsis* Information Resource: Making and mining the "gold standard" annotated reference plant genome. *Genesis* 53, 474-485 (2015).
33. Yates, G., Srivastava, A. K., & Sadanandom, A. SUMO proteases: uncovering the roles of deSUMOylation in plants. *Journal of Experimental Botany* 67, 2541-2548 (2016).
34. Murtas, G. et al. A nuclear protease required for flowering-time regulation in *Arabidopsis* reduces the abundance of SMALL UBIQUITIN-RELATED MODIFIER conjugates. *The Plant Cell* 15, 2308-2319 (2003).
35. Wang, L. et al. OsLIC, a novel CCCH-type zinc finger protein with transcription activation, mediates rice architecture via brassinosteroids signaling. *PLOS One* 3, e3521 (2008).
36. Wolfe, C. J., Kohane, I. S., & Butte, A. J. Systematic survey reveals general applicability of "guilt-by-association" within gene coexpression networks. *BMC Bioinformatics* 6, 227 (2005).
37. Preston, J. C. & Hileman, L. C. Functional evolution in the plant *SQUAMOSA*-PROMOTER BINDING PROTEIN-LIKE (SPL) gene family. *Frontiers in Plant Science* 4, 80 (2013).
38. Cardon, G. H., Hohmann, S., Nettesheim, K., Saedler, H., & Huijser, P. Functional analysis of the *Arabidopsis thaliana* SBP-box gene SPL3: a novel gene involved in the floral transition. *The Plant Journal* 12, 367-377 (1997).
39. Wu, G. & Poethig, R. S. Temporal regulation of shoot development in *Arabidopsis thaliana* by miR156 and its target SPL3. *Development* 133, 3539-3547 (2006).
40. Stone, J. M., Liang, X., Nekl, E. R. & Stiers, J. J. *Arabidopsis* AtSPL14, a plant-specific SBP-domain transcription factor, participates in plant development and sensitivity to fumonisin Bl. *The Plant Journal* 41, 744-754 (2005).

41. Zhou et al. GNS4, a novel allele of DWARF11, regulates grain number and grain size in a high-yield rice variety. *Rice* 10, 1-15 (2017).
42. Xu et al. Developmental functions of miR156-regulated SQUAMOSA PROMOTER BINDING PROTEIN-LIKE (SPL) genes in *Arabidopsis thaliana*. *PLOS Genetics* 12, e1006263 (2016).
43. Al-Tam, F. M. et al. P-TRAP: A panicle trait phenotyping tool. *BMC Plant Biology* 13, 122 (2013).
44. Fusi, N., Lippert, C., Lawrence, N. D. & Stegle O. Warped linear mixed models for the genetic analysis of transformed phenotypes. *Nature Communications* 5, 4890 (2014).
45. Chang C. C. et al. Second-generation PLINK: rising to the challenge of larger and richer datasets. *Gigascience* 4, 7 (2015).
46. Tabangin, M. E., Woo, J. G., & Martin, L. J. The effect of minor allele frequency on the likelihood of obtaining false positives. *BMC Proceedings* 3, Suppl7 (2009).
47. Kang, H. M. et al. Variance component model to account for sample structure in genome-wide association studies. *Nature Genetics* 42, 348-354 (2010).
48. R Core Team. R: A language and environment for statistical computing (R Foundation for Statistical Computing, Vienna) Available at: www(dot)R-project(dot)org (2018).
49. Lin, Y. & Lee, W. Importance of presenting the variability of the false discovery rate control. *BMC Genetics* 16, 97 (2015).
50. Barrett, J. C., Fry, B., Maller, J., & Daly, M. J. Haploview: Analysis and visualization of LD and haplotype maps. *Bioinformatics* 21, 263-265 (2005).
51. de Leeuw, C. A., Mooij, J. M., Heskes, T., & Posthuma, D. MAGMA: Generalized gene-set analysis of GWAS data. *PLOS Computational Biology* 11, e1004219 (2015).
52. Kawahara, Y. et al. Improvement of the *Oryza sativa* Nipponbare reference genome using next generation sequence and optical map data. *Rice* 6, 4 (2013).
53. Misra et al. Deciphering the genetic architecture of cooked rice texture. *Frontiers in Plant Science* DOI: 10.3389/fpls.2018.01405 (2018).
54. Bradbury, P. J. et al. TASSEL: Software for association mapping of complex traits in diverse samples. *Bioinformatics* 23, 2633-2635 (2007).
55. Wickham, H. ggplot2: *Elegant Graphics for Data Analysis* (Springer-Verglag, New York) Available at www(dot)ggplot2(dot)org (2016).
56. Shannon, P. et al. Cytoscape: A software environment for integrated models of biomolecular interaction networks. *Genome Research* 13, 2498-2504 (2003).
57. Wu, R. I., MacDonald, J. & Gentry, J. gcrma: *Background Adjustment Using Sequence Information*. Available at: www(dot)bioconductor(dot)org/packages/release/bioc/html/gcrma(dot)html (2018).
58. Hassani-Pak, K. *KnetMiner-An integrated data platform for gene mining and biological knowledge discovery* (Universitat Bielefeld, Bielefeld) Available at: www(dot)pub(dot)uni-bielefeld(dot)de/publication/2915227 (2017).
59. Kudo, T. et al. UniVIO: A multiple omics database with hormonome and transcriptome data from rice. *Plant Cell Physiology* 54, e9 (2013).
60. Langfelder, P. & Horvath, S. WGCNA: an R package for weighted correlation network analysis. *BMC Bioinformatics* 9, 559 (2008).
61. Zhang, B., & Horvath, S. A general framework for weighted gene co-expression network analysis. *Statistical Applications in Genetics and Molecular Biology* 4, 17 (2005).
62. Gupta, S., Stamatoyannopoulos, J. A., Bailey, T. L., Noble, W. S. Quantifying similarity between motifs. *Genome Biology* 8, R24 (2007).
63. Khan, A. et al. JASPAR 2018: update of the open-access database of transcription factor binding profiles and its web framework. *Nucleic Acids Research* 46, 260-266 (2018).
64. Szklarczyk, D. et al. The STRING database in 2017: quality-controlled protein-protein association networks, made broadly accessible. *Nucleic Acids Research* 45, 362-368 (2017).
65. Solovyev, V., Kosarev, P., Seledsov, I., Vorobyev, D. Automatic annotation of eukaryotic genes, pseudogenes and promoters. *Genome Biology* 7, Suppl 1 (2006).
66. Stanke, M. & Waack, S. Gene prediction with a hidden Markov model and a new intron submodel. *Bioinformatics* 19, ii215-225 (2003).
67. Zhang, J. et al. Extensive sequence divergence between the reference genomes of two elite *indica* rice varieties Zhenshan 97 and Minghui 63. *Proceedings of the National Academy of Sciences, USA* 113, E5163-5171 (2016).
68. Altschul, S. F., Gish, W., Miller, W., Myers, E. W., & Lipman, D. *J. Basic* local alignment search tool. *Journal of Molecular Biology* 215, 403-410 (1990).
69. Thompson, J. D., Higgins, D. G. & Gibson, T. J. CLUSTAL W: improving the sensitivity of progressive multiple sequence alignment through sequence weighting, position-specific gap penalties and weight matrix choice. *Nucleic Acids Research* 11, 4673-4680 (1994).
70. Kumar, S., Stecher, G., Li, M., Knyaz, C., & Tamura, K. MEGA X: Molecular evolutionary genetics analysis across computing platforms. *Molecular Biology and Evolution* 35, 1547-1549 (2018).
71. Alexandrov, N. et al. SNP-Seek database of SNPs derived from 3000 rice genomes. *Nucleic Acids Research* 43, D1023-1027 (2015).
72. Danecek, P. et al. The variant call format and VCFtools. *Bioinformatics* 15, 2156-2158 (2011).
73. Yang, W. T., Baek, D., Yun, D. J., Hwang, W. H., Park, D. S., Nam, M. H., Chung, E. S., Chung, Y. S., Yi, Y. B., Kim, D. H. 2014. Overexpression of OsMYB4P, an R2R3-type MYB transcriptional activator, increases phosphate acquisition in rice. *Plant Physiol Biochem.* 80:259-67. doi: 10.1016/j.plaphy.2014.02.024.
74. Xu X. M., Rose A., Muthuswamy S., Jeong S. Y., Venkatakrishnan S., Zhao Q., et al. (2007). NUCLEAR PORE ANCHOR, the *Arabidopsis* homolog of Tpr/Mlpl/Mlp2/megator, is involved in mRNA export and SUMO homeostasis and affects diverse aspects of plant development. *Plant Cell* 19 1537-1548. 10.1105/tpc.106.049239.

SEQUENCE LISTING

The patent contains a lengthy sequence listing. A copy of the sequence listing is available in electronic form from the USPTO web site (https://seqdata.uspto.gov/?pageRequest=docDetail&DocID=US12433215B2). An electronic copy of the sequence listing will also be available from the USPTO upon request and payment of the fee set forth in 37 CFR 1.19(b)(3).

What is claimed is:

1. A method of enhancing grain yield of a rice plant, the method comprising:
   (a) crossing a recipient rice plant with a donor rice plant comprising a translocated promoter region (TPR) allele of haplotype I, wherein said haplotype I is defined as comprising an A at nucleotide 31010249, a G at nucleotide 31013745, a G at nucleotide 31019010, an A at nucleotide 31023080, a T at nucleotide 31024549, a C at nucleotide 31026954 and an A at nucleotide 31035009, wherein numbering of said haplotype 1 is with respect to chromosome 2 of *Samba* Mahsuri and whereas said donor rice plant is *indica* and said recipient rice plant is *indica* or *japonica*; and
   (b) selecting a progeny plant of said crossing comprising said TPR allele of haplotype I by identifying said haplotype I, wherein said identifying said haplotype I is by sequencing, said progeny plant being characterized by an improved grain yield relative to said recipient plant.

2. The method of claim 1, wherein said recipient plant is heterozygous for said haplotype I.

3. The method of claim 1, wherein said recipient plant is null for said sequence haplotype I.

4. The method of claim 1, wherein said selecting is further based on phenotypic screening for a grain yield- and/or grain quality-associated trait.

5. The method of claim 1, further comprising:
   (c) backcrossing the one or more of selected progeny plants to produce backcross progeny plants; and
   (d) selecting a backcross progeny plant comprising said haplotype I by identifying said haplotype I, said progeny plant being characterized by an improved grain yield relative to said recipient plant.

6. The method of claim 4, wherein said grain quality-associated trait is selected from the group consisting of amylose content, chalkiness, gel temperature, viscosity, retrogradation, cooked grain length and cooked grain width.

7. The method of claim 1, wherein said grain yield is manifested by at least one of total number of spikelets (TSP), upper secondary rachis branches (USRB) and head rice yield.

* * * * *